(12) United States Patent
Wang et al.

(10) Patent No.: US 8,839,110 B2
(45) Date of Patent: Sep. 16, 2014

(54) RATE CONFORM OPERATION FOR A MEDIA-EDITING APPLICATION

(75) Inventors: Xiaohuan C. Wang, Sunnyvale, CA (US); Giovanni Agnoli, San Mateo, CA (US); Shaun M. Poole, Palo Alto, CA (US); Vijay Sundaram, San Ramon, CA (US); Eric J. Graves, Radnor, PA (US); Peter Chou, Sunnyvale, CA (US); Colleen Pendergast, Livermore, CA (US); David N. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 13/218,407

(22) Filed: Aug. 25, 2011

(65) Prior Publication Data

US 2012/0210232 A1  Aug. 16, 2012

Related U.S. Application Data

(63) Continuation-in-part of application No. 13/111,912, filed on May 19, 2011, and a continuation-in-part of application No. 13/109,989, filed on May 17, 2011.

(60) Provisional application No. 61/443,707, filed on Feb. 16, 2011, provisional application No. 61/443,692, filed on Feb. 16, 2011.

(51) Int. Cl.
  *G06F 3/01* (2006.01)

(52) U.S. Cl.
  USPC .......................................................... 715/723

(58) Field of Classification Search
  USPC .......................................... 386/200; 715/723
  See application file for complete search history.

(56) References Cited

U.S. PATENT DOCUMENTS

| 5,404,316 A | 4/1995 | Klingler et al. |
| 5,519,828 A | 5/1996 | Rayner |

(Continued)

FOREIGN PATENT DOCUMENTS

| WO | WO 2009/128227 | 10/2009 |
| WO | WO 2010/106586 | 9/2010 |

OTHER PUBLICATIONS

Author Unknown, "Adobe Director 11: User Guide," Month Unknown, 2008, 498 pages, Adobe Systems Incorporated, San Jose, California, USA.

(Continued)

*Primary Examiner* — Thai Tran
*Assistant Examiner* — Nien-Ru Yang
(74) *Attorney, Agent, or Firm* — Adeli LLP

(57) ABSTRACT

Some embodiments provide a method that receives the addition of a video clip to a composite video project. The video clip has a sequence of video images at a first frame rate and the composite video project has a second frame rate for outputting video images. When the first frame rate does not match the second frame rate but is within a threshold of the second frame rate, the method generates output video images for a particular duration of the composite video project at the second frame rate by using each of the video images of the video clip once during the particular duration. When the first frame rate is not within the threshold, generating output video images for the particular duration of the composite video project at the second frame rate by using at least one of the video images for each output video image over the particular duration.

26 Claims, 36 Drawing Sheets

(56) References Cited

U.S. PATENT DOCUMENTS

| | | | |
|---|---|---|---|
| 5,659,539 A | 8/1997 | Porter et al. | |
| 5,659,792 A | 8/1997 | Walmsley | |
| 5,659,793 A | 8/1997 | Escobar et al. | |
| 5,664,216 A | 9/1997 | Blumenau | |
| 5,682,326 A | 10/1997 | Klingler et al. | |
| 5,781,188 A | 7/1998 | Amiot et al. | |
| 5,826,102 A | 10/1998 | Escobar et al. | |
| 5,893,062 A | 4/1999 | Bhadkamkar et al. | |
| 5,999,220 A | 12/1999 | Washino | |
| 6,134,380 A | 10/2000 | Kushizaki | |
| 6,154,600 A | 11/2000 | Newman et al. | |
| 6,154,601 A | 11/2000 | Yaegashi et al. | |
| 6,161,115 A | 12/2000 | Ohanian | |
| 6,172,675 B1 | 1/2001 | Ahmad et al. | |
| 6,204,840 B1 | 3/2001 | Petelycky et al. | |
| 6,324,335 B1 | 11/2001 | Kanda | |
| 6,370,198 B1 | 4/2002 | Washino | |
| 6,392,710 B1 | 5/2002 | Gonsalves et al. | |
| 6,487,565 B1 | 11/2002 | Schechter et al. | |
| 6,539,163 B1 | 3/2003 | Sheasby et al. | |
| RE38,079 E | 4/2003 | Washino et al. | |
| 6,542,692 B1 | 4/2003 | Houskeeper | |
| 6,546,188 B1 | 4/2003 | Ishii et al. | |
| 6,573,898 B1 | 6/2003 | Mathur et al. | |
| 6,631,240 B1* | 10/2003 | Salesin et al. | 386/290 |
| 6,871,003 B1* | 3/2005 | Phillips et al. | 386/281 |
| 7,103,260 B1 | 9/2006 | Hinson | |
| 7,313,755 B2 | 12/2007 | Rahman et al. | |
| 7,325,199 B1 | 1/2008 | Reid | |
| 7,664,336 B2* | 2/2010 | Zhang et al. | 382/260 |
| 7,669,130 B2 | 2/2010 | Agarwal et al. | |
| 7,725,828 B1 | 5/2010 | Johnson | |
| 7,956,930 B2* | 6/2011 | Sullivan | 348/581 |
| 2001/0000221 A1* | 4/2001 | Chen et al. | 375/340 |
| 2001/0020953 A1 | 9/2001 | Moriwake et al. | |
| 2001/0036356 A1 | 11/2001 | Weaver et al. | |
| 2002/0018640 A1 | 2/2002 | Bolduc | |
| 2002/0023103 A1 | 2/2002 | Gagne | |
| 2002/0101368 A1 | 8/2002 | Choi et al. | |
| 2002/0140719 A1 | 10/2002 | Amir et al. | |
| 2002/0154140 A1 | 10/2002 | Tazaki | |
| 2002/0154156 A1 | 10/2002 | Moriwake et al. | |
| 2002/0168176 A1 | 11/2002 | Iizuka et al. | |
| 2003/0117431 A1 | 6/2003 | Moriwake et al. | |
| 2003/0164845 A1 | 9/2003 | Fayan et al. | |
| 2004/0001694 A1 | 1/2004 | Evans et al. | |
| 2004/0078761 A1 | 4/2004 | Ohanian | |
| 2004/0100482 A1 | 5/2004 | Cajolet et al. | |
| 2004/0257434 A1 | 12/2004 | Davis et al. | |
| 2004/0267952 A1 | 12/2004 | He et al. | |
| 2004/0268224 A1 | 12/2004 | Balkus et al. | |
| 2006/0008247 A1 | 1/2006 | Minami et al. | |
| 2006/0236245 A1 | 10/2006 | Agarwal et al. | |
| 2007/0061862 A1* | 3/2007 | Berger et al. | 725/139 |
| 2008/0072166 A1 | 3/2008 | Reddy | |
| 2009/0147004 A1 | 6/2009 | Ramon et al. | |
| 2009/0174813 A1 | 7/2009 | Washino | |
| 2009/0263100 A1 | 10/2009 | Neuman | |
| 2010/0107126 A1 | 4/2010 | Lin et al. | |
| 2010/0281384 A1* | 11/2010 | Lyons et al. | 715/723 |
| 2010/0332981 A1 | 12/2010 | Lipton et al. | |
| 2011/0109796 A1* | 5/2011 | Subedar et al. | 348/459 |
| 2011/0206352 A1* | 8/2011 | Mikawa | 386/284 |
| 2011/0217025 A1* | 9/2011 | Begen et al. | 386/338 |
| 2011/0268427 A1* | 11/2011 | Brelay et al. | 386/343 |
| 2012/0207452 A1 | 8/2012 | Wang et al. | |
| 2012/0209889 A1 | 8/2012 | Agnoli et al. | |

OTHER PUBLICATIONS

Author Unknown, "Apple Announces Final Cut Pro 4," NAB, Apr. 6, 2003, 3 pages, Apple Inc., Las Vegas, NV, USA.

Author Unknown, "Using Adobe Flash CS4 Professional," Updated Mar. 5, 2009, 474 pages, Adobe Systems Incorporated, San Jose, California, USA.

Author Unknown, "Adobe Premiere Pro CS3: User Guide," Apr. 1, 2008, 455 pages, Adobe Systems Incorporated, San Jose, California, USA.

Author Unknown, "iMovie '08 Getting Started," Month Unknown, 2008, pp. 1-50, Apple Inc., USA.

Author Unknown, "Using Adobe Premiere Elements 8 Editor", last updated Aug. 12, 2010, 313 pages, Adobe Systems Incorporated, San Jose, California, USA.

Brenneis, Lisa, "Final Cut Pro 3 for Macintosh: Visual Quick Pro Guide," Apr. 2002, 288 pages, Peachpit Press, Berkeley, California, USA.

Casares, Juan, et al., "Simplifying Video Editing Using Metadata," Proceedings of Designing Interactive Systems (DIS 2002), Jun. 2002, pp. 157-166, London, Great Britain.

U.S. Appl. No. 13/227,461, filed Sep. 7, 2011, Wang, Xiaohuan C.

Author Unknown, Apple Support Communities Discussions, "How to Change DV/DVCPRO video to 16:9 widescreen aspect ratio in Final Cut Pro X?", Jul. 2011; (https://discussions.apple.com/thread/3155532?start=0&tstart=0).

Portions of prosecution history of U.S. Appl. No. 13/227,461, Feb. 24, 2014, Wang, Xiaohuan C., et al.

Weingartner, Andy, "Windows Movie Maker 2011 User Guide," Month Unknown, 2011, pp. 1-70, Microsoft.

\* cited by examiner

| Figure 24 | Figure 24A |
|---|---|
| | Figure 24B |

| seq. \ media | 23.98p | 24p | 25p | 29.97p | 30p | 50p | 59.94p | 60p | 25i | 29.97i |
|---|---|---|---|---|---|---|---|---|---|---|
| 23.98p | no | to 24p | to 25p | no | no | to 25p | no | no | to 25p | no |
| 24p | to 23.98p | no | to 25p | no | no | to 25p | no | no | to 25p | no |
| 25p | to 23.98p | to 24p | no | no | to 30p | no | no | to 30p | no | no |
| 29.97p | no | no | no | no | no | no | to 29.97p | no | no | to 29.97p |
| 30p | no | to 48p | no | to 29.97p | no | no | no | no | no | no |
| 50p | to 47.96p | no | no | to 59.94p | to 60p | no | to 29.97p | no | no | to 29.97p |
| 59.94p | no | 48p | no | no | no | 60p | no | 60p | no | no |
| 60p | to 47.96p | no | no | no | to 60p | no | no | 60p | no | to 59.94p |
| 25i | no | no | no | no | no | no | no | no | no | no |
| 29.97i | no | no | no | no | no | no | no | no | no | no |

*Figure 27*

RATE CONFORM OPERATION FOR A MEDIA-EDITING APPLICATION

CLAIM OF BENEFIT TO PRIOR APPLICATIONS

This application claims the benefit of U.S. Provisional Application 61/443,707, entitled "Efficient Media Processing", filed Feb. 16, 2011. This application also claims the benefit of U.S. Provisional Application 61/443,692, entitled "Retiming Media Presentations", filed Feb. 16, 2011. This application is also a continuation-in-part of U.S. patent application Ser. No. 13/111,912, now published as U.S. Patent Publication 2012/0209889, entitled "Data Structures for a Media-Editing Application", filed May 19, 2011, and which claims the benefit of U.S. Provisional Application 61/443,707. This application is also a continuation-in-part of U.S. patent application Ser. No. 13/109,989, now published as U.S. Patent Publication 2012/0210228, entitled "Retiming Media Presentations", filed May 17, 2011, and which claims the benefit of U.S. Provisional Application 61/443,692. U.S. applications 61/443,707, 61/443,692, Ser. Nos. 13/111,912, and 13/109,989 are incorporated herein by reference.

BACKGROUND

Digital graphic design, image editing, audio editing, and video editing applications (i.e., media-editing applications) provide graphical designers, media artists, movie and television directors, and other users with the necessary tools to create a variety of media content. Examples of such applications include Final Cut Pro® and iMovie®, both sold by Apple, Inc. These applications give users the ability to edit, combine, transition, overlay, and piece together different media content in a variety of manners to create a resulting media project. The resulting media project specifies a particular sequenced composition of any number of text, audio, image, and/or video content elements that is used to create a media presentation.

Various media editing applications facilitate such composition through electronic means. Specifically, a computer or other electronic device with a processor and computer readable storage medium executes the media editing application. In so doing, the computer generates a graphical interface whereby designers digitally manipulate graphical representations of the media content to produce a desired result.

Video today comes in many formats, such as different standard definition formats (e.g., NTSC and PAL), different high definition formats (e.g., 720p and 1080p), as well as even higher resolution formats (e.g., 4K). In many cases, filmmakers will want to use video of different formats in the same media project, such as when combining recently-filmed footage with older footage in a documentary. In addition, filmmakers may want to create a project in different output formats for different mediums (e.g., theater, DVD, streaming video, etc.). However, many previous media-editing applications do not handle these conversions between different media formats very well.

BRIEF SUMMARY

Some embodiments of the invention provide a media-editing application that automatically modifies spatial and/or temporal properties of a media clip (e.g., video clip, still image, audio clip, etc.) to match corresponding properties of a media project to which the media clip is added. In some embodiments, the media-editing application applies a first effect to the media clip in order to conform the spatial properties of the clip to those of the media project and a second effect to the media clip in order to conform the temporal properties of the clip to those of the media project. The automatic modification of these clip properties enables a user of the media-editing application to create a media project using clips having a variety of different formats.

Some embodiments apply a spatial conform effect to a media clip when certain spatial properties of the clip do not match that of the media project. Media projects, in some embodiments, are created as a sequence of media clips arranged in a composite display area (e.g., a display area that shows a graphical representation of a media project, such as along a timeline). The media-editing application renders the media project at a particular resolution (which may encompass both number of pixels in horizontal and vertical directions as well as the aspect ratio of those pixels) specified for the project (sometimes referred to as the output resolution). When a user adds a media clip with a resolution different from this output resolution to the project, the media-editing application of some embodiments automatically applies an effect to the media clip that conforms the clip for output at the particular output resolution of the media project.

In some cases, the image aspect ratio (a function of the pixel dimensions and pixel aspect ratio) of the video project will be different than that of the clip added to the project. Rather than stretching the images, some embodiments allow a user of the application to specify whether to fill the entire output dimensions with the clip's images (thereby cutting off a portion of the image) or to fit the images to the video project output dimensions (thereby leaving unfilled sections of the output dimensions either on top and bottom or on the sides of the image). In addition, some embodiments allow the user to specify an absence of the conform effect, such that the images of the clip are output at the clip's resolution. If the clip resolution is higher than the output resolution, the application will cut off a portion of the images as necessary, and if the resolution is lower than the output resolution, the image will only take up a portion of the output dimensions.

In some embodiments, users can add additional spatial effects to a media clip, including a transform that resizes an image within the output image space. Even when the user-applied transform only modifies the size of the images (e.g., by a particular percentage), the media-editing application stores the automatic spatial conform as a separate effect than the user-applied transform. By decoupling these effects, the application can maintain the user-applied effects on the clip even when the clip is placed in a project with a different resolution.

In fact, some embodiments store all effects parameters in a resolution-independent format. Some embodiments store the parameters as percentages of the output resolution. For example, if a video clip has a 1280×720 resolution, then when a user adds this clip to a 1280×720 video project and then scales the clip to 960×540, this information is stored as an effect on the clip that reduces its size by 75%. When the user copies that clip to a 1920×1080 resolution video project, the clip will be displayed at 75% of the output space (1440×810). Some embodiments store the parameters as percentages of the height of the output space resolution, with the origin in the center. That is, the height always ranges from −50% to 50%, while the width coordinates vary based on the aspect ratio of the output resolution. A 16:9 aspect ratio output space will vary from −88.89% to 88.89%, while a 4:3 aspect ratio output space will vary from −66.67% to 66.67%. The conversion to pixels for a particular output resolution will depend on the number of pixels in each direction. These percentage values can be used to store all manner of data for a video clip: the portion of a cropped clip that the media-editing application should render, the size at which a clip should be rendered, the offset from center at which a clip is rendered, etc.

As mentioned above, in addition to modifying spatial properties, the media-editing application of some embodiments automatically modifies temporal properties of a media clip when the temporal properties do not match that of a media project to which the clip is added. Some embodiments automatically apply a temporal conform effect to a media when the frame rate of the media clip does not match that of the media project. In addition to having a set output resolution, some embodiments define a frame rate for the media project (sometimes referred to as an output frame rate). The frame rate for a project is the number of images rendered per unit of time (e.g., 24 frames per second). When a video clip having a different frame rate is added to the project, the media-editing application uses one of a number of different methods to generate images from the video clip at the requested rate.

When the frame rates are close (e.g., 24 frames per second and 25 frames per second), some embodiments stretch or shrink the video duration so that each image is used once at the output frame rate (e.g., 1 second of 25 fps video played over a duration of 1 and 1/24 seconds). In addition, the application correspondingly stretches or shrinks any audio associated with the video.

When the frame rates are not close enough to each other, some embodiments use different frame mapping algorithms to generate the images at the output rate. That is, for each image needed by the video project, the application generates an image using one or more images of the source video (i.e., the actual video represented by the video clip). In some cases, the application uses some images more than once while in other cases the application skips some of the source images in order to generate the video project at the requested rate.

Some embodiments use one of four different frame mapping algorithms: nearest neighbor, floor, image blending, and optical flow. The nearest neighbor algorithm identifies the image from the source video closest in time to the requested image, while the floor algorithm identifies the image from the source video previous in time to the time of the requested image. The image blending and optical flow algorithms, on the other hand, use multiple source video images to generate an output image. The image blending algorithm of some embodiments blends pixel values of two frames using a weighted average based on how close the time of the requested image is to the times of the source images. The optical flow algorithm uses motion vectors between the two source images closest to the requested image time in order to generate the output image.

The media-editing application of some embodiments allows users to nest media clips. The application uses similar data structures for media clips as for media projects, such that each media clip may contain multiple clips arranged in a manner similar to the clips in a project. Such a compound clip can itself be inserted into another clip or a project and treated as a single clip. In some embodiments, the compound clips have defined resolutions and frame rates, much like clips that represent a single source video file.

When a user adds a compound clip to a project, the media-editing application compares the compound clip's resolution and frame rate to that of the project. When the frame rate of the compound clip is the same as the frame rate of the project, the application does not perform any spatial conform effects within the compound clip, but instead conforms any constituent clips to the project's output resolution directly. This eliminates the potential for images to be scaled down, then up (or vice versa), resulting in loss of picture quality. However, in some embodiments, when the compound clip and the project have different frame rates, a rate conform is necessary. In this case, the application determines the images of the compound clip at the compound clip's frame rate, then uses these images to determine the project images at the project frame rate and resolution. Other embodiments, however, pass the rate conform effects through the compound clip and directly conform the source images to the project frame rate, while passing information about the downstream operations (e.g., using a pixel transform that encapsulates spatial effects applied to the image) so as to avoid unnecessary upscaling and downscaling of images.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 27 illustrates a table that indicates whether to perform a rate conform operation on a media clip by using 1:1 frame mapping.

DETAILED DESCRIPTION

Figure 1:
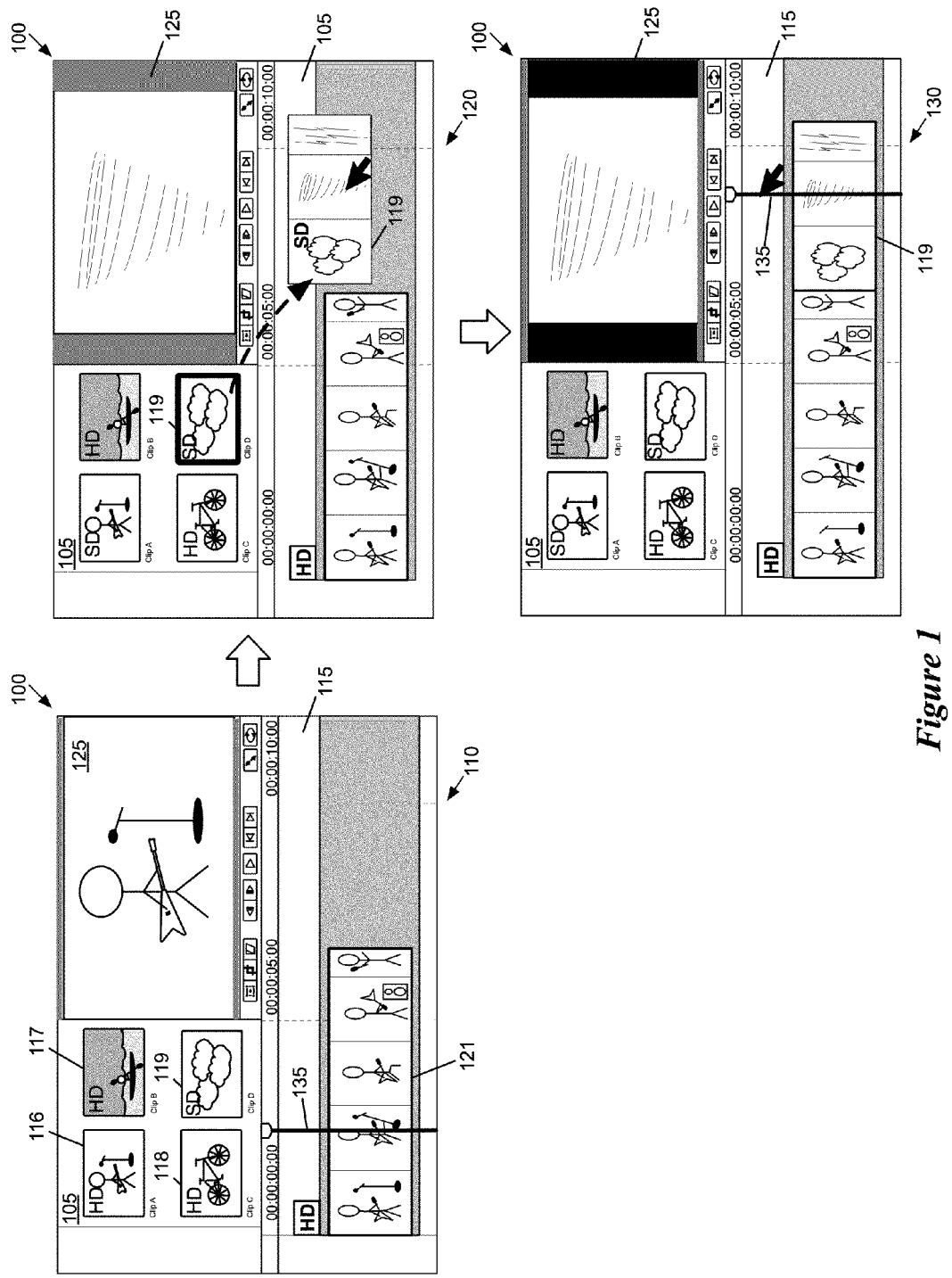
FIG. 1 illustrates a graphical user interface ("GUI") of a media-editing application with an automatic spatial conforming feature.

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a media-editing application that automatically modifies spatial and/or temporal properties of a media clip (e.g., video clip, still image, audio clip, etc.) to match corresponding properties of a media project to which the media clip is added. In some embodiments, the media-editing application applies a first effect to the media clip in order to conform the spatial properties of the clip to those of the media project and a second effect to the media clip in order to conform the temporal properties of the clip to those of the media project. The automatic modification of these clip properties enables a user of the media-editing application to create a media project using clips having a variety of different formats.

A media clip, in some embodiments, is a data structure representing a piece of source media (e.g., the video contained in a video file, the audio contained in an audio file or video file, a still image, etc.). the media-editing application provides graphical representations of these clips to the user, who uses the clips to create a composite media presentation (also referred to as a media project) by editing the clips together. Clips that represent images (either still images or a sequence of video images) have various properties, including resolution (which encompasses the number of rows and columns of pixels in the images as well as the aspect ratio of the pixels) and frame rate (for video, the number of images played per second). The inverse of the frame rate is the duration each video image is displayed when playing the video.

When a user of the media-editing application creates a media project, the project is defined with both a resolution and a frame rate (sometimes referred to as an output resolution and output frame rate). The user can then add media clips to the project and arrange the clips in a sequence in a composite display area (or project display area) of the user interface of the media-editing application. The composite display area of some embodiments includes a timeline along which the user arranges clips for the project (throughout this application, the composite display area is shown as a timeline and often referred to as such). Some embodiments automatically apply a spatial conform effect to a media clip when the resolution of the clip does not match that of the media project (i.e., one or both of the dimensions and pixel aspect ratio does not match). When a user adds a media clip with a resolution different from the output resolution to the project, the media-editing application of some embodiments automatically applies an effect to the media clip that conforms the clip for output at the particular output resolution of the media project.

For some embodiments of the invention, FIG. 1 illustrates a graphical user interface ("GUI") 100 of a media-editing application with such an automatic spatial conforming feature. Specifically, this figure illustrates the GUI 100 at three stages 110-130. The GUI 100 includes a media library 105, a project display area 115, and a preview display area 125. The media library 105 displays a set of media clips available to the user in creating a media project. The media clips may be displayed differently in different embodiments. For instance, the media clips 116-119 in media library display one thumbnail image from the video they represent, and also display a format indicator. The media clips 116-118 are HD clips (e.g., have a resolution of 1920×1080 with square pixels), while the media clip 119 is an SD clip (e.g., has a resolution of 720×480 with a pixel aspect ratio of 10:11).

The project display area 115 provides a visual representation of a media project being created by the user of the media-editing application. Specifically, it displays one or more media clip representations along a timeline for media clips that have been added to the media project. In some embodiments, as shown here, the representations for video clips display one or more images from the video clip. In addition, some embodiments indicate properties of the project in the GUI; here, the project is an HD project (e.g., 1920×1080 square pixels resolution) as indicated in the project display area 115. The user can select clips in the media library 105 and add the clips to the project being created in the project display area 115.

The preview display area 125 displays preview images from media clips in the media library 105 or the project in the project display area 115. Both video clips and the media project represent sequences of images, and the media-editing application plays these images in the preview display area according to user input. In some embodiments, the user can view the media project by moving a playhead 135 over the project in the timeline. In the first stage 110 of FIG. 1, the playhead 135 is at approximately the 2.5 second mark of the project, and the application displays an HD (16:9) image corresponding to this time in the project in the preview display area 125.

The operation of the automatic spatial conform feature will now be described by reference to the state of the GUI during the three stages 110-130. At stage 110, an HD project has been created in the project display area 115. The playhead 135 is currently placed over a location in the project, and an image corresponding to that location is displayed in the preview display area 125. In this case, because the project has an HD format, the 1920×1080 image of the video clip 121 takes up the entirety of the 1920×1080 output image. The gray bars in the preview display area 125 in this stage indicate portions of the display area not used to display the output image.

In the second stage 120, a user is in the process of adding the media clip 119 to the media project by selecting the clip in the media library 105 and dragging the clip into the project display area 115. While this operation is shown as a drag-and-drop operation being performed by a cursor, one of ordinary skill in the art will recognize that similar operations may be performed by using touchscreen operations, and furthermore that additional operations (e.g., selecting a menu option, using a hotkey, etc.) may be performed in the GUI of some embodiments in order to achieve this same result. In fact, this application shows many such operations as being performed in a particular manner (e.g., with a cursor), and one of ordinary skill will recognize that these operations may be performed in a variety of different ways through a variety of different input devices in various different embodiments.

When the user selects the media clip 119, the preview display area 125 displays an image from this clip. Because the clip represents an SD video, the image is displayed in the preview at a 4:3 aspect ratio. In this case, due to the dimensions of the preview display area 125 (which are modifiable in some embodiments), the SD image occupies the entire height of the display area but leaves gray bars on the sides of the display area. In some embodiments, although the images have a particular resolution (e.g., 1920×1080 for the HD image shown at stage 110), these images are scaled down for display in the preview display area while maintaining their aspect ratio.

The third stage 130 illustrates that the media clip 119 has been added to the media project. As the media clip 119 contains 720×480 SD images, while the media project outputs 1920×1080 images, the media-editing application automatically applies a spatial conform effect to the media clip. In the third stage 130, the playhead 135 is over the portion of the media project that includes the media clip 119 (in some embodiments, a copy of the media clip is created). The preview display area 125 still displays a 16:9 aspect ratio image, but this image includes a centered 4:3 image from the media clip as well as black pillars on either side of the 4:3 image.

In this case, the image aspect ratio of the media project is different than that of the media clip added to the project. Rather than stretching the images of the clip, some embodiments allow a user of the application to specify whether to fill the entire output dimensions with the clip's images (thereby cutting off a portion of the image) or to fit the images to the video project output resolution (thereby leaving unfilled sections of the output resolution either on top and bottom or on the sides of the image). In the case shown in stage 130, the fit option is selected. Were the fill option selected, the output image would not include the black pillars, but the top and bottom of the source image would be cut off.

In addition, some embodiments allow the user to specify an absence of the conform effect, such that the images of the clip are output at the clip's resolution. If the resolution is higher than the output resolution, the application will cut off a portion of the images as necessary, and if the resolution is lower than the output resolution, the image will only take up a portion of the output space. In the case shown at stage 130, the source image would be centered and would take up approximately a third of the width and four-ninths of the height.

In some embodiments, users can add additional spatial effects to a media clip in a project, including a transform that resizes an image within the output resolution. Even when the user-applied transform only modifies the size of the images (e.g., by a particular percentage), the media-editing application stores the automatic spatial conform as a separate effect from the user-applied transform. By decoupling these effects, the application can maintain the user-applied effects on the clip even when the clip is placed in a project with a different resolution.

In fact, some embodiments store all effects parameters in a resolution-independent format. Some embodiments store the parameters as percentages of the output resolution. For example, if a video clip has a 1280×720 resolution, then when a user adds this clip to a 1280×720 video project and then scales the clip to 960×540, this information is stored as an effect on the clip that reduces its size by 75%. When the user copies that clip to a 1920×1080 resolution video project, the clip will be displayed at 75% of the output space (1440×810). Some embodiments store the parameters as percentages of the height of the output space resolution, with the origin in the center. That is, the height always ranges from −50% to 50%, while the width coordinates vary based on the aspect ratio of the output resolution. A 16:9 aspect ratio output space will vary from −88.89% to 88.89%, while a 4:3 aspect ratio output space will vary from −66.67% to 66.67%. The conversion to pixels for a particular output resolution will depend on the number of pixels in each direction. These percentage values can be used to store all manner of data for a video clip: the portion of a cropped clip that the media-editing application should render, the size at which a clip should be rendered, the offset from center at which a clip is rendered, etc.

As mentioned above, both media clips and media projects have temporal properties in addition to spatial properties, including a frame rate. When the frame rate of a media clip does not match the output frame rate of a media project to which the clip is added, some embodiments automatically apply a temporal conform effect to the media clip. The frame rate for a project is the number of images rendered per unit of time (e.g., 24 frames per second). When a video clip having a different frame rate is added to the project, the media-editing application uses one of a number of different methods to generate images from the video clip at the requested rate.

Figure 2:
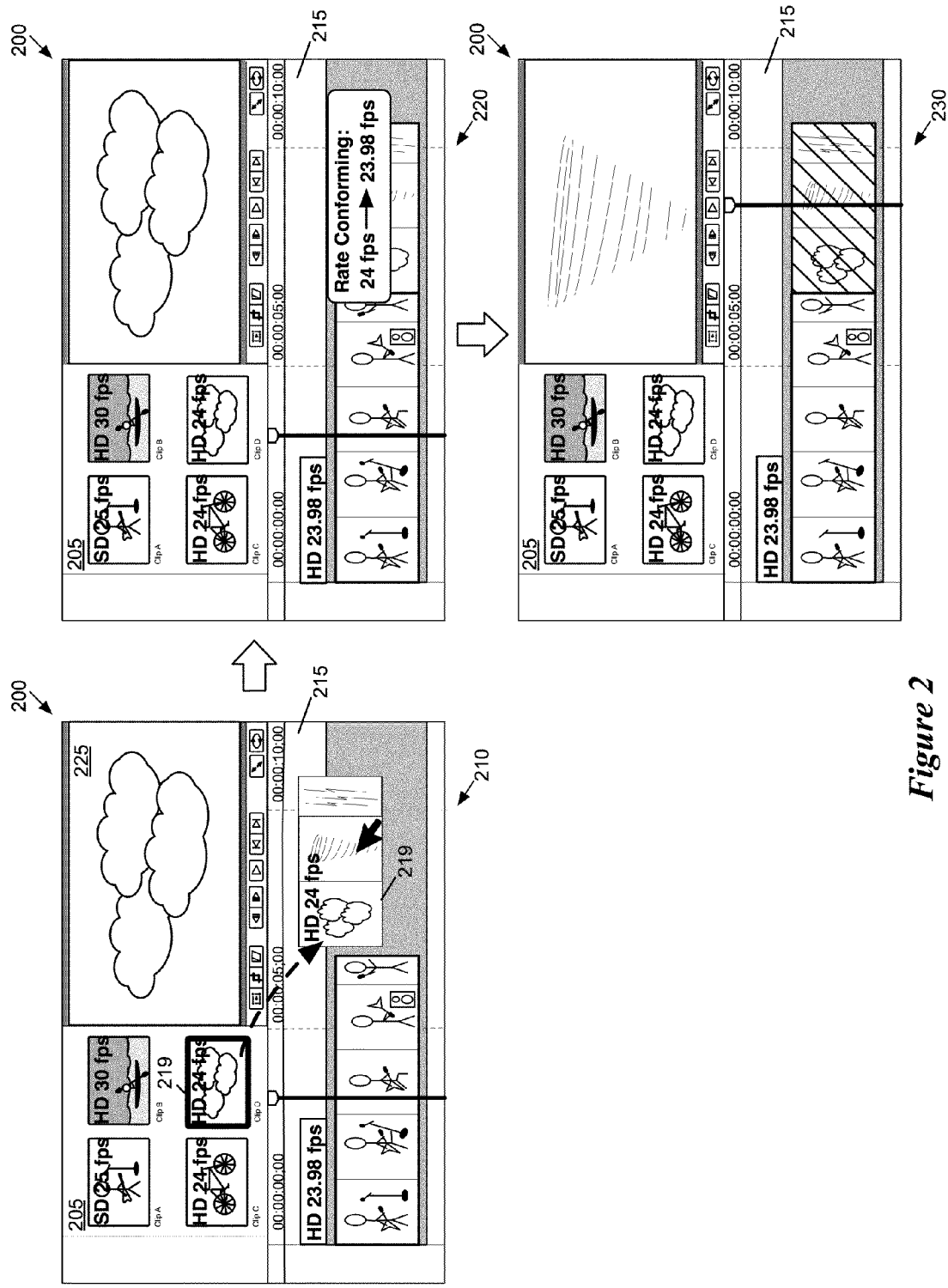
FIG. 2 illustrates a GUI for a media-editing application with an automatic rate conforming feature of some embodiments.

FIG. 2 illustrates a GUI 200 for a media-editing application with an automatic rate conforming feature of some embodiments. Specifically, this figure illustrates the GUI 200 at three stages 210-230 as a user adds a media clip to a media project. Like the GUI 100, the GUI 200 includes a media library 205, a project display area 215, and a preview display area 225. In this case, the media clips in the media library 205 have various different frame rates (24, 25, or fps), in addition to different resolutions.

In the first stage 210, a user is in the processing of adding media clip 219 to the media project by selecting the clip in the media library 205 and dragging the clip into the project display area 215. This clip represents a 24 frames per second video with 1920×1080 images, whereas the media project outputs the same resolution image at 23.98 frames per second.

As a result of the user adding this media clip to the project, the media-editing application automatically applies a rate conform effect to the clip (or, in some embodiments, a copy of the clip that is used in the project), as shown in the second stage 220. The third stage 230 shows that the media-editing application displays the clip in the project with a visual indication that the clip is rate conformed. While this figure graphically illustrates the rate conform, some embodiments do not display an indication in the project display area to show that a clip is rate conformed (or spatially conformed). In some embodiments, clip information is displayed in an inspector display area, and this clip information includes any conform effects applied to the clip.

As stated above, in order to apply a rate conform effect, the media-editing application uses one of a number of different methods to generate images from the conformed clip at the requested rate of the project. When the frame rates are close (e.g., the example of FIG. 2 showing a 24 frames per second clip and a 23.98 frames per second project), some embodiments stretch or shrink the video duration so that each image is used once at the output frame rate (e.g., 1 second of 24 fps video played over a duration 24/23.98 seconds). That is, each image in the video is displayed for 1/23.98 seconds instead of 1/24 seconds. In addition, the application correspondingly stretches or shrinks any audio associated with the video, in order to keep the audio synchronized with the video.

When the frame rates are not close enough to each other, some embodiments use different frame mapping algorithms to generate the images at the output rate. That is, for each image needed by the video project, the application generates an image using one or more images of the source video. In some cases, the application uses some images more than once while in other cases the application skips some of the source images in order to generate the video project at the requested rate.

Some embodiments use one of four different frame mapping algorithms: nearest neighbor, floor, image blending, and optical flow. The nearest neighbor algorithm identifies the image from the source video closest in time to the requested image, while the floor algorithm identifies the image from the source video previous in time to the time of the requested image. The image blending and optical flow algorithms, on the other hand, use multiple source video images to generate an output image. The image blending algorithm of some embodiments blends pixel values of two source images using a weighted average based on how close the time of the requested image is to the times of the source images. The optical flow algorithm uses motion vectors between the two source images closest to the requested image time in order to generate the output image.

Figure 3:
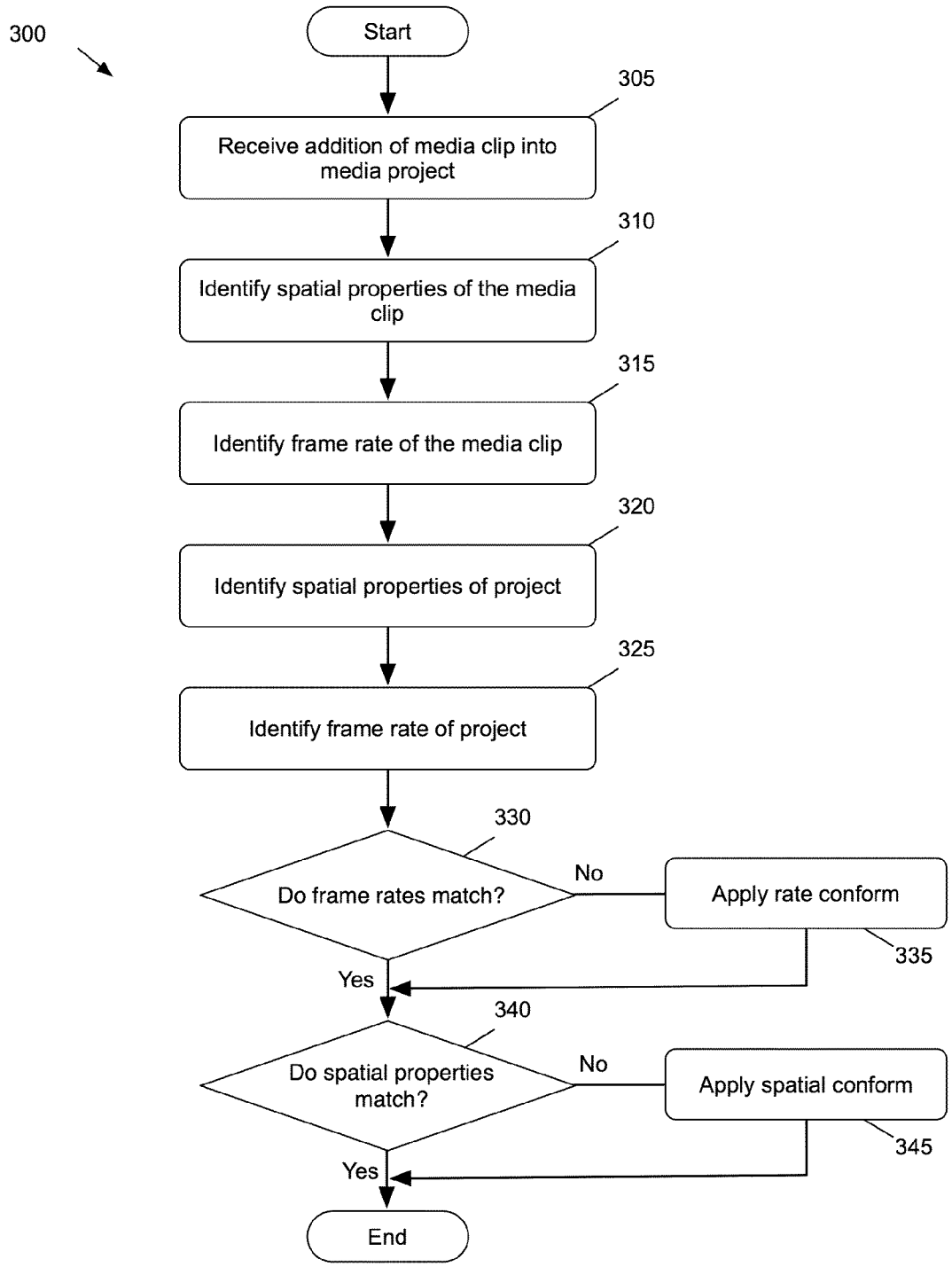
FIG. 3 conceptually illustrates a process of some embodiments performed by a media-editing application to automatically apply spatial and temporal conform effects to a media clip when needed.

FIG. 3 conceptually illustrates a process 300 of some embodiments performed by a media-editing application to automatically apply spatial and temporal conform effects to a media clip when needed. As shown, the process begins by receiving (at 305) the addition of a media clip into a media project. As shown in FIGS. 1 and 2, a user of the media-editing application might drag and drop the media clip from a media browser, select the clip and use a hotkey, menu option, selectable item, etc., in order to add the clip to the media project. In some embodiments, the media clip is a video clip or a still image, as audio clips do not contain images and thus the spatial and temporal conform effects are not applicable.

The process 300 identifies (at 310) spatial properties of the images of the media clip. In some embodiments, the identified spatial properties are the dimensions and pixel aspect ratio of the images of the media clip. The media-editing application of some embodiments does not store an image aspect ratio but rather uses the dimensions and pixel aspect ratio information to derive the image aspect ratio. The process also identifies (at 315) the frame rate of the media clip. Along with the spatial properties, this information is stored as a property of the media clip in some embodiments.

The process 300 identifies (at 320) the spatial properties of the project's output images and identifies (at 325) the output frame rate of the project. These properties may be user-defined for the project in some embodiments. One of ordinary skill will recognize that the identification of the properties in the order shown is only a conceptual illustration, and different embodiments may identify these properties in any order.

Next, the process determines (at 330) whether the frame rates match. When the frame rates do not match, the process applies (at 335) a temporal conform effect to the media clip in the project. This effect defines how the media-editing application generates images at its output frame rate, given the sequence of images of the media clip at its frame rate. As mentioned above, the application may either use a 1:1 frame mapping or a different frame generation technique, depending on the difference in the frame rates.

The process 300 then determines (at 340) whether the spatial properties match. In some embodiments, the application determines whether (i) the pixel dimensions of the media clip's images match the pixel dimensions of the project's output and (ii) the pixel aspect ratio of the media clip's images match the pixel aspect ratio of the project's output. If either of these properties are different between the clip and the project, then a spatial conform is needed. When the spatial properties do not match, the project applies (at 345) a spatial conform effect to the media clip in the project. This effect defines how the media-editing application generates output images for the project given the input images of the media clip, by shrinking or expanding the image, cutting off parts of the image, and/or adding a pillarbox or letterbox.

The above description primarily applies to single clips inserted into a project. The media-editing application of some embodiments allows users to nest media clips. The application uses similar data structures for media clips as for media projects, such that each media clip may contain multiple clips arranged in a manner similar to the clips in a project. Such a compound clip can itself be inserted into another clip or a project and treated as a single clip. In some embodiments, the compound clips have defined resolutions and frame rates, much like clips that represent a single source video file.

When a user adds a compound clip to a project, the media-editing application compares the compound clip's resolution and frame rate to that of the project. When the frame rate of the compound clip is the same as the frame rate of the project, the application does not perform any spatial conform effects within the compound clip, but instead conforms any constituent clips to the project's output resolution directly. This eliminates the potential for images to be scaled down, then up (or vice versa), resulting in loss of picture quality. However, in some embodiments, when the compound clip and the project have different frame rates, a rate conform is necessary. In this case, the application determines the images of the compound clip at the compound clip's frame rate, then uses these images to determine the project images at the project frame rate and resolution. Other embodiments, however, pass the rate conform effects through the compound clip and directly conform the source images to the project frame rate, while passing information about the downstream operations (e.g., using a pixel transform that encapsulates spatial effects applied to the image) so as to avoid unnecessary upscaling and downscaling of images.

FIGS. 1 and 2 illustrate examples of the application of automatic conform effects. Several more detailed embodiments are described below. Section I describes the graphical user interface of the media-editing application of some embodiments, while Section II describes the media-editing application data structures. Section III describes the spatial conform effect of some embodiments. Next, Section IV describes the way in which some embodiments store effect parameters. Section V then describes the rate conform effect of some embodiments, while Section VI describes the application of both rate and spatial conform effects to compound clips. Section VII then describes the software architecture of the media-editing application of some embodiments. Finally, Section VIII describes an electronic system with which some embodiments of the invention are implemented.

I. Media-Editing Application Graphical User Interface

Figure 4:
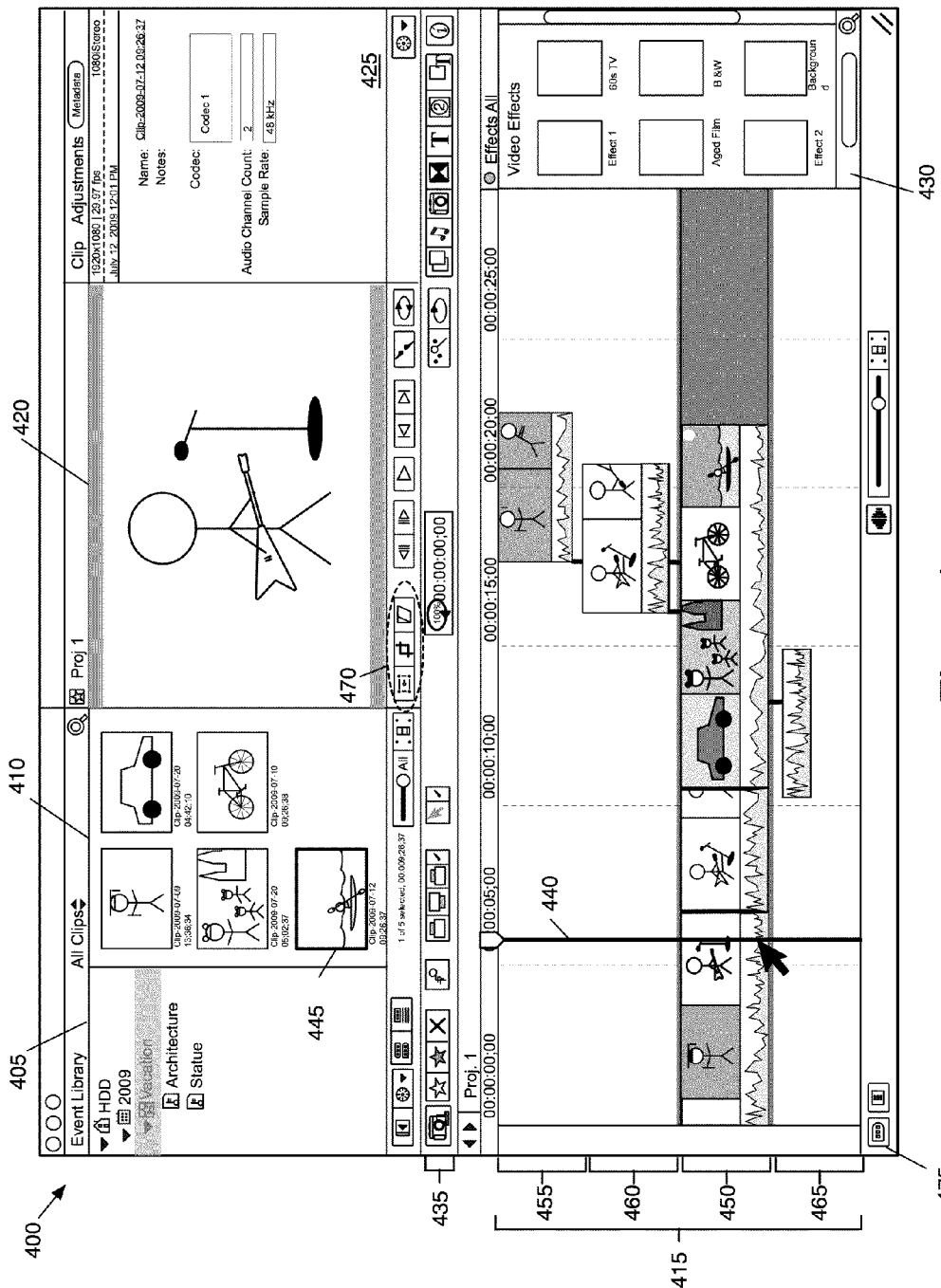
FIG. 4 illustrates a GUI of a media-editing application of some embodiments.

The above figures illustrated a simplified graphical user interface ("GUI") for a media-editing application. FIG. 4 illustrates a GUI 400 of a media-editing application of some embodiments with additional features as compared to those described above. One of ordinary skill will recognize that the graphical user interface 400 is only one of many possible GUIs for such a media-editing application. In fact, the GUI 400 includes several display areas which may be adjusted in size, opened or closed, replaced with other display areas, etc. The GUI 400 includes a clip library 405, a clip browser 410, a timeline 415, a preview display area 420, an inspector display area 425, an additional media display area 430, and a toolbar 435.

The clip library 405 includes a set of folders through which a user accesses media clips that have been imported into the media-editing application. In some embodiments, the user can import media files into the application, at which time media clips are created for the imported files. These files may be imported from a camera, an external drive (e.g., an external hard drive, a flash memory drive, a network drive, etc.), or a drive internal to the device on which the media-editing application operates. The creation of clip data structures will be described in further detail below in Section II.

Some embodiments organize the media clips in the clip library 405 according to the device (e.g., physical storage device such as an internal or external hard drive, virtual storage device such as a hard drive partition, etc.) on which the imported media files represented by the clips are stored. Some embodiments also enable the user to organize the media clips based on the date the media represented by the clips was created (e.g., recorded by a camera). As shown, the clip library 405 includes media clips from 2009 that are stored on the hard disk (in this case, the boot disk of the device on which the media-editing application runs).

Within a storage device and/or date, users may group the media clips into "events", or organized folders of media clips. For instance, a user might give the events descriptive names that indicate what media is stored in the event (e.g., the "Vacation" event shown in clip library 405 might include video footage from a vacation). In some embodiments, the media files corresponding to these clips are stored in a file storage structure that mirrors the folders shown in the clip library.

Within the clip library, some embodiments enable a user to perform various clip management actions. These clip management actions may include moving clips between events, creating new events, merging two events together, duplicating events (which, in some embodiments, creates a duplicate copy of the media to which the clips in the event correspond), deleting events, etc. In addition, some embodiments allow a user to create sub-folders of an event. These sub-folders may include media clips filtered based on tags (e.g., keyword tags). For instance, in the vacation event, all media clips showing statues are tagged by the user with a "statue" keyword, and underneath the "Vacation" folder is a keyword item for this tag.

The clip browser 410 allows the user to view clips from a selected folder (e.g., an event) of the clip library 405. As shown in this example, the event folder "Vacation" is selected in the clip library 405, and the clips belonging to that event are displayed in the clip browser 410. Some embodiments display the clips as thumbnail filmstrips, as shown in this example. By moving a cursor (or a finger on a touchscreen) over one of the thumbnails (e.g., with a mouse, a touchpad, a touchscreen, etc.), the user can skim through the clip. That is, when the user places the cursor at a particular horizontal location within the thumbnail filmstrip, the media-editing application associates that horizontal location with a time in the associated media file, and displays the image from the media file for that time. Furthermore, the user can command the application to play back the media file in the thumbnail filmstrip in some embodiments.

In addition, the thumbnails for the clips in the browser display an audio waveform underneath the clip that represents the audio of the media file. In some embodiments, as a user skims through or plays back the thumbnail filmstrip, the audio plays as well.

Many of the features of the clip browser are user-modifiable. For instance, in some embodiments, the user can modify one or more of the displayed thumbnail size, the percentage of the thumbnail occupied by the audio waveform, whether audio plays back when the user skims through the media files, etc. In addition, some embodiments enable the user to view the clips in the clip browser in a list view instead of the filmstrip view. In this view, the clips are presented as a list (e.g., with clip name, duration, etc.). Some embodiments also display a selected clip from the list in a filmstrip view in the browser (e.g., above the list) so that the user can skim through or playback the selected clip.

The timeline 415 (also called a composite display area or project display area) provides a visual representation of a media project being created by the user of the media-editing application. Specifically, it displays one or more geometric shapes that represent one or more media clips that are part of the composite presentation. The timeline 415 of some embodiments includes a primary lane 450 (also called a "spine", "primary compositing lane", or "central compositing lane") as well as one or more secondary lanes 455-465 (also called "anchor lanes"). The spine 450 represents a primary sequence of media which, in some embodiments, does not have any gaps. The clips in the anchor lanes are anchored to a particular position along the spine (or along a different anchor lane). Anchor lanes may be used for compositing (e.g., combining pixels of one image with pixels of a different image, as done in green-screening), B-roll cuts (i.e., cutting away from the primary video to a different video whose clip is in the anchor lane), audio clips, or other composite presentation techniques.

The user can add media clips from the clip browser 410 into the timeline 415 in order to add the clip to a project represented in the timeline. Within the timeline, the user can perform further edits to the media clips (e.g., move the clips around, split the clips, trim the clips, apply effects to the clips, etc.). When a clip is added to the timeline, some embodiments automatically apply spatial and/or temporal conform effects as described above and in further detail below. The length (i.e., horizontal expanse) of a clip in the timeline is a function of the length of media represented by the clip. As the timeline is broken into increments of time, a media clip occupies a particular length of time in the timeline. As shown, in some embodiments the clips within the timeline are shown as a series of images. The number of images displayed for a clip varies depending on the length of the clip in the timeline, as well as the size of the clips (as the aspect ratio of each image will stay constant).

As with the clips in the clip browser, the user can skim through the timeline or play back the timeline (either a portion of the timeline or the entire timeline). In some embodiments, the playback (or skimming) is not shown in the timeline clips, but rather in the preview display area 420.

The preview display area 420 (also referred to as a "viewer") displays images from media files that the user is skimming through, playing back, or editing. These images may be from a project in the timeline 415 or from a media clip in the clip browser 410. In this example, the user has been skimming through the project in the timeline 415, and therefore the application displays an image corresponding to the time of the playhead 440 in the preview display area 420. As shown, some embodiments display the images as large as possible within the display area while maintaining the aspect ratio of the image.

The preview display area 420 also includes video editing and playback tools in some embodiments. Selectable items are included for rewinding, fast forwarding, playing/pausing, etc. In addition, some embodiments include a set of tools 470 for editing the size and shape of images (e.g., video images) that have been added to a media project. These tools 470 include a transform tool, a crop tool, and a distortion tool. When the transform selectable item is selected, a user can modify the height and width of the clip images within the output image. When the crop selectable item is selected, the user can select the portion of the clip images that are displayed in the output image. When the distortion tool is selected, the user can distort the shape of the clip images in the output image.

The inspector display area 425 displays detailed properties about a selected item and allows a user to modify some or all of those properties. The selected item might be a clip, a composite presentation, an effect, etc. In this case, the clip 445 in the clip browser 410 is selected, and thus the inspector displays information about this media clip. This information includes the clip name, file format, resolution (1920×1080), frame rate (29.97 fps), date created, audio information, etc. for the selected clip. In some embodiments, different information is displayed depending on the type of item selected (e.g., video clip, audio clip, still image, media project, etc.).

The additional media display area 430 displays various types of additional media, such as video effects, transitions, still images, titles, audio effects, standard audio clips, etc. In some embodiments, the set of effects is represented by a set of selectable GUI items, each selectable GUI item representing a particular effect. In some embodiments, each selectable GUI item also includes a thumbnail image with the particular effect applied. The display area 430 is currently displaying all of the video effects that a user can apply to a clip.

The toolbar 435 includes various selectable items for editing a project, modifying what the application displays in one or more display areas, etc. The right side of the toolbar includes various selectable items for modifying the type of media displayed in the additional media display area 430. The illustrated toolbar 435 includes items for video effects (currently selected), visual transitions between media clips, photos, titles, generators and backgrounds, etc. In addition, the toolbar 435 includes an inspector selectable item that toggles the display of the inspector display area 425 as well as items for applying retiming operations to a clip, adjusting color, and other functions.

The left side of the toolbar 435 includes selectable items for media management and editing. Selectable items are provided for adding clips from the clip browser 410 to the timeline 415. In some embodiments, different selectable items may be used to add a clip to the end of the spine, add a clip at a selected point in the spine (e.g., the location of a playhead), add an anchored clip at the selected point, perform various trim operations on the media clips in the timeline, etc. The media management tools of some embodiments allow a user to mark selected clips as favorites and add keyword tags to clips in the clip browser, among other options.

In some embodiments, the timeline 415 can be toggled with other display areas. For instance, the GUI 400 also includes a project library toggle item 475 which, when selected, replaces the timeline 415 with a project library in the GUI. The project library of some embodiments displays a list of current projects that a user can select and edit. In some embodiments, selecting one of the projects in the project library causes the timeline 415 to replace the project library with a representation of the selected project. In addition, some embodiments allow users to create a new media project through the project library.

Figure 5:
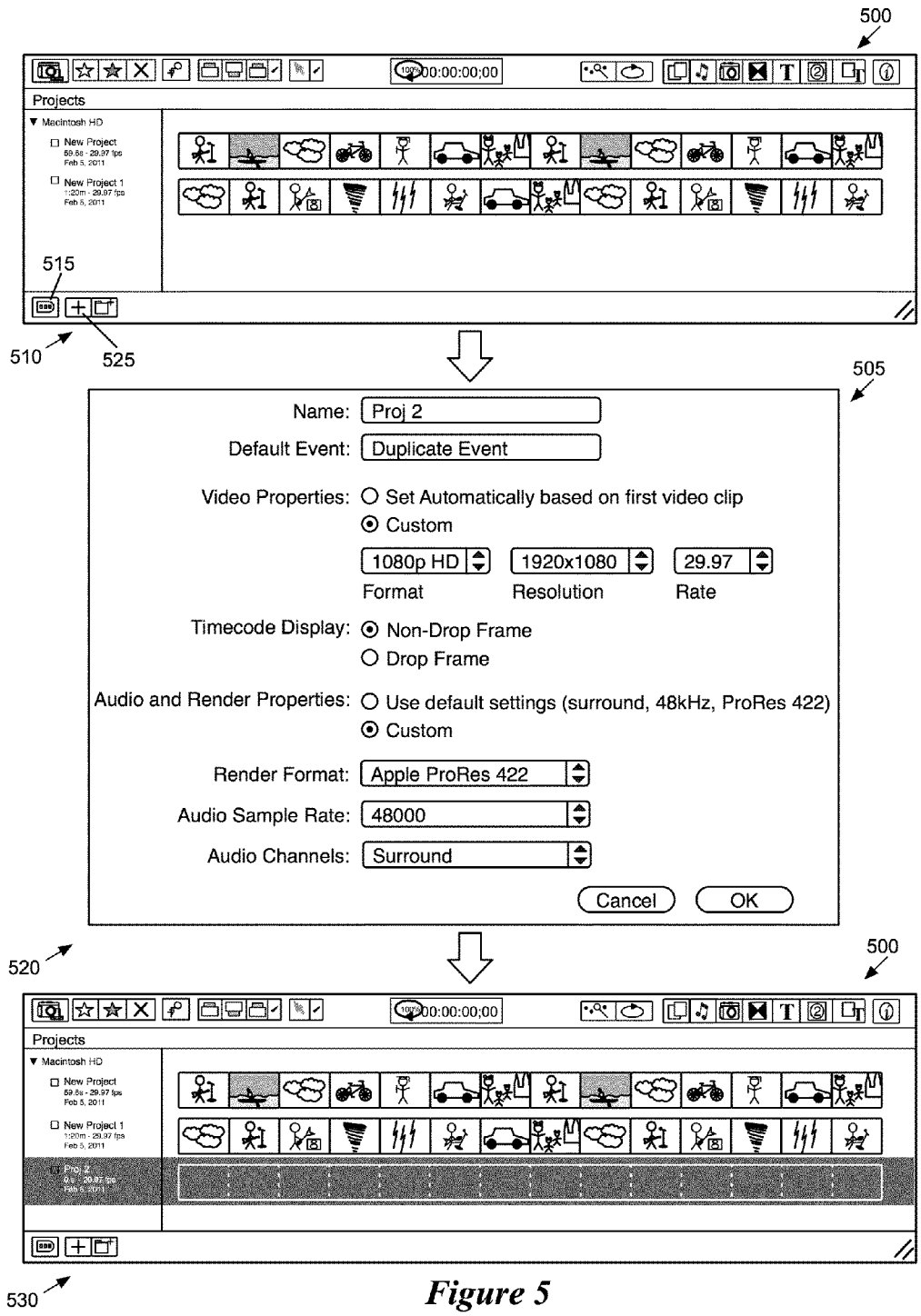
FIG. 5 illustrates the creation of a new project in the GUI of a media-editing application of some embodiments using the project library.

FIG. 5 illustrates the creation of a new project in the GUI of a media-editing application of some embodiments using the project library 500 in three stages 510-530. Specifically, the stages illustrate the opening of a project creation dialog box 505 and the user of that dialog box to create the new project.

The first stage 510 illustrates the project library 500, which as mentioned may occupy the same portion of the media-editing application GUI as the timeline 415. The GUI includes a project library/timeline toggle item 515 (similar to the toggle item 475 shown in FIG. 4) that allows a user to toggle between the timeline and the project library in this section of the GUI, as well as a new project GUI item 525 the selection of which begins the process for creating a new project. Some embodiments provide these options as different types of selectable items, as menu selections, as hotkey selections, or a combination thereof.

The project library 500 displays a list of projects on its left side. In this case, there are two projects that have been previously created. With the name of the project, the library 500 also displays information about the project. In this case, the information includes the date the project was created, the length of the project, and the frame rate of the project. Other embodiments may display other information, such as the last time the project was edited, the output format, output resolution, etc. For each project, the library displays a filmstrip as a set of images for the project. In some embodiments, these images represent frames from the composite presentation that are evenly spaced throughout the project. As shown at stage 510, the user has placed a cursor over the new project user interface item 525 and selected this item in order to create a new project.

The second stage 520 illustrates a dialog box 505 that appears when the user selects the new project item 525. This dialog box allows the user to enter information about a new project. The user can enter a name for the project (in this case, "Proj 2"), select a default event for the project, and set video properties, render properties, and audio properties. The default event, in some embodiments, is the event to which the project automatically imports a media file when a user edits the media file into the project from a source other than an event. For instance, a user might drag and drop a video or audio file (e.g., from their desktop or other folder) into the timeline for a project. Doing so, in some embodiments, will cause the application to automatically import the file as an asset of the default event.

As shown, the user can also either select to use the video properties of the first clip added to the project as the video properties for the project, or select custom properties for the project. In the case shown in FIG. 5, the user has chosen to set custom properties. The format field lets the user choose a format (e.g., 1080p, 1080i, 720p, various standard definition formats, etc.) for the project. The options presented in the resolution and rate fields are dependent on the selected format in some embodiments, so as to ensure settings that match up with a regularly-used video format. For the selected 1080p HD, for example, the resolution options are 1920×1080, 1440×1080, and 1280×1080, while the frame rates are 23.98, 24, 25, 29.97, 30, 50, 59.94, and 60 frames per second. Other formats are more restrictive: for instance, if the user selects NTSC SD, then only frame rates of 23.98 and 29.97 frames per second are available as options. When the user instead chooses to set the properties automatically based on the first video clip, this ensures that at least the first clip added to the project will not require a conform effect. In many cases, the user will add many clips captured from the same camera in the same format, so conform effects can be avoided for all of these clips.

The audio and render properties include a render format (in this case, the user has chosen Apple ProRes 422, though other options are available). The render format, in some embodiments, is the encoding format used for cache files that are prepared to simplify playback (i.e., prepared ahead of time and used during playback). The audio properties include an audio sample rate, and the choice between surround and stereo for audio channels. The user can also select to use default settings (in this case, the options currently selected). Some embodiments provide an option to use settings from the most recently created or edited project.

The third stage 530 illustrates the result of the user selecting the OK item in the dialog box 505 in order to create the new project "Proj 2" with the properties shown in the dialog box. The project library now shows a third project, the newly created "Proj 2". At this point, the user has not yet added any media clips to the project, so its filmstrip is blank. With the new project created, the user can add media clips to the project, and the media-editing application of some embodiments will apply the spatial and temporal conform effects to these clips as necessary.

II. Media-Editing Application Data Structures

The above section describes various items in the user interface of the media-editing application of some embodiments, including events, media clips, and projects. Events contain media clips, which can be added to projects. In some embodiments, the media-editing application creates and stores various data structures to represent these different items.

Some embodiments create an initial set of data structures for each media file upon import of the file into the media-editing application. When a set of media files are imported together, the media-editing application of some embodiments generates media clips and prompts the user as to whether to add the clips to an existing event or create a new event for the clips. The import process of some embodiments is described in further detail in the U.S. patent application Ser. No. 13/111, 912, filed May 19, 2011 and entitled "Data Structures for a Media-Editing Application", which is incorporated herein by reference.

For each imported media file, the application creates a series of data structures. In some embodiments, the application creates an asset data structure for each file in the event to which the files are added. The asset stores a reference to the file and any additional files created upon import (e.g., transcoded versions of the media file, analysis data about the media file, etc.). The application also creates a component clip data structure that stores a reference to the asset and event containing the asset. When the imported file contains both audio and video data, some embodiments create component clips for the video and the audio, each of which refer to the same asset. When this is the case, the application creates another clip data structure that contains the component clips.

Figure 6:
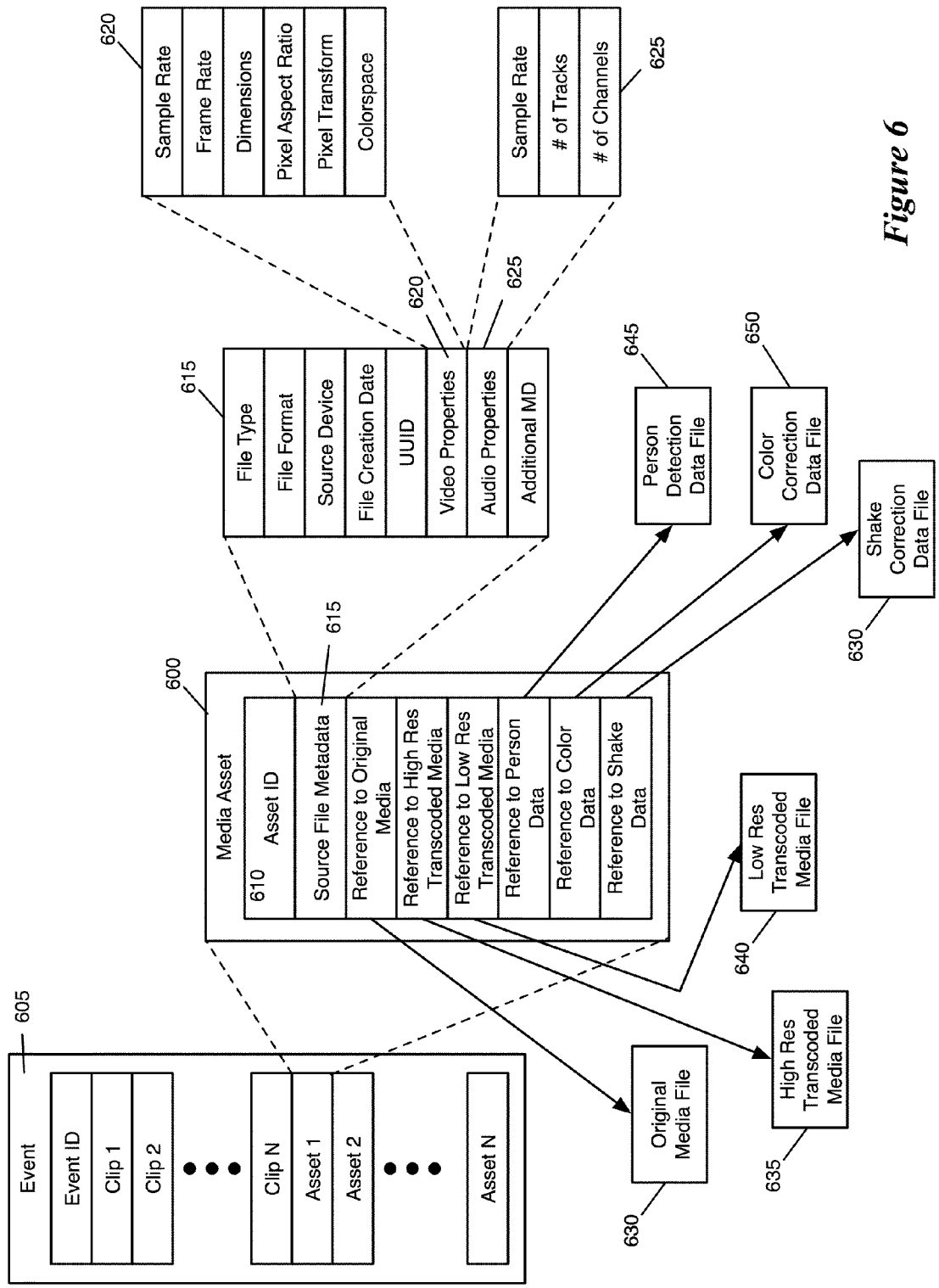
FIG. 6 conceptually illustrates an asset data structure for a video asset, as well as an event data structure for an event that contains the video asset.

FIG. 6 conceptually illustrates an asset data structure for a media asset, as well as an event data structure 605 for an event that contains the media asset. In this example, the media file referenced by the asset is a video file with audio channels (e.g., a ".mov" file). The event data structure 605 includes an event ID, a list of assets, and a list of clips. The event data structure may include additional fields in some embodiments, such as the event name, event date (which may be derived from asset information), etc. The event data structure 605 may be a CoreData (SQLite) database file that includes the assets and clips as objects defined with the file, an XML file that includes the assets and clips as objects defined with the file, etc.

The media asset 600 includes an asset ID 610, source file metadata 615, and references to various files. These files include an original imported media file 630, any transcoded versions of the media file (e.g., a high resolution version 635 and a low resolution version 640), and any analysis data about the media file (e.g., a person detection data file 645 that identifies images in the source video with people in them, a color correction file 650 that stores automatic color balancing data, a shake correction file 630 that identifies and corrects camera shake in the video, audio correction files, etc.).

The metadata is information about the source file and its stored media in some embodiments. As shown, the source file metadata 615 includes the file type (e.g., audio, video, movie, still image, etc.), the file format (e.g., ".mov", ".avi", etc.), the source device (i.e., the device that created the media, such as the particular type of camera on which a movie file was captured), the file creation date (e.g., the date a video was captured), a UUID (a unique identifier generated by a media creation device such as a camera), a set of video properties 620, a set of audio properties 625, and additional metadata. Different types (or manufacturers) of cameras create different UUIDs differently. These may be hashes of various data in some embodiments, such as a camera ID, record time (e.g., the time a user of the camera started recording, the duration of the video), etc., so long as all UUIDs are unique.

The video properties 620 of some embodiments include such properties as a sample rate, a frame rate, the dimensions (or resolution) of the image (i.e., the number of pixels horizontally and number of rows of pixels), the pixel aspect ratio (i.e., the shape of the pixels, which may be square (HD video) or rectangular (e.g., NTSC 4:3 video has a ratio of 10:11)), a pixel transform (described in detail in U.S. patent application Ser. No. 13/111,912, now published as U.S. Patent Publication 2012/0209889, incorporated by reference above), and the colorspace in which pixel values of the image are defined (e.g., ITU-R BT.709 for HD, ITU-R BT.601 for SD, etc.).

The audio properties 625 of some embodiments include a sample rate (i.e., the number of audio samples per second, often 48 kHz), the number of audio tracks stored in the underlying media file, and the number of audio channels stored in the underlying media file. In some embodiments, the asset may additionally store override data that modifies one or more of the video or audio properties. For instance, a user might enter that a media file actually has a frame rate of 24 frames per second, even though the file's metadata, stored in the asset, indicates that the video's frame rate is 23.98 frames per second. When presented to the user, or used within the application (e.g., for the automatic application of a rate conform effect), the override will be used and the media file will be treated as having a frame rate of 24 fps.

Figure 7:
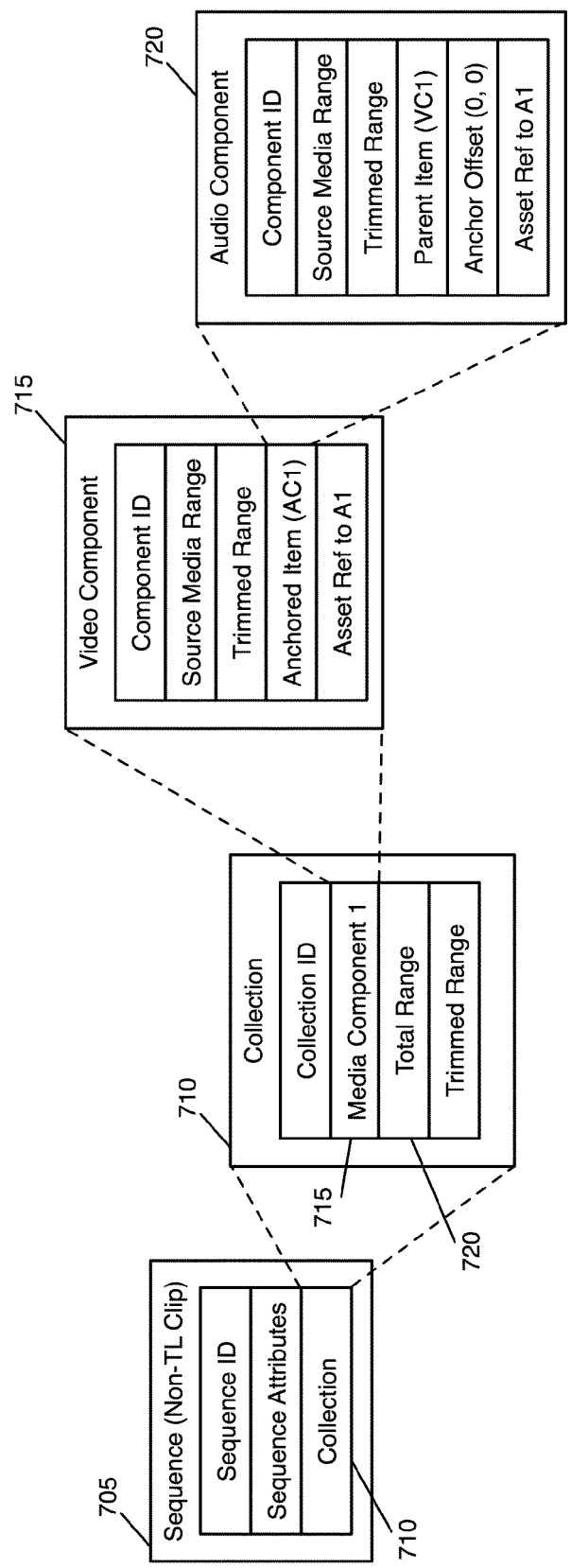
FIG. 7 conceptually illustrates a nested sequence of clip objects created by the media-editing application of some embodiments for an imported media file.

As stated, when the media-editing application imports a media file, some embodiments create a nested set of data structures. FIG. 7 conceptually illustrates a nested sequence of clip objects created by the media-editing application of some embodiments for an imported media file. In some embodiments, each of the clip objects shown in this figure is a member of the same class, though the objects may be of different sub-classes. The media file the clip structure of which is illustrated in FIG. 7 is a movie file that stores both audio and video information.

The figure illustrates a sequence 705, a collection 710, and two components 715 and 720. As mentioned, in some embodiments the sequence 705, collection 710 and components 715 and 720 are sub-classes of clip objects (or anchored objects). Some embodiments create a sequence (which may be another clip object or a different class of object) within the event object for each media file imported into the event. The sequence 705 stores a sequence ID, a set of sequence attributes, and the collection object 710. The sequence ID is a unique identifier for the sequence object. The sequence attributes, in some embodiments, include the resolution, frame rate, and other video and audio properties for the sequence. For event clips, these attributes are generally based on the underlying media (i.e., the information stored in the asset that is linked to through the collection and component clips.

The collection object 710 is an ordered array of clip objects. In the case of a clip imported into an event, as is the case with the object 710, the collection stores one or more component clips in the array. Often, the collection stores the video component clip in the array, as shown here; any additional components (generally one or more audio components) are then anchored to that video component. In addition, the collection object 710 stores a collection ID, a total range, and a trimmed range. The collection ID is a unique identifier for the collection object. The total range of a clip object indicates the maximum range for the object based on the objects it contains, while the trimmed range indicates the actual range of the object in its parent object according to user edits. In some embodiments, the collection object stores a value for the total range because the total range is a variable assigned to all types of clip objects, but this range is not actually used by the application. Instead, the application dynamically calculates the total range based on the objects contained by the collection (as opposed to updating the range value every time a clip is added to the collection). Some embodiments, on the other hand, do update the total range in the collection object. The array of the collection object 710 contains the media component 715. Collection objects, in some embodiments, can contain both component clip objects and additional collections in their arrays.

In the above paragraph and elsewhere in this section, a first object (e.g., the collection object 710) is described as containing a second object (e.g., a media component 715 in the array of collection object 710). In some embodiments, a first object contains a second object by storing a reference to the object (e.g., a pointer). This reference is stored as a strong pointer in some embodiments.

The media components shown include a video component 715 and an audio component 720. Each of the components stores a component ID, a source media range (i.e., total range), a trimmed range, and an asset reference (that refers to an asset such as the asset 600 and the event containing the asset). For a component clip that refers to a media asset, the total range is the duration of the source media. The trimmed range is the range selected by a user through various user edits (e.g., trim edits) and indicates both the start time within the total range and the duration, in some embodiments. The trimmed range is generally a subset of the total range (i.e., does include time outside the total range). However, in some embodiments, the application may use a range extender to extend the trimmed range past the total range (e.g., when needed for part of a transition, or if aligned audio runs slightly longer than video). Some embodiments will generate video images using, e.g., the first and last images of the video file, to fill in the needed extra range. When a clip is initially imported into the application, the total range and trimmed range will generally be equal as the user will not have edited the clip at all yet.

The video component 715 includes an anchored item set that contains the audio component 720. As described above by reference to the timeline 415 in the user interface 400 of FIG. 4, clips can be anchored to other clips in some embodiments. When a particular clip is moved in a timeline, any clips anchored to the particular clip are moved along with it. Each clip can have numerous anchored clips, and can be anchored to a single clip. In the case of a media clip with audio and video components, some embodiments anchor the audio component to the video component. Thus the video component object 715 contains the audio component in its set of anchored items (and could include numerous such items if there were additional audio components), while the audio component object 720 includes a parent item reference to the video component to which it is anchored. In addition, the child (anchored) object stores an anchor offset that indicates two values. The first value is the position in the parent object to which the child object is anchored, and the second value is the offset of the anchor within the child object. In the case of an imported media file, the audio and video components will start at the same time, and thus both anchor offset values are zero. However, this can be modified if, for example, there is a slight offset in the recordings of the two components and the user has to adjust the audio relative to the video.

The above FIGS. 6 and 7 illustrate the data structures for an object imported into an event in the media-editing application. When media clips are added to a media project, nested within compound clips, etc., the data structures created by the media-editing application may be more complicated.

Figure 8:
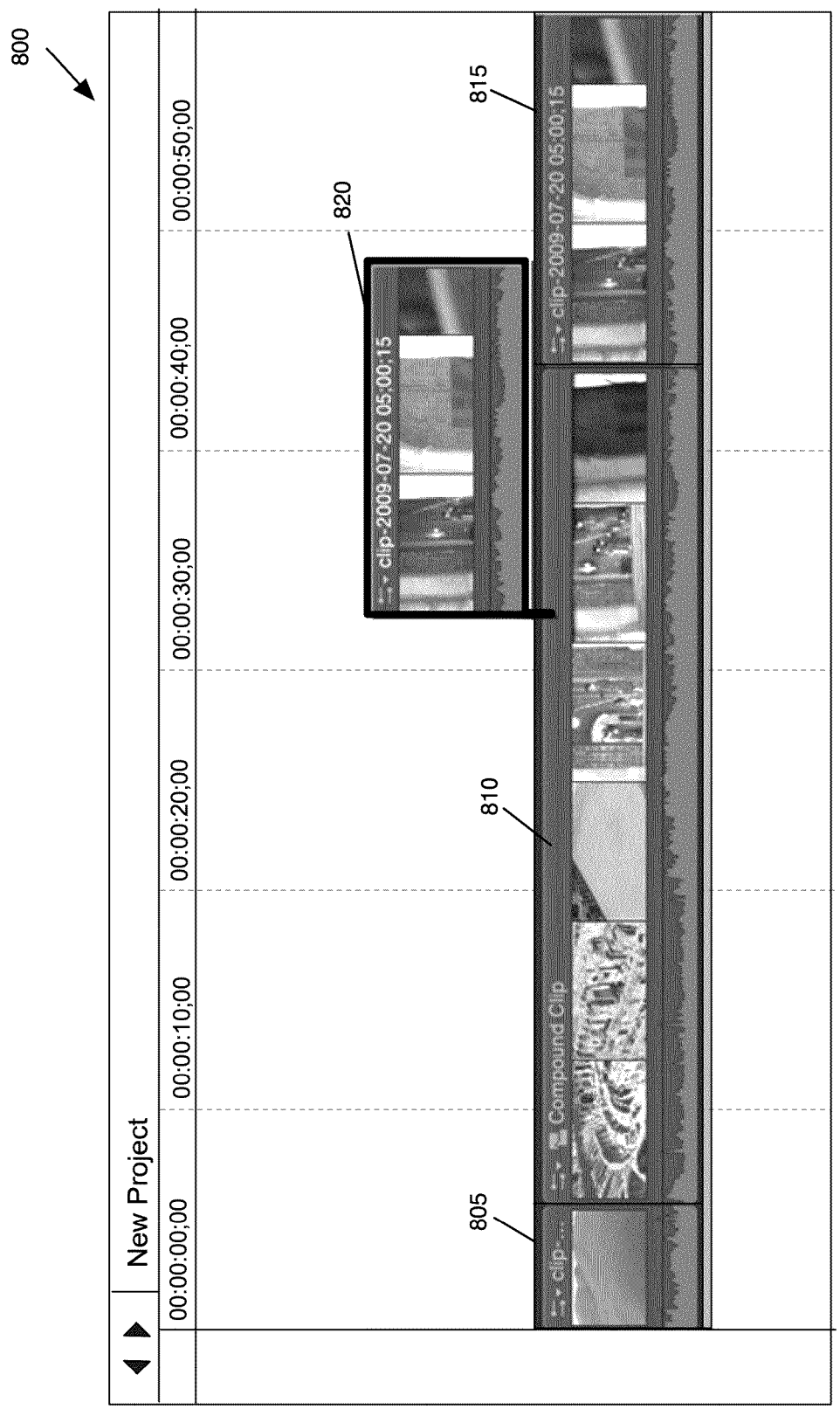
FIG. 8 illustrates a timeline that includes four clips.

FIG. 8 illustrates a timeline 800 with a project title "New Project" that includes four clips 805-820. The clips 805-815 are in the primary compositing lane of the project's sequence, while the clip 820 is anchored to clip 810 at approximately 26 seconds into clip 810. The clip 810 is a compound clip that itself includes two clips.

Figure 9:
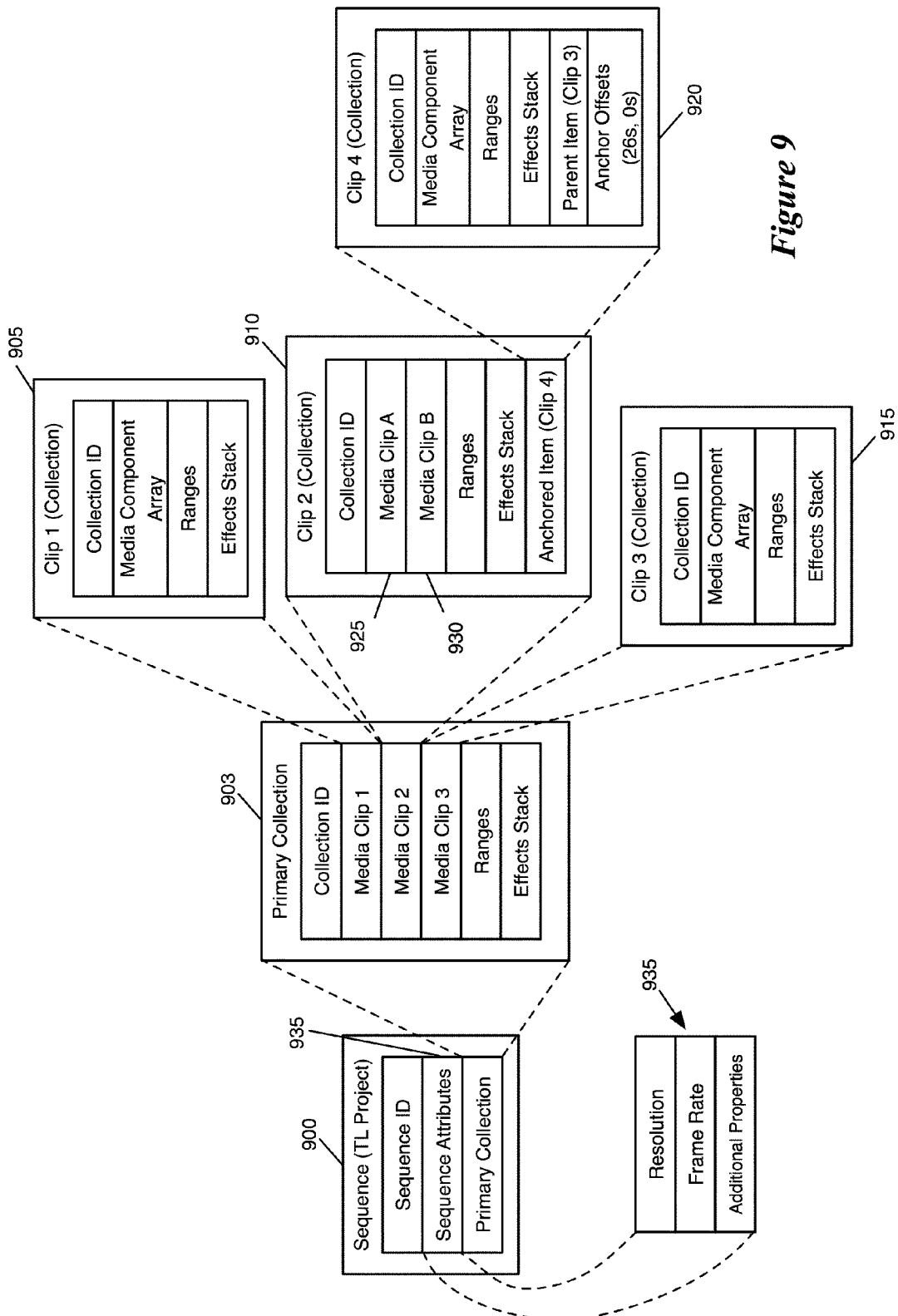
FIG. 9 conceptually illustrates a subset of the data structures for the project illustrated in FIG. 8.

FIG. 9 conceptually illustrates a subset of the data structures for the project illustrated in FIG. 8. In some embodiments, the data structures of FIG. 9 are all contained within a project data structure that contains a single sequence 900. In some embodiments, the project data structure for a project in the timeline is a sub-class of the same class that includes event data structures. While the event data structures can contain multiple sequences (i.e., one sequence for each clip in the event), the project data structure can only contain one sequence.

The sequence 900 includes a primary collection data structure 903, which itself stores an array containing three collections 905-915 that correspond to the clips 805-815 in the timeline 800. In addition, the fourth clip 820 is contained within the collection 910. For simplicity, the component objects are not shown in this figure. The sequence 900 includes a sequence ID, sequence attributes 935, and a primary collection 903. These sequence attributes 935 include the video properties set for the project, such as the resolution, frame rate, and other additional properties (e.g., format, render properties, audio properties, etc.). As shown in the previous Section II, in some embodiments these properties can be set by a user when creating the project.

The primary collection 903 includes a collection ID, ranges (i.e., the total and trimmed ranges described above), an effects stack (which, in some embodiments, represents a video effects stack and an audio effects stack), and the array of media clips. In some embodiments, the array is ordered based on the location in the timeline and only includes media clips in the primary lane of the collection. The media-editing application assumes that there is no gap between these items, and thus no timing data is needed between the items. As shown, each of these clips is represented as a collection. When a clip stored in an event (e.g., the clip shown in FIG. 7) is added to a project in a timeline, some embodiments remove the sequence container data structure (e.g., structure 705) and copy the rest of the structure (i.e., the collection and its components) into the timeline collection. The effects stack stores a set of effects applied to the media clip. These effects may include automatically applied rate and spatial conform effects, user-initiated transform, crop, and distortion effects, pixel-manipulating effects (i.e., effects that modify pixel values of the images of the clip according to different algorithms, etc.).

The clips 905, 915, and 920 are individual clips that have been added to the timeline from the clip browser, and thus do not themselves include collections. Similar to the collection 710, these objects include an ID, ranges, an effects stack, and an array of media components (e.g., a video component with one or more audio components anchored to the video component).

The clip 910 is a compound clip that includes multiple clips in its array, in addition to the collection ID, ranges, and effects stack. Specifically, the clip 910 includes two media clips 925 and 930. Within the compound clip, the clips are both in the primary lane of the collection, and thus one follows the next. These clip objects are not shown in this figure, but each of the clips is similar to the clip 905 in that the clips each include an array of media components. In addition, the clip object 910 includes a set of anchored items (in this case only the one item, clip 920). Some embodiments include a set of anchored items for each collection, which are empty for the other objects shown in FIG. 9. The anchor offset stored in clip 920 indicates that it is anchored 26 seconds into the clip 910, and that the anchor is at the start of the clip 920. These times refer to the trimmed ranges of the clips in some embodiments.

Figure 10:
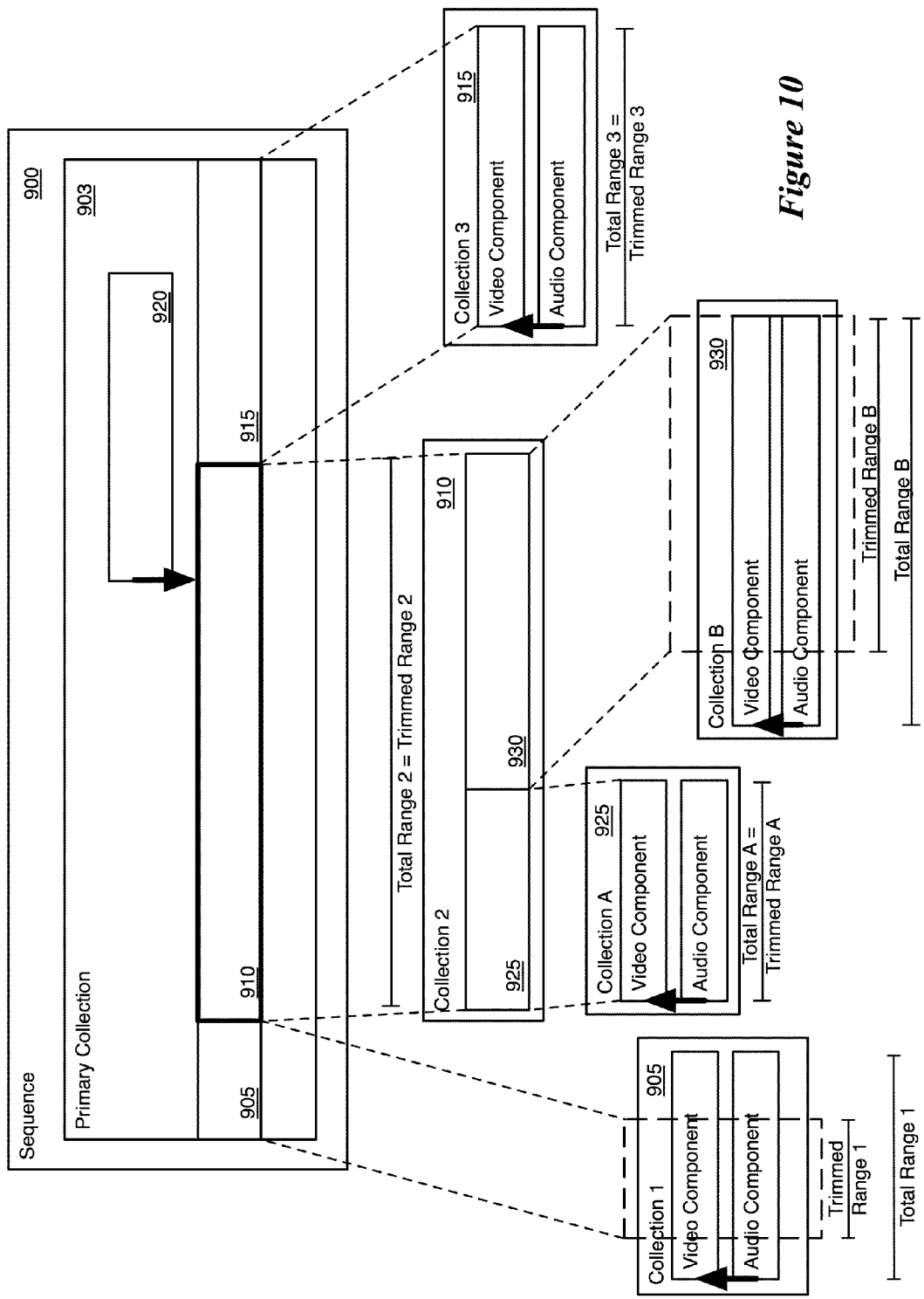
FIG. 10 conceptually illustrates the objects nested in a conceptual timeline.

FIG. 10 conceptually illustrates the objects 900-930 nested in a conceptual timeline. As shown, the collection objects 925 and 930 are nested inside the collection 910, which is nested inside the primary collection object 903 along with the other collection objects 905, 915, and 920. The sequence's primary collection object 903 is itself nested inside the sequence object 900.

The figure illustrates the anchoring relationships between the various clips as well as the durations (ranges) of the clips. The lowest level collections 905, 915, 925, and 930 each have an audio component anchored to a video component. While not shown, collection 920 could also have the same video/audio setup, or could be just a video component (or just an audio component). While each of the objects shown has a single audio component, one of ordinary skill will recognize that some embodiments will have multiple audio components (e.g., if a camera records several audio tracks as separate files and imports the files with a video file as part of a single clip).

The figure also illustrates the anchoring of clip 920 to clip 910. In some cases, multiple clips will be anchored to the same primary lane clip, and the multiple anchored clips may overlap in time. In this case, multiple secondary lanes may be used. Some embodiments assign lane numbers to each clip object that indicates the clip object's lane within a collection.

All of the primary lane objects are assigned a lane number of zero in some embodiments, with lanes above the primary lane getting increasing numbers and lanes below the primary lane getting decreasing (negative) numbers. For instance, a separate audio clip might be anchored to a clip in the primary lane and displayed below the primary lane. In this case, within the primary collection 903, the anchored clip 920 has a lane number of 1. The lane numbers indicate compositing order for video in some embodiments. Whereas two audio files can be combined fairly easily (mixed), images from two video files cannot be displayed at the same time. Thus, some embodiments composite higher lane number clips on top of lower lane number clips. If no compositing effect is defined between two clips at the same time, then the clip in the higher lane will be displayed. However, various compositing modes and effects may be used to combine the pictures (e.g., compositing modes such as subtract, darken, multiply, etc. that combine pixel information of two images, as well as effects such as scaling the top image to get a picture-in-picture, applying a color mask to the top image, etc.).

The items in a lower-level nested collection will also have lane numbers that refer to their lane order within that collection. For example, the collection object 910 has two clips 925 and 930, that each have a lane number of zero. However, this collection object could have anchored clips in multiple lanes. For the purpose of compositing at time of rendering, the items within the collection 910 would be composited initially according to the ordering within the collection, then the output of that would be composited within the primary collection according to the ordering of the primary collection. However, as described below in Section VI, certain effects are not applied within the compound clip, based on the properties of the clip (or clips) containing the compound clip. Similarly, for each of the lowest-level collections (e.g., collection 905), the video components are all lane zero and the audio components are lane −1.

FIG. 10 also illustrates the ranges (e.g., durations) of the various clip objects. For the lowest level collections and their components (e.g., collections 905, 915, 925, 930, and 920), the total range is the full length of the media to which the components refer, whereas the trimmed range is a subset of this range based on user edits (e.g., trim edits). In this case, collections 915 and 925 are not trimmed at all, whereas collection 905 is trimmed on both sides and the start of collection 930 is trimmed.

For collection 910, the total range is the sum of the trimmed ranges of its primary lane clips, which in this case are collections 925 and 930. Thus, the variable Total Range 2=Trimmed Range A+Trimmed Range B. In this case, the collection 910 is not separately trimmed, such that its trimmed range equals its total range. This means that, although there is more media within clip 930, while editing the primary collection 903 the media-editing application will not allow a user to increase the duration of clip 910 beyond that of Total Range 2. However, a user could open up the clip 910 in the timeline and apply trim edits to either of clip 925 and 930. Modifications to the trimmed range of these clips will affect the total range of the clip 910. In addition, within the primary collection 903, a user can modify the trimmed range of clip 910 to shorten the clip. Trimming from the beginning would result in less of the media of collection 925 being used in the component presentation, while trimming from the end would result in less of the media of collection 930 being used in the composite presentation.

The above figures illustrated various properties of certain types of clip objects. One of ordinary skill in the art will recognize that some embodiments may use additional different subclasses of clip objects. For instance, some embodiments store generators (effects that create their own video images rather than modifying existing video images), transitions between clips, audition stacks (sets of clips that can be swapped out for each other), markers, and keywords as clip objects. The above-described data structures (e.g., the clip objects, asset objects, event objects, project objects, etc.) are used by some embodiments of the media-editing application for displaying information in the GUI of the application and rendering a project, as well as for determining whether to apply a spatial or temporal conform effect to a clip.

III. Automatic Spatial Conform

The previous sections described the user interface of a media-editing application of some embodiments as well as the data structures used by the application to store information about media clips, media projects, etc. As described above, some embodiments automatically spatially conform source images of a media clip to output images of a project when the spatial properties are different between the source and output images.

Figure 11:
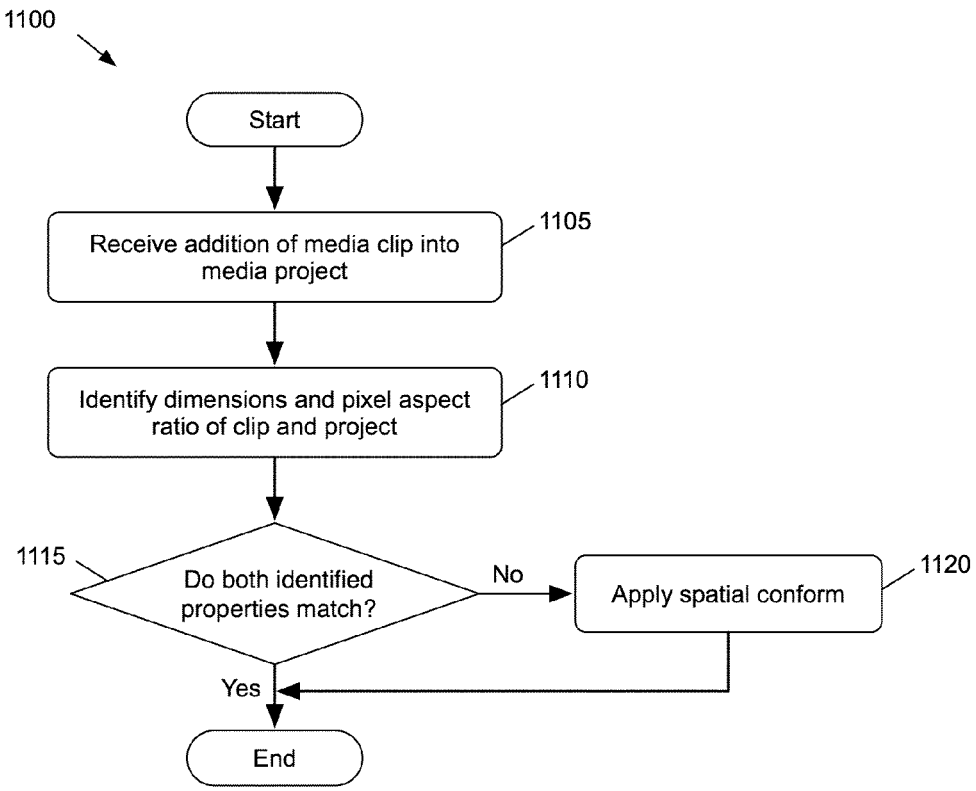
FIG. 11 conceptually illustrates a process of some embodiments for automatically applying a spatial conform effect.

FIG. 11 conceptually illustrates a process 1100 of some embodiments for automatically applying a spatial conform effect. The process 1100 is similar to portions of the process 300 described above, and is performed by the media-editing application of some embodiments. This process will be described by reference to FIG. 12, which conceptually illustrates two different image formats that have different spatial properties.

As shown, the process 1100 begins by receiving (at 1105) the addition of a media clip into a media project. As shown in FIGS. 1 and 2, a user of the media-editing application might drag and drop the media clip from a media browser, select the clip and use a hotkey, menu option, selectable item, etc., in order to add the clip to the media project. In some embodiments, the media clip is a video clip or a still image, as audio clips do not contain images and thus the spatial conform effects are not applicable. When a clip is added from an event to the primary lane of a media projects, some embodiments make a copy of the clip's data structures from the event, remove the sequence container structure, and add the duplicated set of structures (without the sequence structure) to the array of the primary collection data structure. When the clip is added as an anchored clip, some embodiments add the clip to the set of anchored items of the clip to which the added clip is anchored (the anchoring clip), and correspondingly add a reference to the anchoring clip as a parent item of the anchored clip (and add the appropriate offset information).

The process 1100 then identifies (at 1110) the dimensions and pixel aspect ratio for both the clip and the project to which the clip was added. For the clip, these are properties of the images that are part of the underlying media filed referred to (through an asset) by the component clip. As shown in Section II, some embodiments store this information in the asset data structure. For the project, these properties are stored in either a project data structure or the sequence data structure, and are user-determined properties of the images rendered for the project. The dimensions are the number of pixels in both the horizontal and vertical directions, while the pixel aspect ratio describes the shape of the pixels.

Figure 12:
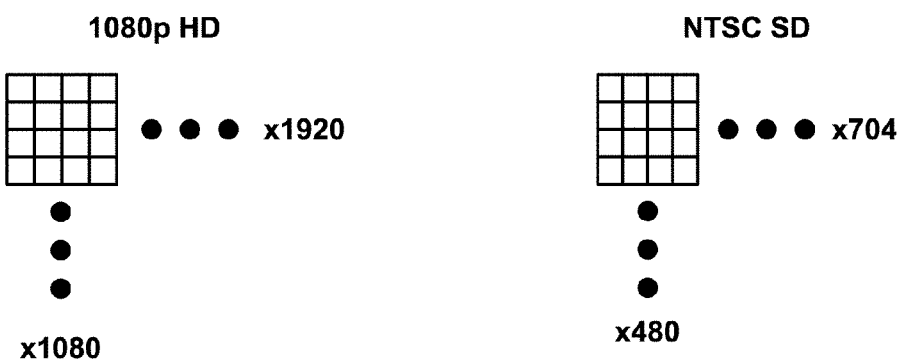
FIG. 12 conceptually illustrates two different image formats that have different spatial properties.

FIG. 12 conceptually illustrates the image dimensions and pixel aspect ratio for both a 1080p HD image and an NTSC SD image. As shown, the 1080p HD image has 1080 rows of 1920 pixels across. Furthermore, the 1080p image has square pixels, with a 1:1 ratio. From this information, the application can determine that the 1080p images have a 16:9 image aspect ratio (1920/1080=16/9).

On the other hand, the NTSC SD image has 480 rows of 720 pixels across. In addition, the NTSC image has pixels with an aspect ratio of 10:11; that is, the pixels are 1.1 times as tall as they are wide. Thus, even though 720/480=3/2, the NTSC image has a 4:3 image aspect ratio ((720*10)/(480*11) =15/11, which is very close to 4/3 and is treated as a 4:3 image aspect ratio). Some NTSC images may have different dimensions (e.g., 704×480, which gives exactly a 4:3 image aspect ratio when the pixel aspect ratio is 10:11).

As stated, the process 1100 identifies these spatial properties for both the source images and the project output images. The process then determines (at 1115) whether both of the identified properties match between the two sets of images. That is, the process determines whether (i) the dimensions of the source and output images are the same and (ii) the pixel aspect ratio of the source and output images are the same.

Images could have the same dimensions, but different pixel aspect ratios, and would thus be different images. For instance, some NTSC 4:3 images are 720×480 with 10:11 pixel aspect ratio, while some NTSC 16:9 images are 720× 480 with 40:33 pixel aspect ratio, and a conform effect would be needed to take a source image in one of these format and generate output images in the other format. Along the same lines, images can have different dimensions with the same pixel aspect ratio, such as 1080p and 720p HD images that both have square pixels.

When one or both of the properties does not match between the media clip's images and the project's output images, the process applies (at 1120) a spatial conform effect to the media clip. In some embodiments, a conform effect is added to the effects stack for the clip. Some embodiments place this effect in the stack such that at time of render the application applies the conform effect (which resamples the pixels to generate the output image) first, before additional effects are applied to the image (e.g., modifications to the pixel values). Other embodiments place the effect in the stack such that modifications are performed to the source image, and then the resampling for the conform effect occurs at the end of the effects stack. In some embodiments, the order of these effects is user-determined.

Rather than perform a process such as process 1100, some embodiments add a spatial conform effect to every clip that is added to a project. This conform effect is either needed or not needed at time of render, depending on whether the image properties match. When the properties do not match, the application uses a conform effect node for rendering the output images.

Figure 13:
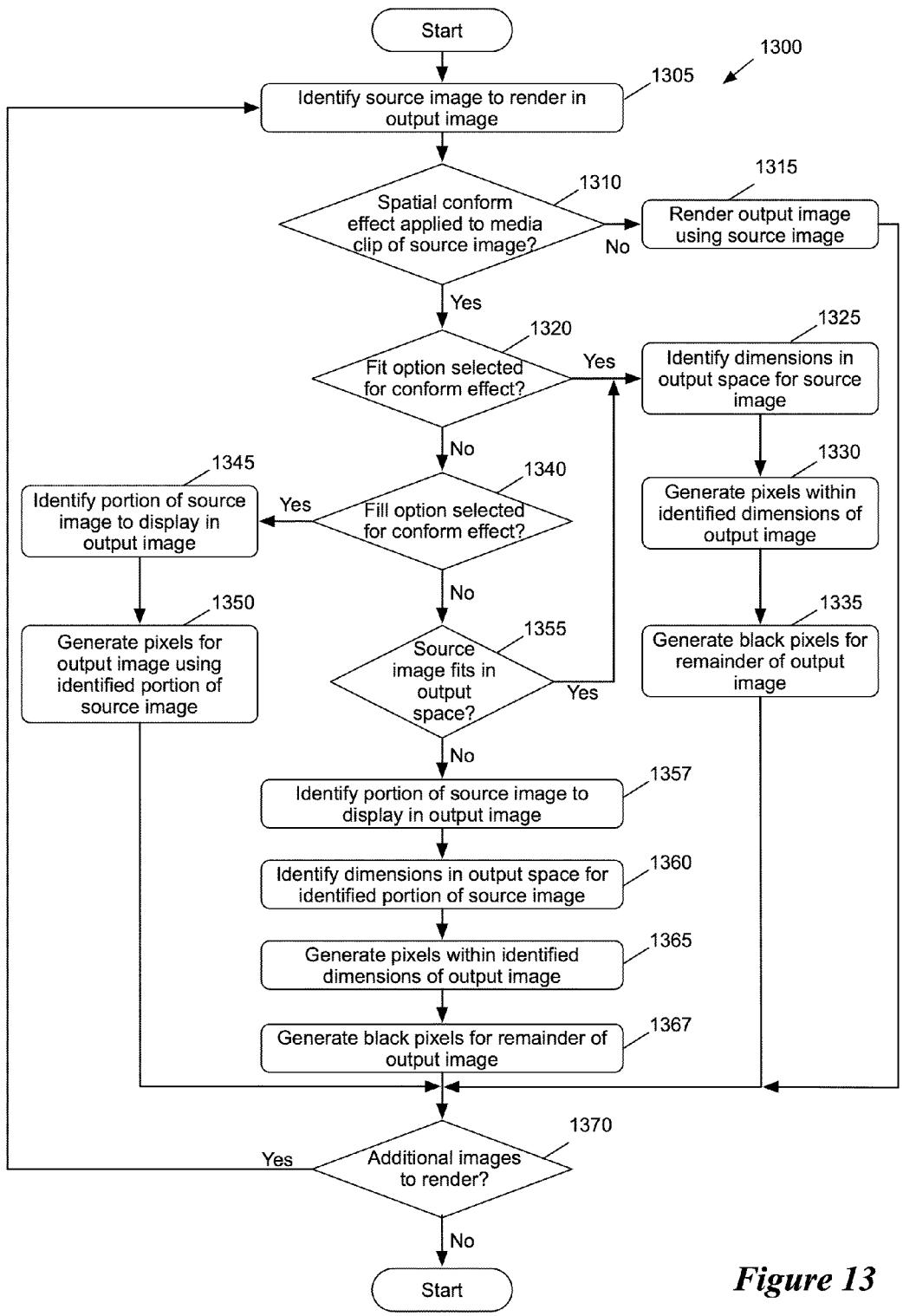
FIG. 13 conceptually illustrates a process of some embodiments for rendering output images of a media project.

The media-editing application of some embodiments provides three options for the conform effect: fit the entire source image within a portion of the output image, fill the entire output image with a portion the source image, or do not scale the source image. FIG. 13 conceptually illustrates a process 1300 of some embodiments for rendering output images of a media project. This process is performed by a media-editing application of some embodiments anytime the application needs to render an image.

In some embodiments, the media-editing application might need to render an image for various reasons. When a user skims through a project (e.g., by dragging a cursor over the project in the timeline) or plays back a project, the application renders images for display in the preview display area of the GUI. In some embodiments, the application renders output images in the background when processing resources are available so that when the output images are needed (e.g., for playback or skimming), the images can be pulled from the background-rendered images for display.

The process 1300 will be described by reference to FIGS. 14-17, which illustrate output images for different source media and project combinations and different conform options. Each of these figures illustrates a portion of a GUI 1400 that includes a preview display area 1405, a timeline display area 1410, and a clip library 1415. These display areas are similar to those described above for FIGS. 1 and 2.

The timeline display areas in each of these figures displays a representation of a media project, with the project's image format shown above the project representation. In each of the examples, the timeline shows two clips in the project, one whose source image format matches that of the project and one with a source image format different from the project. In the initial stage of the figures, an output image derived from a source image that matches the project output format is shown in the preview area.

The three possible second stages illustrate the different possible outputs when the application generates output images for the project from source images of the clip that does not match the project, depending on whether the user has selected the fit, fill, or none options for the spatial conform. These different stages illustrate the preview display area 1405 and an inspector display area 1420 that shows the selected conform options.

Figure 14:
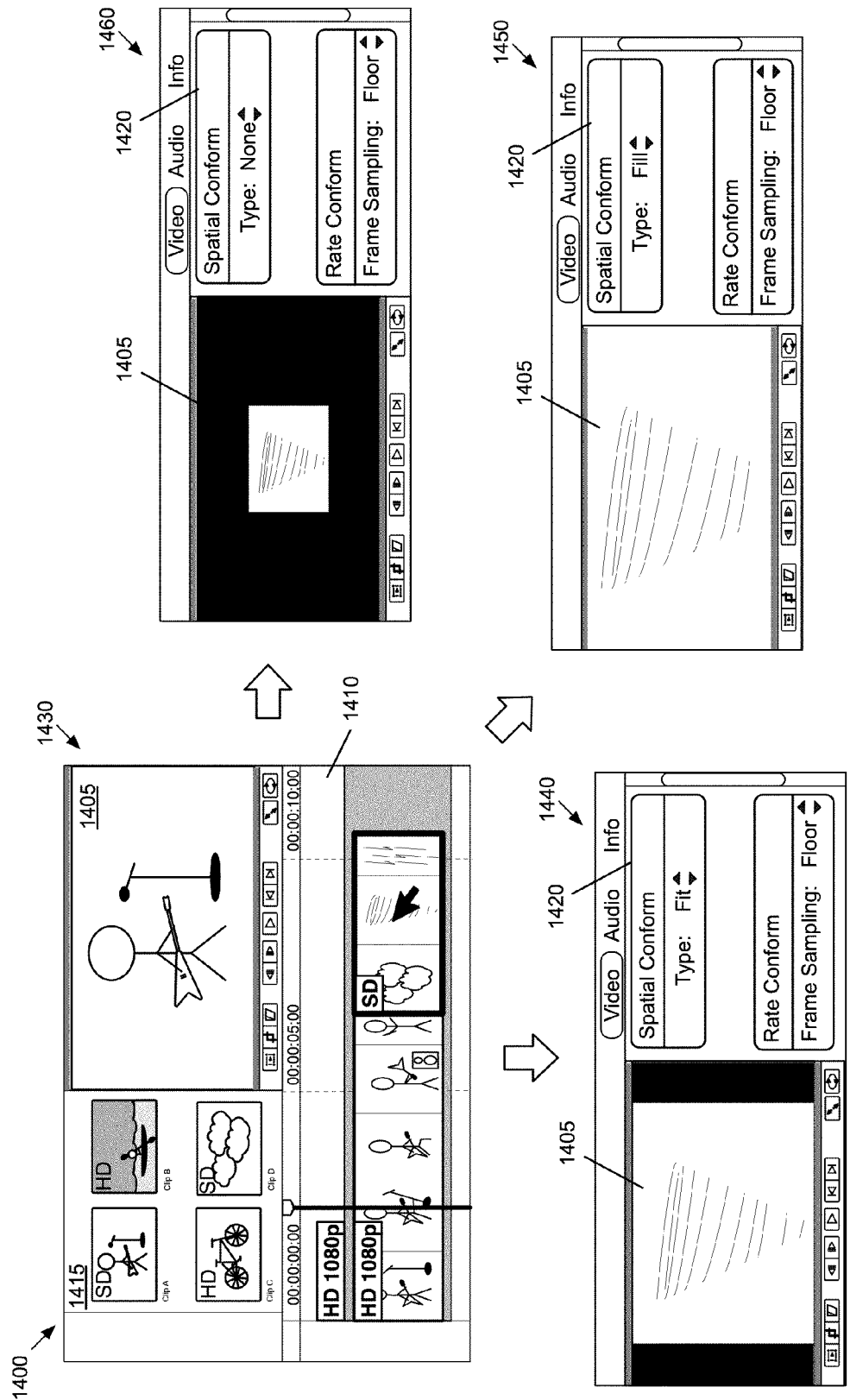
FIGS. 14-17 illustrate output images for different source media and project combinations and different conform options.
Figure 15:
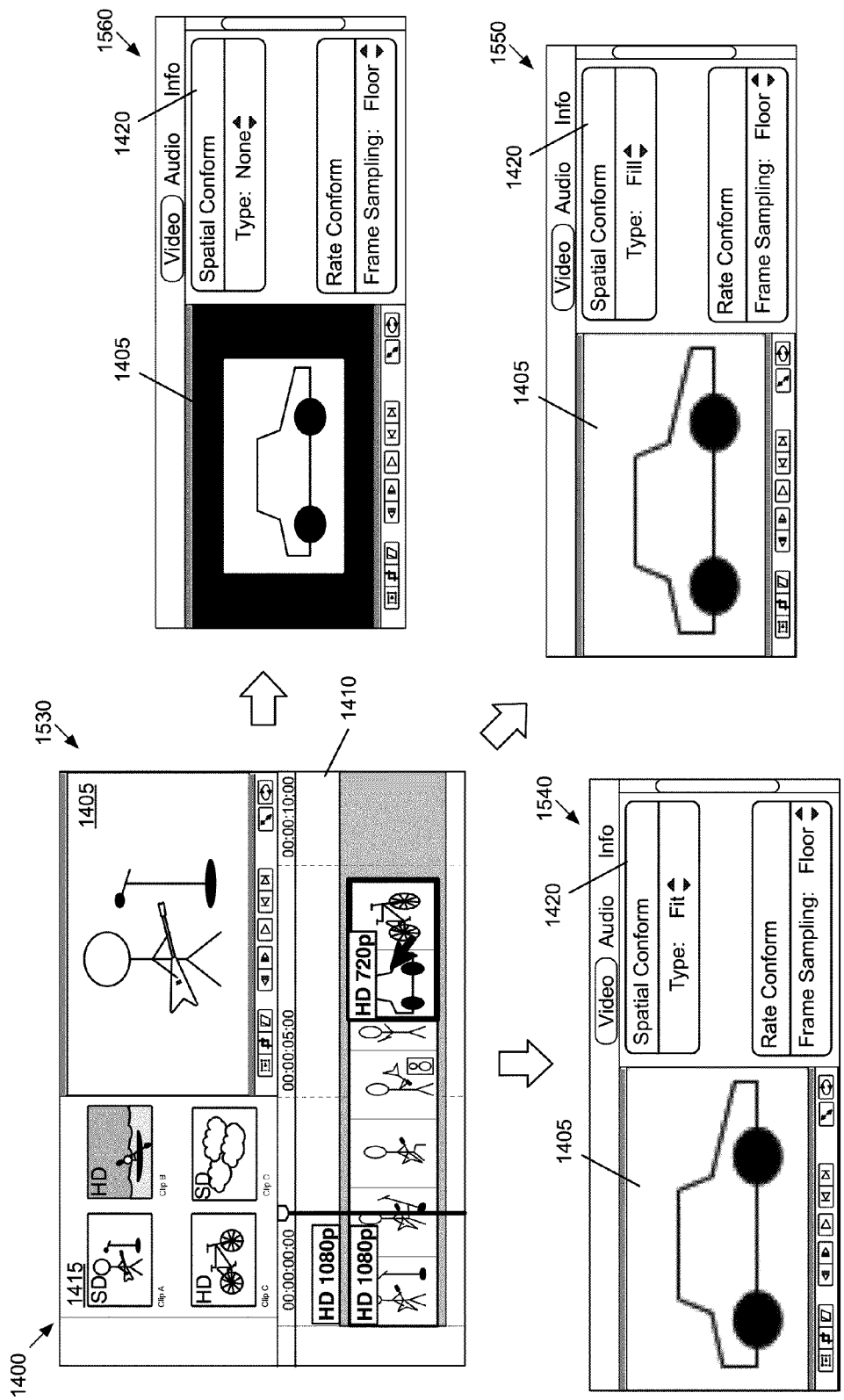
Figure 16:
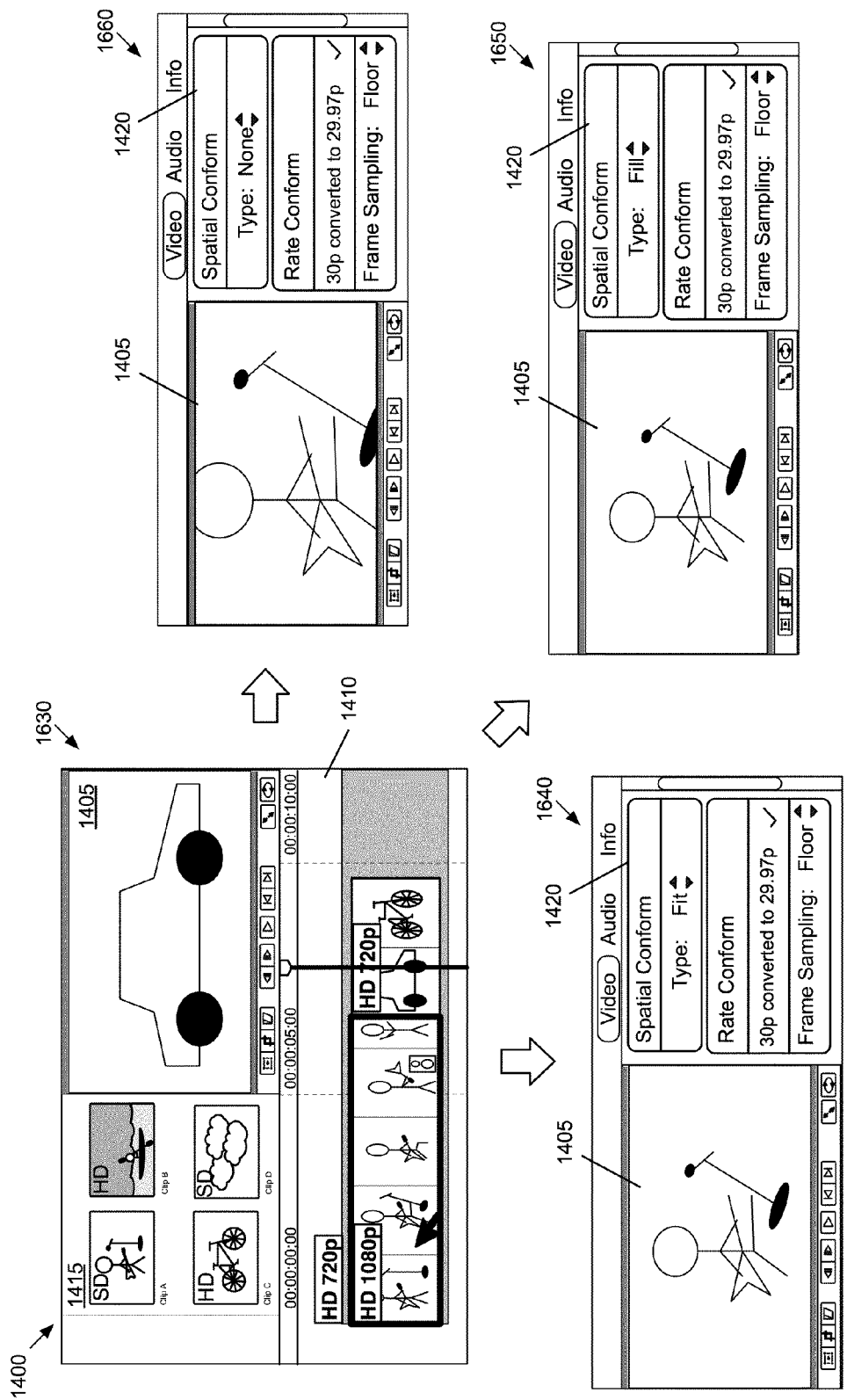
Figure 17:
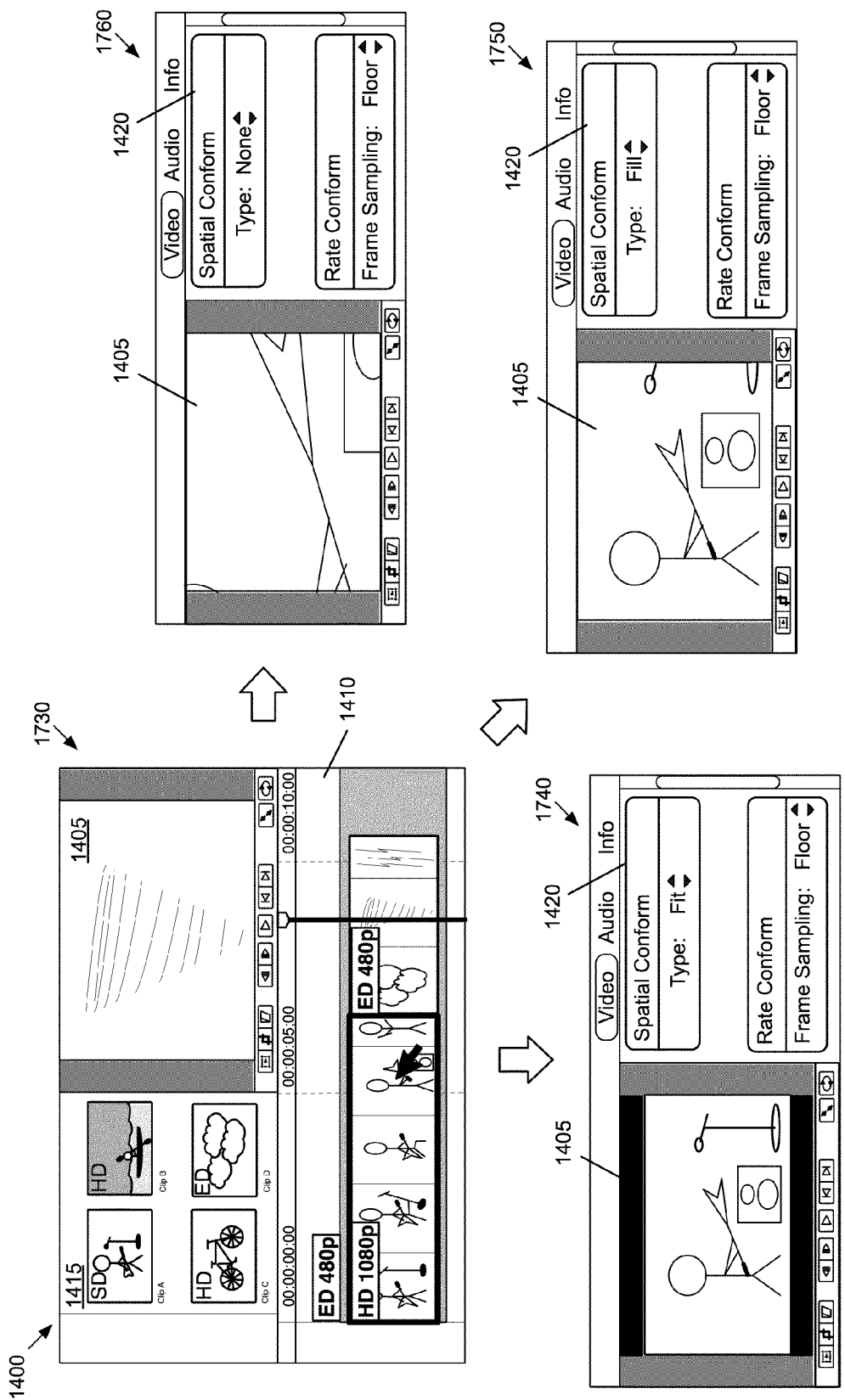

FIG. 14 illustrates a 1080p (1920×1080 with square pixels) project and a NTSC SD (720×480 with 10:11 pixel aspect ratio) source image. FIG. 15 illustrates a 1080p project and a 720p (1280×720 with square pixels) source image, while FIG. 16 illustrates a 720p project and a 1080p source image. Finally, FIG. 17 illustrates an enhanced definition (ED) 480p (640×480 with square pixels) project and a 1080p source image.

The process 1300 begins by identifying (at 1305) a source image to render in an output image. This process assumes that the spatial conform effect is the only processing being applied to the source image. That is, in order to render the output image, the application generates an image from the single source image according to the conform effect with no additional transforms, cropping, pixel modifying, compositing with other images, etc. The particular source image might be needed for display in the preview display area because the user placed a cursor over a portion of the project in the timeline that corresponds to a source image from the media clip, because the application needs to render the particular image for playback, etc.

The process next determines (at 1310) whether a spatial conform effect is applied to the media clip that references the source image. While this is presented as a decision within a process in this conceptual illustration, some embodiments use the effects stack for the media clip to determine each of the effects to apply to the source images, and most of the process 1300 is performed only when a spatial conform effect is in the stack. When the stack does not include a spatial conform effect, the rendering engine that renders the output image simply does not consider such an effect at all.

In the process shown, when the spatial conform effect is not applied, the process renders (at 1315) the output image using the source image. That is, because the source image and the output image are the same format, the pixels need not be resampled to generate the output image (although, to generate the image for display in the preview area, a smaller resampled image might be needed in order to account for the smaller size of the display). The initial stage of each of FIGS. 14-17 illustrates the preview display area 1405 displaying an image with no conform effect needed. The initial stages 1430, 1530, 1630, and 1730 illustrate the application displaying an image in the preview display area 1405 that the application generates from a source image of the same format. As shown, the stages 1430 and 1530 display 16:9 1080p images, stage 1630 displays a 16:9 720p image, and the stage 1730 displays a 4:3 480p image. After rendering the image at 1315, the process proceeds to 1370, described below.

When the spatial conform effect is applied, the process 1300 determines (at 1320) whether the fit option is selected for the effect. Some embodiments display information about the conform effects in the inspector display area of the user interface, such that users can select between fit, fill, and none options (e.g., using a drop-down menu). The fit option ensures that the entirety of the original image is displayed at the maximum size.

When the fit option is selected, the process identifies (at 1325) the dimensions in the output space for the source image. When the image aspect ratios of the source image and output image are the same, then the dimensions in the output space will be the entire space. However, when the image aspect ratios are different, the application has to determine whether the source image will be letterboxed (bars on top and bottom of the image) or pillarboxed (bars on right and left of the image). In general, when the source image aspect ratio is larger than the output image aspect ratio (i.e., the image is less square, such as putting a 16:9 source image into a 4:3 output image), then the image will be letterboxed. On the other hand, when the output image aspect ratio is larger than the source image aspect ratio (e.g., putting a 4:3 source image into a 16:9 output image), then the image will be pillarboxed.

In some embodiments, the application performs the conform effect in image space rather than the pixel space of the final output image. For a given pixel space (i.e., output spatial characteristics, such as 1920×1080 with square pixels), the image space of some embodiments maintains the image aspect ratio of the pixel space while using a square-pixeled coordinate system. Thus, for a pixel space with square pixels, the image space will have the same dimensions. However, for a pixel space with rectangular pixels (e.g., many SD formats), the corresponding image space will have different dimensions (e.g., a 720×480 pixel space with 10:11 pixel aspect ratio converts to a 654.54×480 image space). As shown in this example, some embodiments keep the vertical dimensions equal between image and pixel space, and change the horizontal dimensions according to the pixel aspect ratio.

Some embodiments use pixel transforms that define a relationship between image space and pixel space in order to convert images between the two types of spaces. Thus, to render an output image to which only a conform effect is applied, the media-editing application of some embodiments converts the image from its source pixel space to source image space, applies the conform effect to convert the source image space to output image space, and then converts the image to the output pixel space.

To calculate the dimensions in the output image space, the aspect ratio of the source image is maintained. Thus, the ratio of the dimensions (i.e., the number of columns of pixels divided by the number of rows of pixels) of the output image space used for the source image should equal the image aspect ratio of the source image. That is, where X is the horizontal dimensions and Y is the vertical dimensions of the used portion of the output image space in pixels, and IAR is the source image aspect ratio, then X/Y=IAR. When the image is letterboxed, and thus X is known (the maximum number of pixels across the output image space), then Y=X/IAR. When the image is pillarboxed, and thus Y is known (the maximum number of rows of pixels in the output image), then X=Y*IAR.

With the dimensions known, these dimensions are then centered in the output image space. For instance, if the number of horizontal pixels used is X and the total number of horizontal pixels is $X_T$, then $(X_T-X)/2$ is the width of each of the black bars, in pixels. A similar calculation can be performed for the black bars used for letterboxing. To convert these dimensions to pixel space in order to resample the actual pixels for the rendered output image, a pixel transform is used that accounts for the pixel aspect ratio of the output pixel space and a translation of the origin from the center (for image space) to the bottom left corner (for pixel space). The pixel transform of some embodiments is described in greater detail in U.S. Patent Publication 2009/0244081, entitled "Pixel Transforms" and filed Apr. 1, 2008, as well as U.S. patent application Ser. No. 13/111,895, now published as U.S. Patent Publication 2012/0210217, entitled "Media-Editing Application with Multiple Resolution Modes" and filed on May 19, 2011, both of which are incorporated herein by reference.

With the dimensions known, the process 1300 generates (at 1330) pixels within the identified dimensions of the output image. That is, for each pixel in the dimensions of the output image identified at operation 1325, the application calculates pixel values (e.g., color values in a particular color space, such as RGB) using the pixel values of the source image. Various different algorithms may be used when there is not a one-to-one correspondence between the source and output pixels. The process also generates (at 1335) black pixels for the remainder of the output image (i.e., the pillarboxes or letterboxes). With the image generated, the process 1300 proceeds to 1370, described below.

In each of the FIGS. 14-17, the bottom left stage (stages 1440, 1540, 1640, and 1740) illustrates the preview display area 1405 when the fit option is selected in the inspector 1420. The stage 1440 illustrates a 720×480 source image with 10:11 pixels expanded into 1440×1080 dimensions with square pixels (1080*(4/3)=1440). The stage 1540 illustrates a 1280× 720 source image with square pixels expanded into 1920× 1080 dimensions with square pixels (the source and output images have identical aspect ratios). In both of these cases, some pixelation may be visible in the image due to a lower resolution image being displayed at a higher resolution. While this will probably not be noticeable to the editor viewing the project in the media-editing application UI (due to a smaller preview display area size), the pixelation may become visible when viewed in full-screen mode or upon export at full size.

The stage 1640 illustrates a 1920×1080 source image with square pixels scaled down into 1280×720 dimensions with square pixels (again, the source and output images have identical aspect ratios). Finally, the stage 1740 illustrates a 1920× 1080 source image with square pixels scaled down into 640× 360 dimensions with square pixels (640*(16/9)=360). Because the images are scaled down, pixelation should not occur, though some detail may be lost.

When the fit option is not selected, the process 1300 determines (at 1340) whether the fill option is selected for the conform effect. Whereas the fit option ensures that the entirety of the original image is displayed, the fill option displays the minimum size image that will use the entirety of the output space.

When the fill option is selected, the process identifies (at 1345) the portion of the source image to display in the output image. If the image aspect ratios of the source image and output image are the same, then the entire source image will be used in the output image display. However, when the image aspect ratios are different, the application has to determine whether the output image will use all of the horizontal expanse of the source image (and cut off the top and bottom) or use all of the vertical expanse of the source image (and cut off the sides). In general, when the source image aspect ratio is larger than the output image aspect ratio (i.e., the image is less square, such as putting a 16:9 source image into a 4:3 output image), then the output image will cut off the sides of the source image. On the other hand, when the output image aspect ratio is larger than the source image aspect ratio (e.g., putting a 4:3 source image into a 16:9 output image), then the output image will cut off the top and bottom of the source image.

To calculate the dimensions of the source image to use, the application identifies the aspect ratio of the output image within the source image. Thus, the ratio of the used dimensions (i.e., the number of columns of pixels divided by the number of rows of pixels) of the source image multiplied by the pixel aspect ratio of the source image will equal the aspect ratio of the output image. That is, if in this case X is the horizontal dimensions and Y is the vertical dimensions of the used portion of the source image in pixels, and IAR is the output image aspect ratio, then X/Y=IAR. When the output image cuts off the top and bottom of the source image, and thus X is known (the full number of pixels across the source image), then Y=X/IAR. When the output image cuts off the sides of the source image, and thus Y is known (the full number of rows of pixels in the source image), then X=Y*IAR.

With the dimensions of the source image known, these dimensions are then centered in the source image. For instance, if the number of horizontal pixels used is X and the total number of horizontal pixels is $X_T$, then $(X_T-X)/2$ is the number of pixels cut off of each side of the source image. A similar calculation can be performed when cutting off the top and bottom of the source image. To convert these dimensions to pixel space to identify the actual pixels of the source image used to render the output image, a pixel transform is used that accounts for the pixel aspect ratio of the source image pixel space and a translation of the origin from the center (for image space) to the bottom left corner (for pixel space).

With the dimensions known, the process 1300 generates (at 1350) pixels for the entirety of the output image using the identified portion of the source image. That is, for each pixel in the output image, the application calculates pixel values (e.g., color values in a particular color space, such as RGB) using the pixel values of the source image. Various different algorithms may be used when there is not a one-to-one correspondence between source and output pixels. As the entire output image is filled, no black pixels need to be generated. With the image generated, the process 1300 proceeds to 1370, described below.

In each of FIGS. 14-17, the bottom left stage (stages 1450, 1550, 1650, and 1750) illustrates the preview display area

1405 when the fill option is selected in the inspector 1420. The stage 1450 illustrates a 720×368 portion of a 720×480 source image with 10:11 pixels expanded to fill a 1920×1080 output image (720/(16/9))=405, which converted back to pixel space using a 10/11 multiplier for the pixel aspect ratio≅368). The stage 1550 illustrates a 1280×720 source image with square pixels expanded into a 1920×1080 output image with square pixels (the source and output images have identical aspect ratios, so the fit and fill options produce the same result). In both of these cases, some pixelation may be visible in the image due to a lower resolution image being displayed at a higher resolution.

The stage 1650 illustrates a 1920×1080 source image with square pixels scaled down into 1280×720 dimensions with square pixels (again, the source and output images have identical aspect ratios). Finally, the stage 1750 illustrates a 1440×1080 portion of a 1920×1080 source image with square pixels expanded scaled down into a 640×480 output image) with square pixels. Because the images are scaled down, pixelation should not occur, though some detail may be lost.

When neither the fill nor fit options are selected, then the none option must be selected for the conform effect. Even if not conforming the source image for the output space, the application needs to generate an output image in the output space. Thus, the process 1300 determines (at 1355) whether the source image fits in the output space. Some embodiments compare the number of vertical pixels, assuming that all pixels have the same height but vary in width according to the pixel aspect ratio. If the source image has more rows of pixels than the output space, then the source image does not fit in the output space. If the source image has the same number or fewer rows of pixels than the output space, then the source image fits in the output space if the source image aspect ratio is less (i.e., closer to square) than the output image aspect ratio (the dimensions cannot be compared because the pixels might be different sizes between the spaces).

When the image fits in the output space, the process proceeds to 1325 to identify the dimensions in the output space for the source image. In some embodiments, the application assumes that the number of vertical pixels used in the output space will be the same as in the source image, then calculates the number of horizontal pixels in the output space in the same way as would be done using the fit option: that is, X=Y*IAR, using the source image aspect ratio. These dimensions are then centered in the output image space. With the pixels identified, the process then generates (at 1330) pixels within the identified dimensions and generates (at 1335) black pixels for the remainder of the output. If the pixel aspect ratio of the source and output images is the same, then the dimensions used in the output space will be the same and the pixel generation will be a 1:1 mapping of pixel values from the image space; however, if the pixel aspect ratios are different, then various different algorithms may be used to generate the output pixels.

On the other hand, when the image does not fit in the output space, the process identifies (at 1357) the portion of the source image to display in the output image. When there are more rows of pixels in the source image than the output space, then the application will use the number of rows of the output space, centered in the source image. The number of horizontal pixels used is calculated in a similar manner to the fill option context. That is, X=Y*IAR, using the output image aspect ratio. However, due to differences in the images, this number might be larger than the width of the source image, in which case the image will be cut off on top and bottom and pillar-boxed on the sides.

When there are fewer (or equal) rows of pixels in the source image than the output space, then the process determines the horizontal dimensions of the source image to use. Again, $X=Y_O*IAR$, using the output image aspect ratio, where in this case $Y_O$ is the number of rows in the output space. All dimensions in the source image are centered in the source image (such that equal numbers of pixels are cut off at the top and bottom of the source image, and/or at the right and left sides of the source image).

With this portion of the source image identified, the process then identifies (at 1360) dimensions in the output space for this identified portion of the output image. When the source image is cut off on both the top and bottom and the sides, then the entire dimensions of the output space are in use. When the number of rows of pixels in the source image is smaller than the rows in the output image space, the number of rows from the source image is centered vertically in the output image. Similarly, when the number of columns of pixels used in the source image space is smaller than the width of the output image space, then the image is centered horizontally in the output image space.

Now that the process has determined which pixels in the source image to convert into which pixels in the output image, the process generates (at 1365) pixels within the identified dimensions of the output image and generates (at 1367) black pixels for the remainder of the output if needed. If the pixel aspect ratio of the source and output images is the same, then the dimensions used in the output space will be the same and the pixel generation will be a 1:1 mapping of pixel values from the image space; however, if the pixel aspect ratios are different, then various different algorithms may be used to generate the output pixels.

With the image rendered, the process determines (at 1370) whether to continue rendering images. For example, if playing back a media project or clip, the application will render images until reaching the end of the sequence or until the user stops the playback (or closes the application). If skimming, the application will need to continue rendering so long as the user is moving the cursor over the media clip or project. If the application is background rendering a portion of a media project, then the rendering will continue until the portion is fully rendered, unless user actions take precedence over the rendering processes, in which case the application pauses the background rendering. When additional images need to be rendered, the application returns to 1305 to identify the next source image to render in an output image. When no more images need to be rendered, the process ends.

The above description assumes that the image being rendered does not have any additional effects applied. When there is a rate conform effect applied, as will be described below, the application first generates a source image to use from one or more source images. Other effects, such as transforms to the output image (e.g., translating the source image within the output image, distorting, shrinking, or expanding the source image within the output image, cropping the source image, etc.), effects that modify the pixel values of the output image, etc., will affect how the application renders an output image from a source image or images.

Furthermore, one of ordinary skill in the art will recognize that many different ways of rendering images using the conform effect are possible. As described, some embodiments convert source images into image space using an inverse pixel transform for the particular format, then perform all effects (e.g., spatial conform, blur, distortion, transform, etc.) on the representational images in this image space. To generate an actual output image, some embodiments use a pixel transform to convert from the output image space to output pixel space.

The conform effect is implemented in some embodiments such that the application does not use the image aspect ratio directly in its computations, though it maintains the ratio in image space. Instead, the conform effect determines both x and y scales between the source image space and the output image space and then uses either the smaller scale (for the fill option) or the larger scale (for the fit option). When the none option is selected, the conform effect does nothing to the image. After image manipulation, the rendering enginge generates the actual output image by requesting a specific region of interest that equals the boundaries of the output image space.

IV. Storage of Effect Parameters

While the spatial conform effect of some embodiments does not store parameters (because it is defined between the source image space of the media clip and an output image space of a media project containing the media clip), other effects may store parameter information that refers to distances in the output image space. These parameters may include parameters for modifying pixel values, such as a radius for a blur effect. The blur effect of some embodiments modifies a particular pixel's color values based on the color values of surrounding pixels, and the user can set a parameter that indicates how many pixels surrounding the particular pixel are used in this effect (e.g., a radius of 25, 50, 100, etc.). In some embodiments, this is stored as a percentage of the output image space, rather than a set number.

Other parameters might include translations of an image (i.e., move the image within the output space), scaling factors (i.e., display the image in the 1920×1080 output space at 1280×720 pixels), distortions, cropping, etc. Some embodiments also store these effect parameters as percentages of image space, which enables resolution-independent editing. That is, users can take a clip modified in a first project having a first image format and copy that clip into a second project with a second image format, and the effects on the clip will be the same in the second format (e.g., a scaled image will be displayed as ⅔ of the output space regardless of the output format). The parameters are stored within the effect information in the effect stack, which is part of the media clip data structure of some embodiments, as shown above. Thus, when the clip is copied, the application duplicates the data structure, which retains the same percentage information for the effects.

In order to store parameters as percentage values, the application of some embodiments defines coordinate systems for a project's output image space using percentages. In order to account for varying aspect ratios of different output formats, some embodiments set image space coordinates using a scale in which the vertical (y) axis runs from −50% at the bottom to 50% at the top. The range of the horizontal axis in this coordinate system depends on the image aspect ratio, with the endpoints defined as 50*IAR (IAR is the image space aspect ratio).

Figure 18:
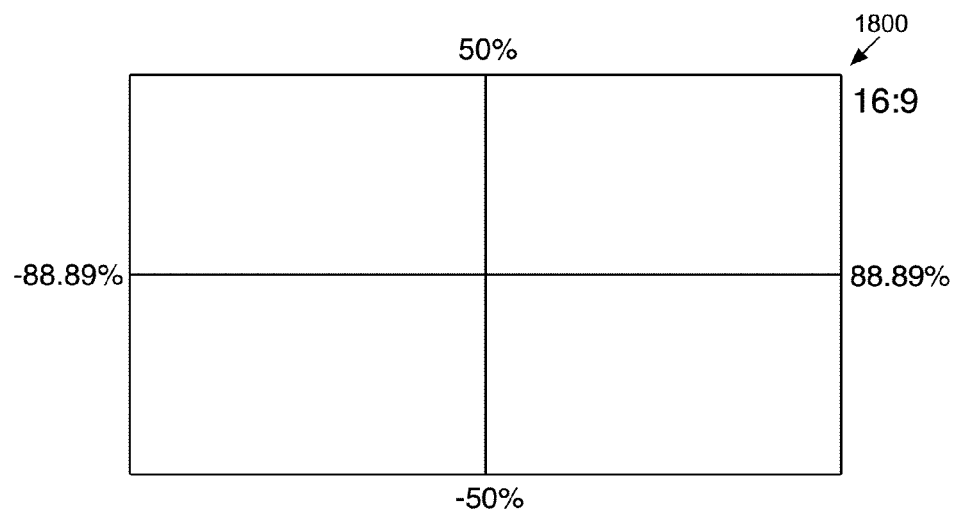
FIGS. 18 and 19 illustrate the axes of image space for two common aspect ratios.
Figure 19:
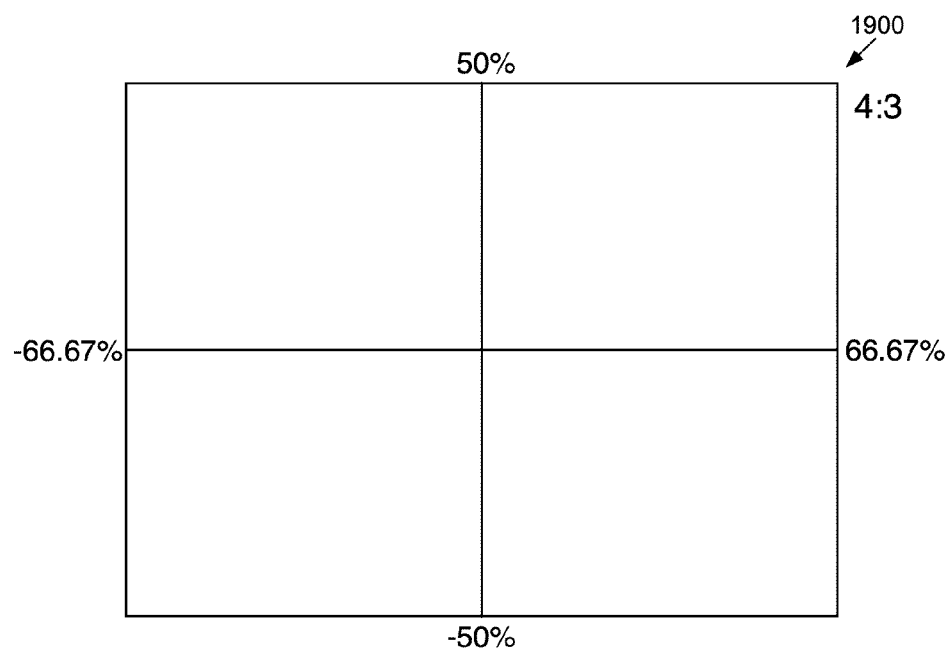

FIGS. 18 and 19 illustrate the axes of image space for two common aspect ratios. The image space 1800, shown in FIG. 18, has a 16:9 aspect ratio. As shown, the vertical axis ranges from −50% to 50% while the horizontal axis ranges from −88.89% to 88.89%. Depending on the dimensions of the image space, one percentage point represents a different number of pixels in each direction. As image space is defined as square-pixeled, each percentage point represents the same number of pixels along the y axis as along the x axis. For example, in a 1920×1080 image space, each percentage point represents 10.8 pixels. The image space 1900, shown in FIG. 19, has a 4:3 aspect ratio. As shown, the vertical axis ranges from −50% to 50% while the horizontal axis ranges from −66.67% to 66.67%. In a 640×480, each percentage point represents 4.8 pixels in both the horizontal and vertical directions.

However, when converting into a corresponding pixel space, the percentages may represent different numbers of pixels in horizontal and vertical directions if the pixel aspect ratio is not square. For the 1920×1080 image space mentioned above, each percentage point represents 10.8 pixels in either direction in the pixel space as well. On the other hand, a 1440×1080 image space (with a 4:3 pixel aspect ratio for a 16:9 image aspect ratio) would have the same 1920×1080 square-pixeled image space, but for converting into the pixel space one percentage point in the vertical direction represents 10.8 pixels while one percentage point in the horizontal direction represents 8.1 pixels. One of ordinary skill in the art will recognize that when converting to pixels for rendering an image, some embodiments require integer pixel values, and thus will round image (or on-screen control) output instructions to the nearest pixel.

Figure 20:
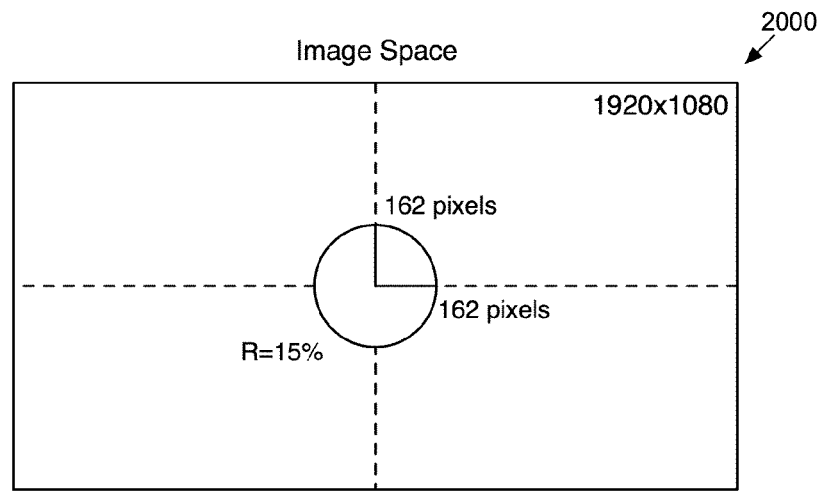
FIGS. 20 and 21 illustrate a circle in two different image spaces.
Figure 21:
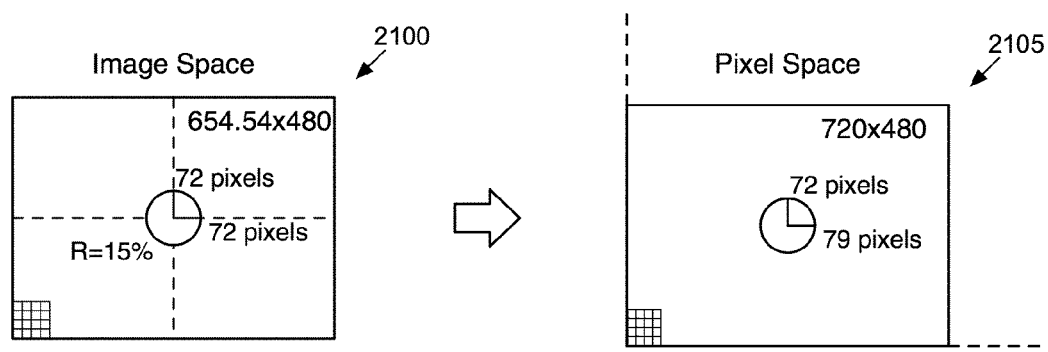

As described with respect to the spatial conform effect in Section III, the effects operate in image space in some embodiments. Thus, the application stores effect parameters in image space (e.g., as percentages of image space). Using percentage coordinates (as opposed to pixel values) and accounting for the pixel aspect ratio by basing the coordinates off of the vertical percentages enables the application to display media in the same fashion across different project formats. As a simple example, FIGS. 20 and 21 illustrate a circle in two different image spaces. The radius of the circle is 15% in each of the different spaces. The first image space 2000 is a 1920×1080 square-pixeled space, and the circle radius is 162 pixels in each direction (1080*0.15). The second image space 2100 is a 654.54×480 image space (a conversion from a 720×480 pixel space in which the pixels have a 10:11 aspect ratio). In this case, the radius of the circle is 72 pixels in each direction (480*0.15). However, the circle drawn in pixel space 2105 is 79 pixels in the horizontal direction (480*0.15*1.1).

As can be seen, the pixel aspect ratio is used to convert between percentage values in the horizontal and vertical directions. To illustrate the difference in the pixels from image space to pixel space, a block of 16 groups of pixels is shown in each of the spaces 2100 and 2105. Due to the size, a single pixel would not be discernible, so groups of pixels are shown. Each square represents the same number of pixels horizontally as vertically. As shown, the height of four such pixel groups is the same in image space 2100 and pixel space 2105, but the same number of pixels are narrower horizontally in the pixel space 2105.

Figure 23:
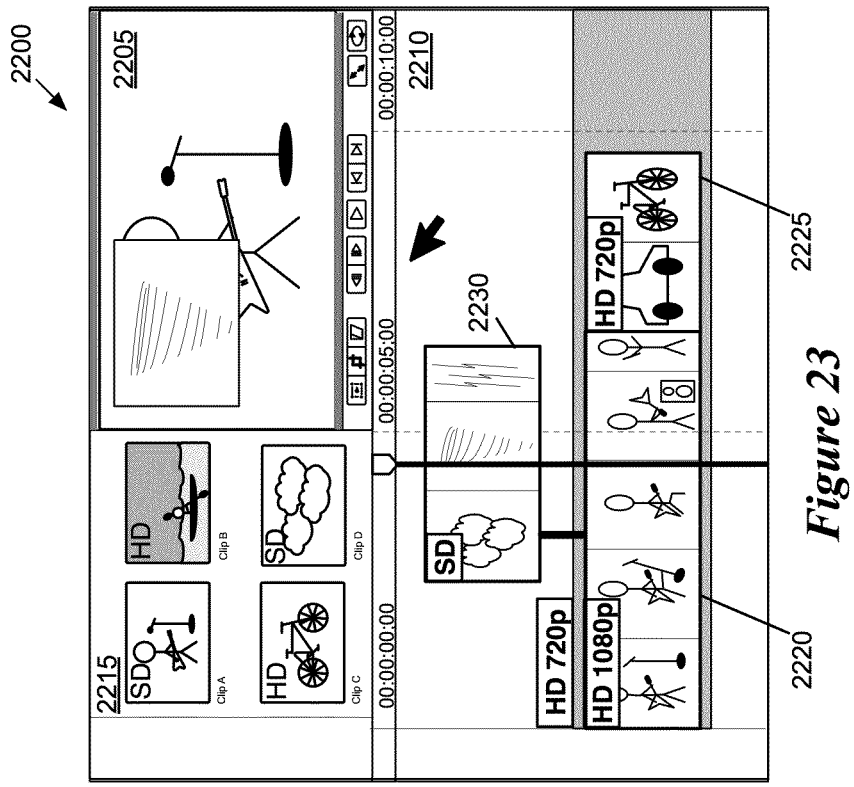
FIGS. 22 and 23 illustrate the resolution-independent aspect of effects.
Figure 22:
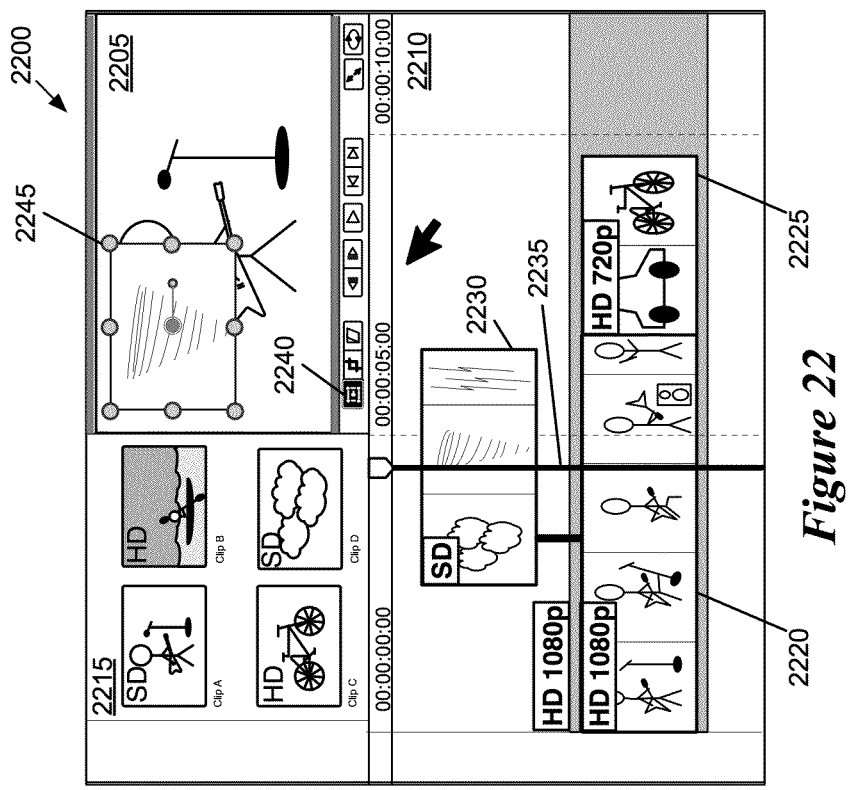

The media-editing application of some embodiments uses these percentages in order to process and display output images to which effects are applied, as well as the on-screen controls for creating some of these effects. FIGS. 22 and 23 illustrate the resolution-independent aspect of the effects. Specifically, these figures illustrate a GUI 2200 in which images of a first clip in an anchor lane are scaled in size and display over top of the images of a second clip from the secondary lane. The GUI 2200 includes a preview display area 2205, a timeline 2210, and a clip library 2215, similar to those of FIG. 1.

As illustrated, the timeline contains a 1080p sequence with three media clips: a 1080p clip 2220 and a 720p clip 2225 in the primary lane of the timeline as well as a SD clip 2230 anchored above the 1080p clip 2220. The playhead 2235 is currently over a location in the project that contains the anchored clip 2230 and the 1080p clip 2220. Because the SD clip is anchored above the primary lane, the application displays the images from the clip 2230 over those of the primary lane HD clip 2220 in the rendered output images.

In this case, the user has also applied a transform effect to the SD clip 2220 that reduces its size within the output image, allowing the application to include more of the 1080p image in the rendered output image (the transform effect tool 2240 is currently selected in the preview display area 2205, resulting the display of on-screen controls to use for the transform effect). The application stores the information about the transform effect in the data structure for media clip 2230, which the application then uses to render the output images for the project. The transform shown in this case applies approximately a 50% scaling factor to the source image and translates the center of the source image approximately 20% upward and 45% to the left within the output image (the image does not move out of the output image because the horizontal coordinates start at −88.89%, not −50%). Rather than indicating that the SD source image takes up a particular set of pixels in the output space (using the bottom left as the origin for pixel space, the image runs from coordinates (114, 486) in the lower left to (834, 1026) in the upper right), the application stores the transform information as percentages of the output space.

FIG. 23 illustrates the same set of clips 2220-2230 copied and pasted into a 720p project, with the playhead at the same point in the project as in FIG. 22. As shown, the image from clip 2230 appears at the same location in the image as in the 1080p project shown in FIG. 22, although the image might appear slightly less pixelated as the overall output image size is smaller (the full-size rendered version of the image, not the version shown in the preview display area 2205). If the media clips 2220-2230 were copied into an SD (4:3 aspect ratio) project, then the images from the anchored media clip 2230 would not be entirely within the output space. Vertically the images would be rendered in the same location, but because the horizontal range of the output space only goes to −66.67%, the source images of clip 2230 would be cut off on the left side.

As stated, some embodiments store (and thus perform) the spatial conform effect on a media clip separately from any transform effects. That is, the media-editing application stores both effects in the effects stack of the media clip, but as separate effects, rather than treating the conform effect as a transform. For instance, while a 1080p clip conformed to a 720p output space can be thought of as a 66.67% scaling transform, the application stores the effect as just a conform to fit (or fill) on the media clip, which the rendering engine of the application translates into such a scaling effect when rendering the output image for the 720p output space.

Figure 24A:
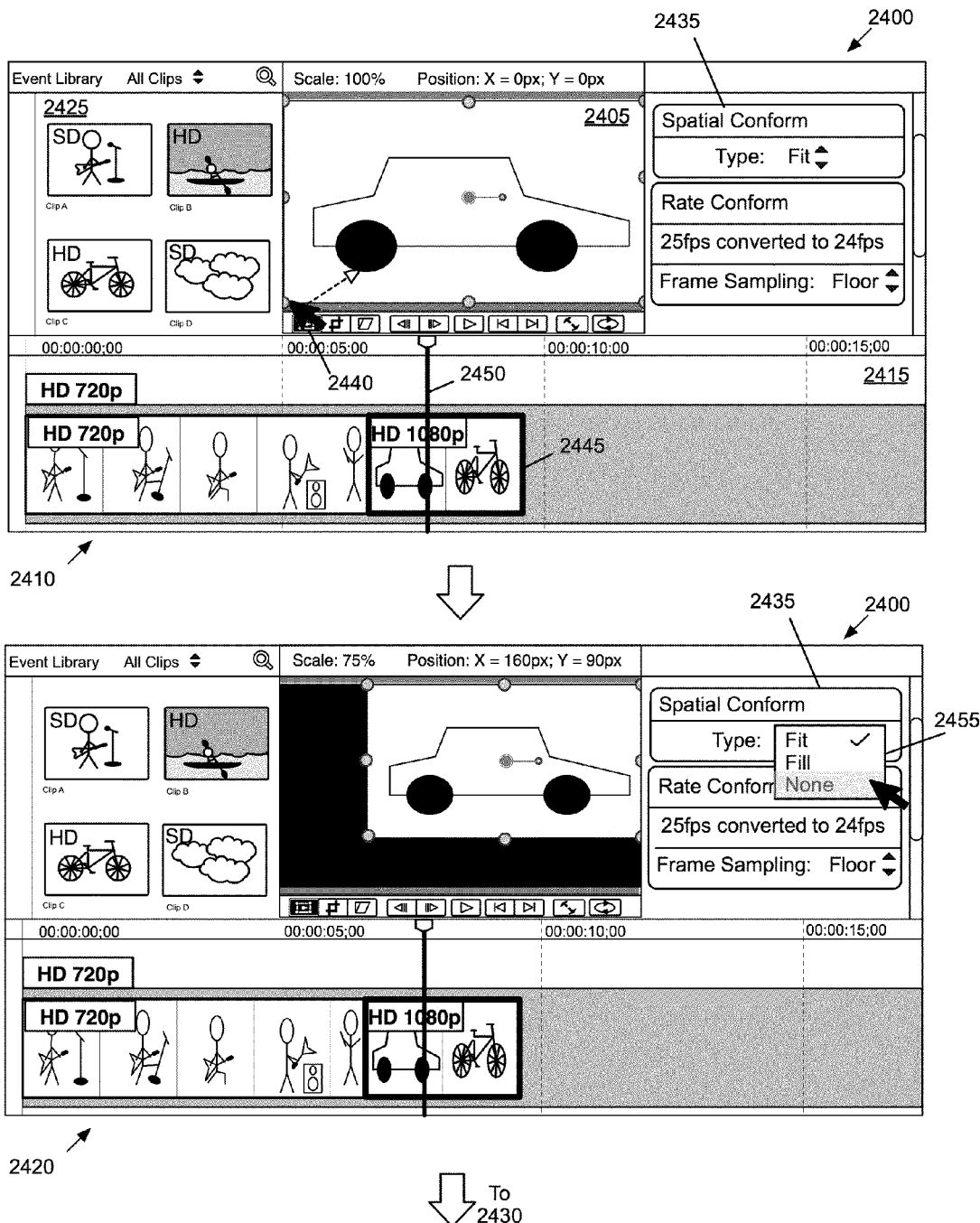
FIG. 24 illustrates the independence of the conform and transform effects of some embodiments.
Figure 24B:
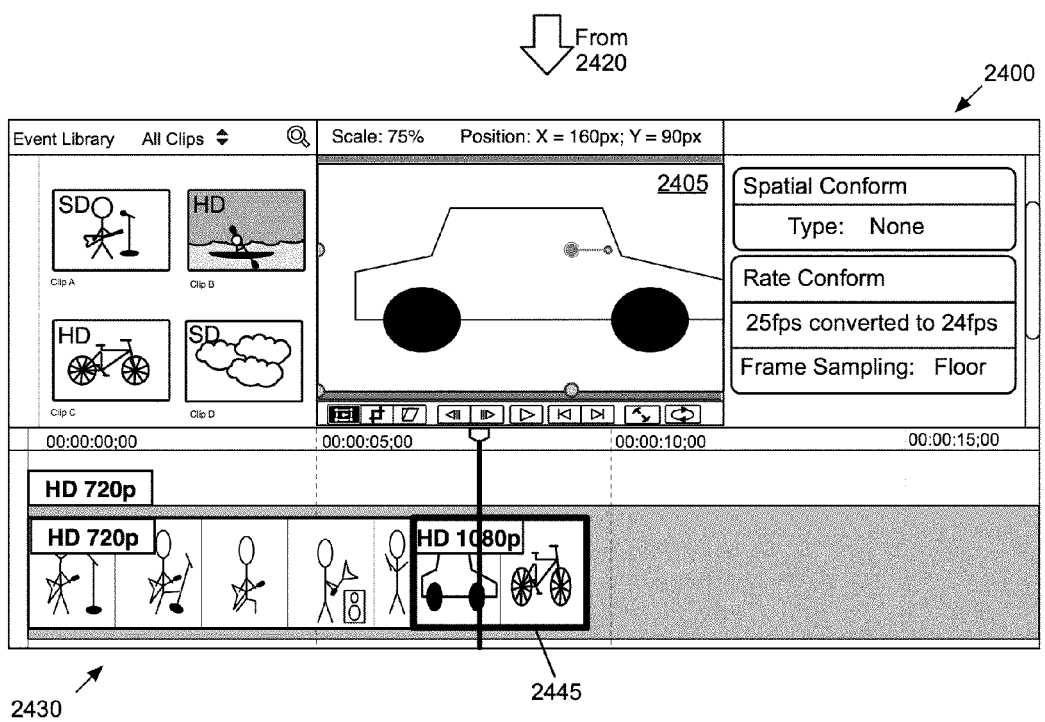

FIG. 24 illustrates the independence of the conform and transform effects of some embodiments. Specifically, the application illustrates a GUI 2400 over three stages 2410-2430 between FIG. 24A and FIG. 24B. The GUI 2400 includes a preview display area 2405, a timeline 2415, a clip library 2425, and an inspector display area 2435, similar to the GUI 1400 of FIG. 14. One of ordinary skill in the art will recognize that the inspector of some embodiments displays additional information about the clip (e.g., as shown in FIG. 4), in addition to the conform information shown in this figure. In the GUI 2400, the timeline 2415 includes a 720p (1280×720) project that includes a 1080p (1920×1080) media clip 2445 over which the playhead 2450 is currently located.

At the first stage 2410, a fit conform effect is currently applied to the media clip 2445 as shown in the inspector 2435. In addition, the user has selected the transform tool using the selectable item 2440, causing the application to display the transform on-screen controls around the edges of and at the center of the image in the preview display area 2405. At this stage the user is currently using these controls to apply a transform effect to the image to both shrink the image and move the image to the right. The transform on-screen controls operate differently in different embodiments. In some embodiments, moving the corner controls applies a uniform scaling transform that does not modify the aspect ratio of the image and does not change the center of the image. The user can translate the image (move its center) by selecting the interior of the image or the center control and moving the cursor within the GUI.

Some embodiments provide numerical guides in the preview display area for properties being modified. In this figure, the scale and x-y position are both displayed, though some embodiments only display the information relevant to the particular control a user has selected (i.e., the scale factor when the user selects a corner control, the translation distance from center when a user moves the image, the rotation angle when the user rotates the image, etc.). At the first stage 2410, the image has not yet been transformed so the scale is 100% and the translation values are both at 0 pixels. Some embodiments use pixel values for the translation information because that is easier for a user to process and allows the user to make edits at the single pixel level. However, the application then stores this translation information as a percentage of output space so that the effect is output resolution-independent.

Stage 2420 illustrates the result of the transform effects to shrink and scale the image in the preview display area 2405. The user has scaled the images of the clip by 75% and translated the image 160 pixels to the right and 90 pixels up in the 1280×720 space (stored as a 22.22% translation in the horizontal direction and a 12.5% translation in the vertical direction).

In addition, at this stage, the user has opened a display area 2455 for the spatial conform effect in the inspector 2435. This drop-down menu allows the selection of one of the three aforementioned options for the spatial conform effect: fit, fill, or none. In this example, the user selects the none option, which removes any conform effect. Accordingly, because the application stores this effect independently from the transform, the full 1920×1080 images will be displayed at 75% size, centered 12.5% above and 22.22% to the right of center (which is 12.5% of the total output image width).

The third stage 2430, shown in FIG. 24B, illustrates the image from media clip 2445 in the preview display area 2405 without the conform effect applied. In this stage, the center of the source image has not moved—it is still located 160 pixels to the right and 90 pixels up from the center of the output image. As a result of the application not applying a conform effect to the source image, the source image (which is 1.5 times the size of the source image before the scaling effect, and thus 1.125 times the size of the source image after the scaling effect) fills the output image and gets cut off on the top and right.

This figure illustrates that the media-editing application treats the conform effect and scaling transform effect independently, and stores these as separate effects for the purposes of independent manipulation. However, when rendering output images, some embodiments conflate these effects. For example, a user might have added a 1920×1080 clip to a 1280×720 project, with a fit or fill conform effect. Thus, this effect will scale the source images by a factor of ⅔ for the output image. However, the user might want to blow up the source image in the output, and thus adds a 3 times scaling effect to the image. If applied separately, these effects would first scale the image to 1280×720, causing a loss of resolution, then scale the image up to 3840×2160.

Rather than lose resolution by performing the conform effect prior to expanding the image, the rendering engine of some embodiments traverses a graph for the output image to determine that these effects can be combined (using a downstream pixel transform in some embodiments), and thus only performs a 2 times scaling effect on the source image without the additional loss of resolution. In some embodiments, the ability to combine these effects is dependent on whether additional effects are specified between the two in the effect stack for the clip. For example, if a user specifies to conform the image, then add a blur effect to the image at the 1280×720 resolution and subsequently scale the blurred image, the application may not combine the conform and scaling effects when rendering the output image.

In addition to generating the output image for the project, the media-editing application generates and displays the on-screen controls used to set the effects. Different controls are used for different effects, in some embodiments. For instance, an editor can use the transform tool of some embodiments illustrated in FIGS. 22 and 24 to scale an image while maintaining the image aspect ratio, to translate an image within the output space (including out of the output space such that only a portion of the source image appears in the output image), and to rotate the image within the output space. The application of some embodiments also displays on-screen controls for cropping images and distorting images, as well as other effects such as color keying.

Some embodiments display the on-screen controls as a particular absolute size in the display regardless of the size of the image on which they are displayed or the size of the preview display area. As such, the application displays the on-screen controls as a varying percentage of the output image. When the output image is larger, then the on-screen controls are smaller in relation to the image.

When generating an image for display in the preview display area, some embodiments of the media-editing application identifies the size of the output image that is actually displayed, based on the resolution of the display device on which the image will be displayed and the size of the preview display area on that device. For purposes of this discussion, the output space refers to the rendered output image (e.g., for a 1080p image, a 1920×1080 space) while the screen space refers to the displayed version of that image in the preview display area. In order to generate the image for output, some embodiments identify a transform from the output space to the screen space that scales the output image to fit in the screen space.

In order to define the display of the on-screen controls in the output image space, some embodiments determine the size of the controls in the screen space (e.g., using the percentage of the screen space occupied), then apply the inverse of the output space to screen space scaling transform to the control parameters. Even if these are calculated as percentages of the screen space, the application does not treat them as resolution-independent, and thus multiplies or divides the percentage in order to scale the information into the output space. The application can determine the location of the controls in the output space using parameters stored for the effect to which the controls relate (e.g., the resolution-independent percentages). For instance, many of the on-screen controls are displayed at the edges of the image, and thus depend on the bounds of that image, which the application determines based on the effect parameters (e.g., the transform and distortion effects).

Figure 25:
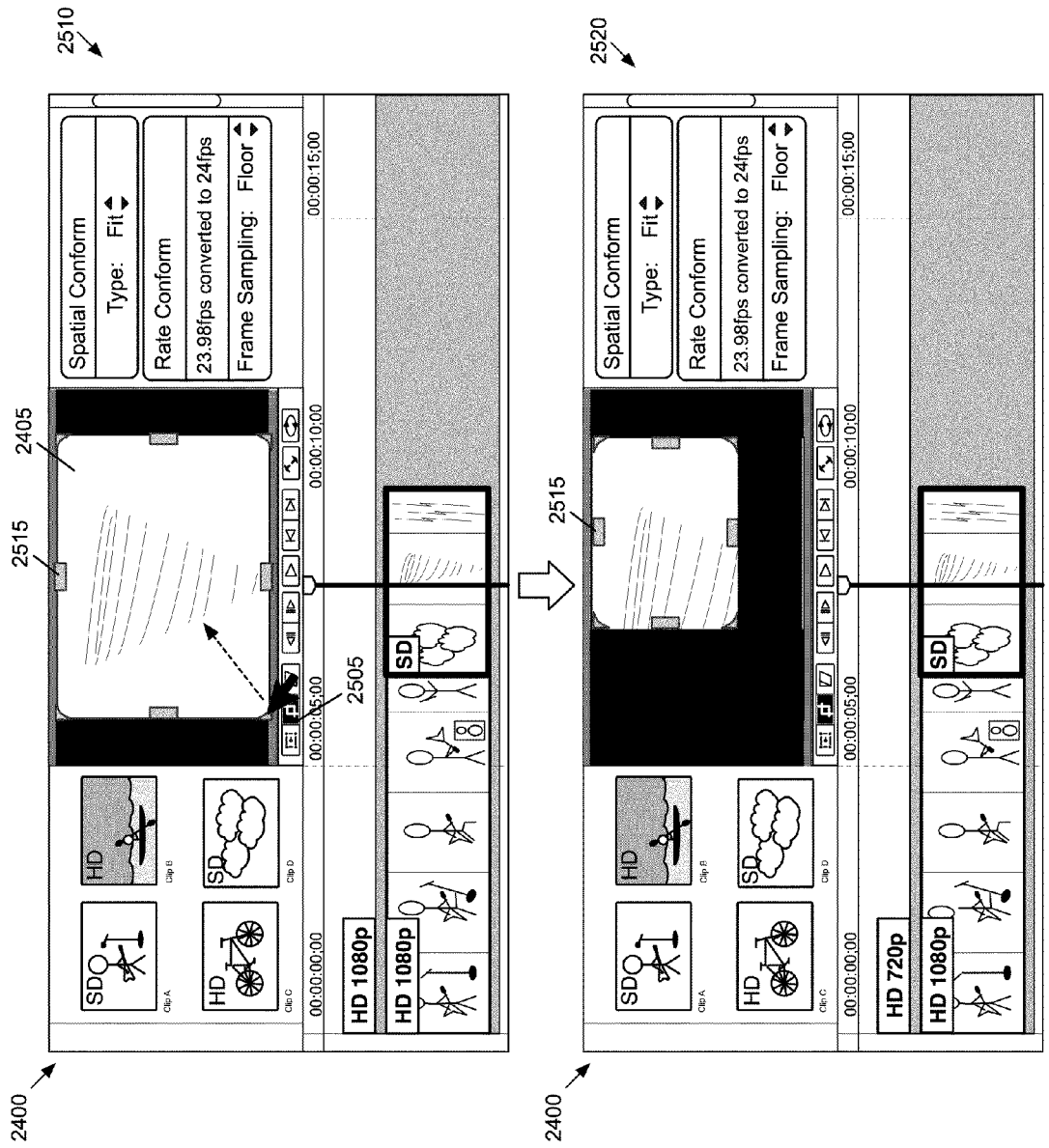
FIG. 25 illustrates the unchanging size of on-screen controls over two stages which illustrate the use of a crop tool in a GUI.

FIG. 25 illustrates the unchanging size of on-screen controls over two stages 2510 and 2520, which illustrate the use of a crop tool in the GUI 2500. In the first stage 2510, the user has selected the crop tool 2505 in the preview display area 2405, which causes the display of on-screen controls 2515 for the crop tool. These controls are initially shown bordering the output of the source image in image space. As illustrated, the controls have a particular absolute size, which is also a particular size relative to the image. In this stage, the user has also selected one of the corners of the crop controls and is dragging it upwards and to the right.

The stage 2520 illustrates the result of this action. The output image now includes only a portion of the source image, as a large portion of the source image has been cropped out by the crop effect. For the crop effect, some embodiments store the crop information as a percentage of the source image space (i.e., indicating which portion of the source image is used), rather than a percentage of the output image space. As illustrated, the on-screen controls 2515 are displayed at the same size in stage 2520 as in stage 2510. Similarly, if the user were to shrink the size of the preview display area 2405 within the GUI 2400, the crop controls 2515 would remain the same size, thereby increasing in size relative to the images (which would be shrunk for display in the smaller preview display area 2405).

V. Automatic Temporal Conform

The spatial conform effect described above relates to the size and layout of source images in an output image, and is used by the media-editing application of some embodiments to conform images in one format for output in another format. Other properties of a media clip might differ from a media project as well, such as the frame rate. The frame rate of a media clip is the rate at which a device (e.g., a camera) captured the video images in the video file to which the clip refers. As described above in Section II, some embodiments store this information in an asset data structure for the video file.

The frame rate of a media project or sequence is the rate at which the application generates output images for the project. For instance, if a user sets the frame rate of a project at 30 frames per second (fps), then the application generates thirty images for each second along the project timeline, regardless of the frame rate of the media clips in the project. When a media clip's frame rate does not match up with the frame rate of a project to which the clip is added, then the media-editing application of some embodiments uses a rate conform effect to generate output images at the project frame rate using the media clip's source images.

Figure 26:
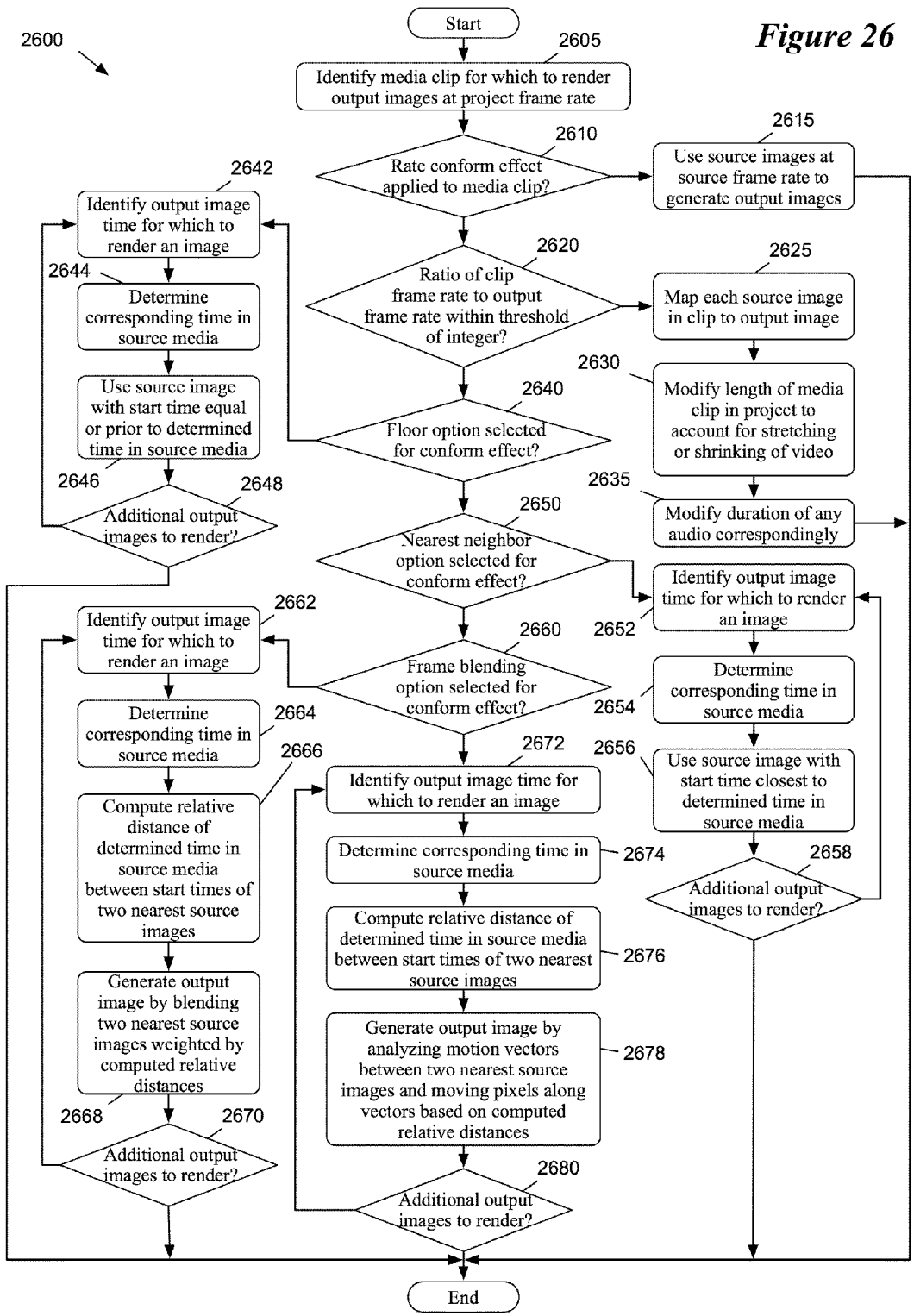
FIG. 26 conceptually illustrates a process for generating output images for a media project from a media clip that is part of the project.

FIG. 26 conceptually illustrates a process 2600 for generating output images for a media project from a media clip that is part of the project. That is, the process generates images for the project over the time spanned by the media clip. For a project with several media clips (many projects will have hundreds or thousands), the media-editing application of some embodiments performs the process 2600 repeatedly.

This process assumes that the rate conform effect is the only effect in the effect stack for the media clip, and thus in order to generate an output image from the source video images, no additional operations are needed. One of ordinary skill in the art will recognize that in many situations, the rate conform is one of several operations the media-editing application rendering engine performs in order to generate output images. For instance, some embodiments perform the rate conform operation to generate images of the source image resolution at the output frame rate, then apply a spatial conform operation to these images to generate output images. More complicated editing scenarios will call for rate-conformed images to be blended with other rate-conformed images of a different media clip, etc.

The process 2600 will be described by reference to FIGS. 27-38. FIG. 27 illustrates a table that indicates whether to perform a rate conform operation on a media clip by using 1:1 frame mapping, while FIGS. 28-38 conceptually illustrate examples of different types of rate conform operations.

As shown, the process 2600 begins by identifying (at 2605) a media clip for which to render output images at a project frame rate. This media clip might be a clip through which the user is skimming (in which case, the media-editing application might only render some of the images in order to prepare the images in time). The application could be playing back the media project or be background rendering a segment of the media project that includes the media clip. For a more detailed discussion of background rendering and media segmentation, see U.S. patent application Ser. No. 13/161,467, filed May 15, 2011 and entitled "Media-Editing Application with Automatic Background Rendering Capabilities", which is incorporated herein by reference.

The process then determines (at 2610) whether a rate conform effect is applied to the media clip. When a user adds a media clip to the project, in some embodiments the media-editing application determines whether to apply a rate conform effect to the media clip. When the media clip's source video has the same frame rate as the media project, then the application does not need to apply a rate conform, as each image in the source video corresponds to an output image (though the source image may be manipulated in a variety of ways in order to actually generate the output image). On the other hand, when the frame rates of the clip's source video and the project are different, the media-editing application applies a rate conform effect to the clip (i.e., stores the rate conform effect in the clip's effect stack). At time of rendering the media project, the application applies the effects in the effect stack to the source media, including the rate conform (e.g., by applying process 2600).

When no rate conform effect is applied to the media clip, the process 2600 uses (at 2615) the source images at the source frame rate to generate the output images. That is, each image in the source video matches up with a time in the media project, and the application uses the source images in their corresponding times of the project. For instance, if a media clip and project both have frame rates of 24 fps, and the media clip starts at a particular time T into the project, then the source image used at time T will be the first image of the clip's source video (assuming the clip is not trimmed at the start). The image used at time T+t will be the image that starts at time t of the source video. As a specific example, the source image displayed from $5/24$ seconds to $6/24$ seconds of the source video is used for the output image from time T+$5/24$ seconds to T+$6/24$ seconds of the media project. The process 2600 then ends.

When the media clip frame rate differs from the project frame rate, and thus a rate conform effect is applied to the clip, the process 2600 determines which of several different rate conform options to apply in order to generate output images. As shown, the process determines (at 2620) whether the ratio of the clip frame rate to output frame rate is within a threshold of an integer. If the frame rates are close (e.g., 23.98 fps and 24 fps, or 24 fps and 25 fps, etc.), then the application still performs a 1:1 mapping of the source images to the output images.

FIG. 27 illustrates a table 2700 that shows when some embodiments use such a rate conform effect for various common frame rates. The table shows various frame rates for the source media along the left and frame rates for a project (or sequence) along the top, with the intersections of the frame rates indicating whether the media-editing application uses a 1:1 mapping. The chart indicates "no" for frame rates that are too far apart and thus no timescaling, as well as along the diagonal because there is no conform effect necessary when the rates are the same. For the most part, video is captured at one of these frame rates (23.98p, 24p, 25p, 29.97p, 30p, 50p, 59.94p, 60p, 25i, and 29.97i). In some embodiments, the media-editing application restricts the project output format to a standard frame rate. In fact, some such embodiments limit the output frame rate further depending on the format selected (e.g., limiting a NTSC SD project to either 23.98 or 29.97, the frame rates allowed by the NTSC standard).

The table 2700 includes both progressive (e.g., 24p, 60p) and interlaced (e.g., 25i, 29.97i) formats. The progressive formats specify a number of frames per second, while the interlaced formats specify a number of fields per second (images that only use every other row of pixels in an image). To convert from an interlaced source video to a progressive output, some embodiments use line averaging techniques well-known in the art (e.g., converting from 25i to 50p). Conversely, to convert from a progressive source video to an interlaced output, some embodiments either remove half of the lines of each image (e.g., for 50p to 25i) or split each image in two (e.g., for 25p to 25i). Some embodiments use pixel transform matrices to convert from frames (for progressive formats) to fields (for interlaced formats), and vice versa. For instance, to convert from fields to frames, some embodiments expand the fields as well as spatially align them, as the upper field image will be shifted down by half a pixel and the lower field image will be shifted up by half a pixel.

As seen in the table 2700, a 23.98 fps video can be mapped to a 24, 25 or 50 fps project. In order to map the 23.98 fps video to a 50 fps project, some embodiments actually map the source video to 25 fps, then use each image twice to output at 50 fps. A 24 fps video can be mapped to a 23.98, 25, or 50 fps project, etc. So long as the ratio of the source media frame rate and the output frame rate is close to an integer (i.e., almost equal, or one is around twice the other), then the media-editing application of some embodiments uses each image once in the rendered output (or twice, in the case of rate-doubling such as going from 29.97 fps to 60 fps).

When the rates are close enough, the process 2600 maps (at 2625) each source image of the media clip to an output image. This may not be each source image of the file referred to by the clip, because the clip could have a trimmed range that is less than its total range, thereby excluding a portion of the source video (e.g., as shown in FIG. 6). The output video that results from this mapping is a slightly stretched or shrunk version of the source media. For instance, if conforming a 25 fps video to 24 fps, then one second of video will play in 1 and $1/24$ seconds (and 24 seconds of video will be stretched out to 25 seconds). Conversely, if conforming 24 fps video to 25 fps, then one second of video will play in $24/25$ seconds (and 25 seconds of video will be compressed to 24 seconds). In most cases, the stretch or compression will not be noticeable to the viewer as it is such a minor amount, and is preferable to other options that involve skipping or doubling an image.

Figure 28:
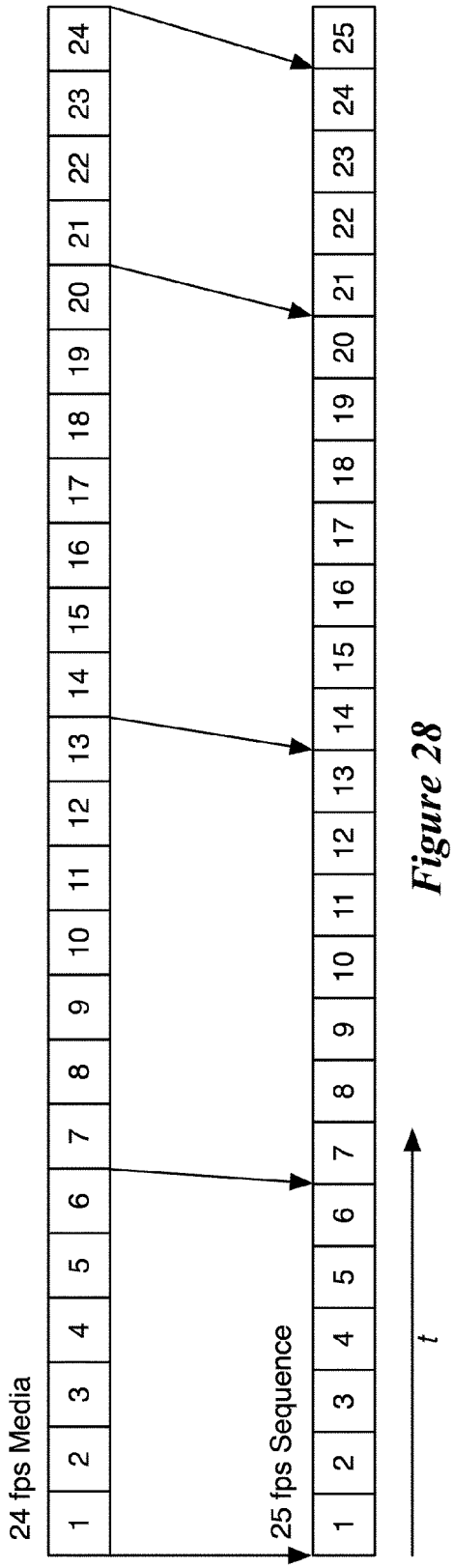
FIGS. 28 and 29 conceptually illustrate the mapping of some embodiments of 24 fps source media into a 25 fps sequence, and vice versa.
Figure 29:
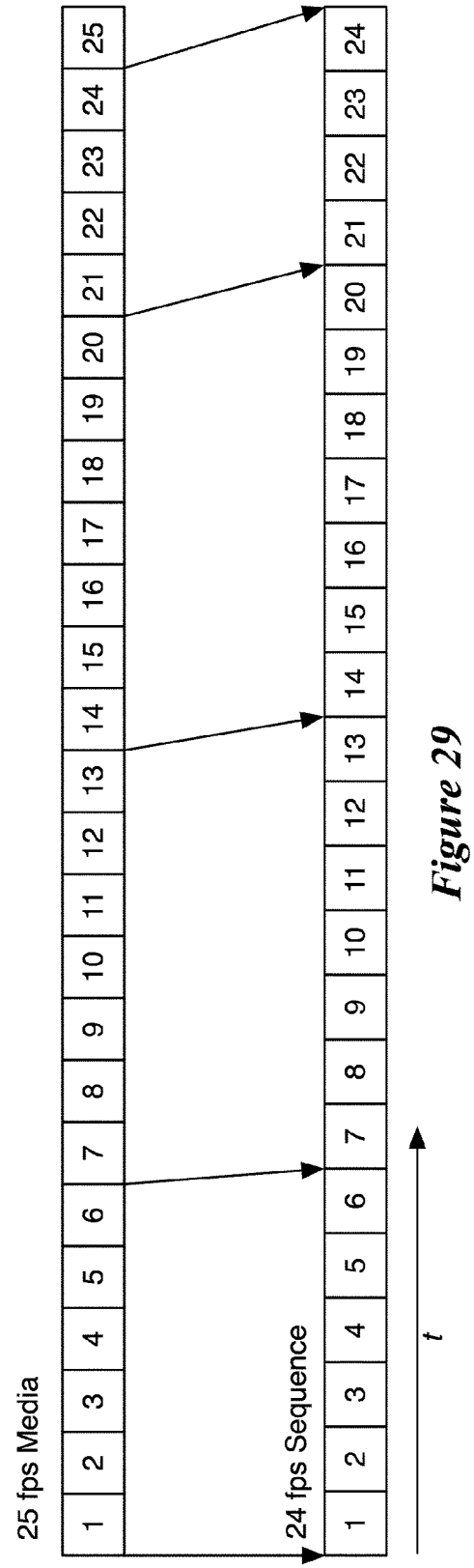

FIGS. 28 and 29 conceptually illustrate the mapping of some embodiments of 24 fps source media into a 25 fps sequence, and vice versa. These figures are drawn to conceptually illustrate video as a series of images laid out over time, where the width of each image represents the length of time a media player (e.g., the media-editing application, a separate media player, etc.) would display the image when playing the video. For example, in FIG. 28, each of the source media images represents $1/24$ of a second and each of the sequence images represents $1/25$ of a second. As illustrated, the first image (t=0) of the source media maps to the first image (t=0) of the sequence. Correspondingly, the seventh image (t=$1/4$ seconds) of the source media maps to the seventh image (t=6/25 seconds) of the sequence, and so on. The twenty-fifth source image (not shown) at t=1 second maps to the twenty-fifth image in the sequence, at t=24/25 seconds. As time goes on, the difference between source media time and sequence time grows larger and larger (the sequence media time gets earlier relative to the source media time), as the video is compressed in time.

In FIG. 29, each of the source media images represents 1/25 of a second and each of the sequence images represents 1/24 of a second. As shown, the first image (t=0) of the source media maps to the first image (t=0) of the sequence. Correspondingly, the seventh image (t=6/25 seconds) of the source media maps to the seventh image (t=1/4 seconds) of the sequence, and so on. The twenty-sixth source image at t=1 seconds maps to the twenty-sixth image in the sequence (not shown), at t=1 and 1/25 seconds. As time goes on, the difference between source media time and sequence time grows larger (the sequence media time gets later relative tot the source media time), as the video expands in time.

These times assume that the media clip is the first clip in the sequence (and thus starts at t=0) and also that the media clip starts at the beginning of the source media. When the media clip starts at time T of the sequence, then the image starting at time t within the source video maps to time T+t*R in the sequence, where R is the ratio of the source media frame rate to the sequence frame rate. When the media clip trims a time P from the start of the source file, then the image starting at time t within the source video maps to time t*R−P in the sequence. Thus, the general mapping for a source image to a sequence image is the image at time t in the source file maps to a time t*R+(T−P).

After mapping the source images to the output, the process 2600 modifies (at 2630) the duration of the media clip in the project to account for any stretching or shrinking of video. If a user adds a video clip that has a trimmed range of T and a frame rate of $F_s$ to a sequence with a frame rate of $F_O$, then the length of the clip in the sequence will be $T*(F_S/F_O)$. For example, a 30 fps clip with a duration of 3 minutes will have a duration of 3 minutes and 0.18 seconds in a 29.97 fps sequence. For longer clips or for greater disparities in frame rate (e.g., 24 to 25, 23.98 to 25), the time differences will be larger. For an editor using the media-editing application to make precision edits at the frame level, having the duration of a media clip appear correctly in a timeline is very important.

The process 2600 also modifies (at 2635) the duration of any audio that is synchronized with the video. As shown in FIG. 7, many video component clips have anchored audio components that refer to the same asset as the video component. In this situation, and for any other case in which audio has been synchronized with video, the media-editing application stretches or compresses the audio to match the video. To ensure that the audio sounds the same, some embodiments employ a pitch-preserving algorithm so that compressed audio does not sound too high-pitched and expanded audio does not sound too low-pitched. After compressing both the audio and video, the process 2600 ends.

When a 1:1 frame mapping will not work because the frame rates of the media clip and project are too far apart, the process of some embodiments performs frame generation for each image in the project over the duration of the media clip. In some embodiments, the media-editing application may generate the output images from the source media in one of several different ways. Some embodiments provide a user interface tool that allows a user of the application to select between different rate conform options for a particular media clip. For instance, some embodiments include a rate conform item in the inspector display area (along with a spatial conform item as shown in FIG. 24 and a variety of other GUI controls) when a user selects clip to which the application has applied a rate conform effect. When a user selects this item, the application presents a display area giving different frame generation options for the user to select.

In some embodiments, these options are floor, nearest neighbor, frame blending, and optical flow, and the process 2600 describes these four options. However, one of ordinary skill in the art will recognize that various embodiments may use only a subset of these options, or may use more or different options. In addition, the process 2600 evaluates whether the different options are selected in a particular order. One of ordinary skill will recognize that this process is conceptual, and that some embodiments do not actually make successive determinations as to whether each particular option is selected, but rather receive an indication of the selected option (e.g., as a value of a variable) and perform the selected option. In some embodiments, the application stores different effects in the media clip effects stack (e.g., a floor effect or a nearest neighbor effect rather than simply a rate conform effect).

The process 2600 determines (at 2640) whether the floor option is selected for the rate conform effect. As stated, this may be based on a variable set for the rate conform effect in some embodiments, while other embodiments would have a floor effect in the effect stack of the media clip.

As shown, when the floor option is selected, the process 2600 identifies (at 2642) an output image time for which to render an image. Some embodiments start at the beginning of the media clip's duration and generate an image for each output frame in the duration of the media clip. In some embodiments, the media-editing application denotes the time of an output image as the time in the project that the image begins (i.e., the first project image is at time t=0).

The process then determines (at 2644) a time in the source media that corresponds to the current identified output time. For an output time $t_O$, the corresponding source media time $t_S=t_O−T+P$, where T is the start time in the project for the media clip and P is the duration into the source media at which the trimmed range of the media clip starts (i.e., for a collection clip that only includes one component clip in its ordered array, the difference between the total range and trimmed range). Because of the difference in frame rates, this time in the source media may not actually correspond to the beginning of an image (i.e., may fall in between frame start times). For example, the start time of the third image in a 24 fps project will fall in between the third and fourth start times of a 30 fps source media.

The process then uses (at 2646) the first source image with a start time equal to or prior to the determined source media time for generating the output image at this time. That is, if a source media image has a start time equal to the source media time that corresponds to the desired output image start time, then the media-editing application uses this source image for the output image. Otherwise, the application uses the image with a start time previous to the determined time in the source media (that is, the image whose display time includes the time corresponding to the output image start time).

Figure 30:
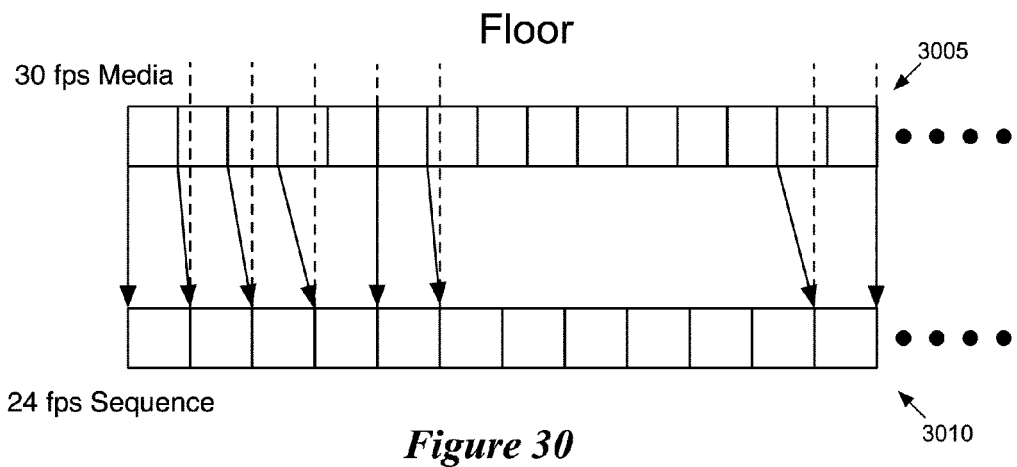
FIGS. 30 and 31 conceptually illustrate examples of source image selection using the floor option of some embodiments.
Figure 31:
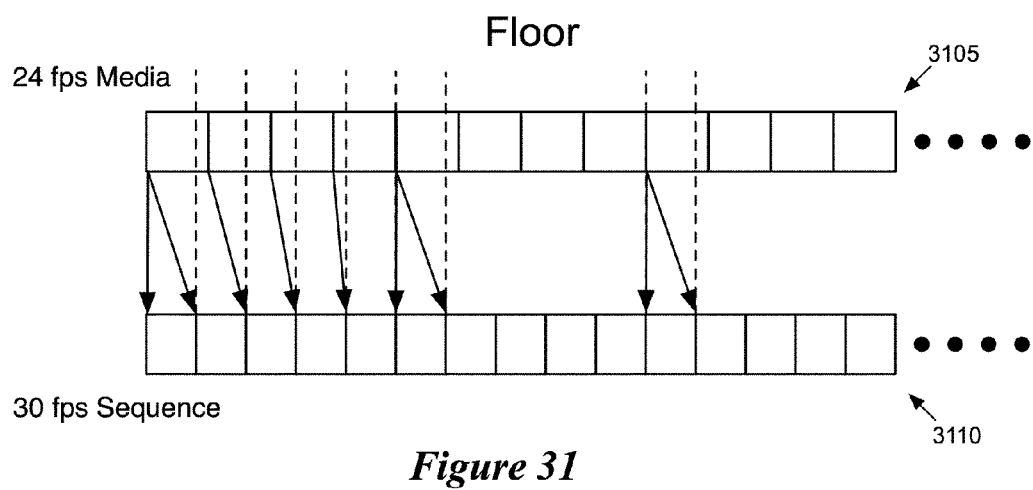

FIGS. 30 and 31 conceptually illustrate examples of source image selection using the floor option of some embodiments. Specifically, FIG. 30 illustrates an example of 30 fps source video 3005 in a 24 fps sequence 3010, while FIG. 31 illustrates an example of 24 fps source video 3105 in a 30 fps sequence 3110. As with FIGS. 28 and 29, these figures illustrate video as series of images laid out over time, where the width of each image represents the duration that a media player would display the image when playing the video. As such, the 30 fps images are shown as narrower than the 24 fps images. In these figures, the dashed lines indicate output image start times, while the solid arrows indicate the mapping of a source image to an output image.

For example, in FIG. 30, the first output image uses the first source image as they are both at time 0. The second output image (start time of $\frac{1}{24}$ seconds) uses the second source image ($\frac{1}{30}$ seconds), the third output image ($\frac{1}{12}$ seconds) uses the third source image ($\frac{1}{15}$ seconds), and the fourth output image ($\frac{1}{8}$ seconds) uses the fourth source image ($\frac{1}{10}$ seconds). However, the fifth output image ($\frac{1}{6}$ seconds) has the same start time as the sixth source image, and thus the floor algorithm uses this sixth source image. The result is that the output skips every fifth source image.

In FIG. 31, the first output image uses the first source image again, as they are both at time 0. The second output image (start time of $\frac{1}{30}$ seconds) also uses this first source image, as the second source image ($\frac{1}{24}$ seconds) starts after the second output image time. The third output image ($\frac{1}{15}$ seconds) uses the second source image, the fourth output image ($\frac{1}{10}$ seconds) uses the third source image ($\frac{1}{12}$ seconds), and the fifth output image ($\frac{2}{15}$ seconds) uses the fourth source image ($\frac{1}{8}$ seconds). The sixth output image start time is again the same as the fifth source image start time ($\frac{1}{6}$ seconds), and the pattern repeats itself. As such, every fourth source image is used twice in this case.

After generating the output image, the process 2600 then determines (at 2648) whether additional output images remain for the media-editing application to render within the duration of the media clip. When additional output images need to be generated, the process returns to 2642 to identify the start time for the next output image and generate the next output image using the floor algorithm. Once all images have been generated for the duration of the media clip within the project, the process ends.

When the floor option is not selected, the process 2600 determines (at 2650) whether the nearest neighbor option is selected for the rate conform effect. Like with the floor option, this may be based on a variable set for the rate conform effect in some embodiments, while other embodiments would have a nearest neighbor effect in the effect stack of the media clip.

When the nearest neighbor option is selected, the process 2600 then identifies (at 2652) an output image time for which to render an image, and determines (at 2654) a time in the source media that corresponds to the identified output time. In some embodiments, these operations are the same as those performed at 2642 and 2644. In fact, in some embodiments the functions for performing the floor and nearest neighbor algorithms both call the same function or functions to determine these times.

The media-editing application uses (at 2656) the source image with the start time closest to the determined source media time for generating the output image at this time. In this case, the source image can start either before or after the output image start time. When the desired image output time corresponds to a time halfway in between two source image start times, different embodiments select which of the two images to use differently (either choosing the earlier image or the later image).

Figure 32:
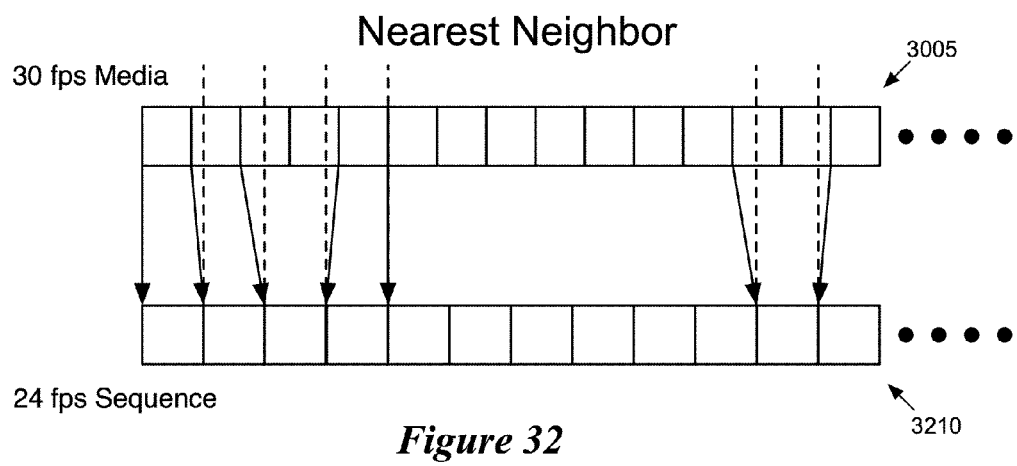
FIGS. 32 and 33 conceptually illustrate examples of source image selection using the nearest neighbor option of some embodiments.
Figure 33:
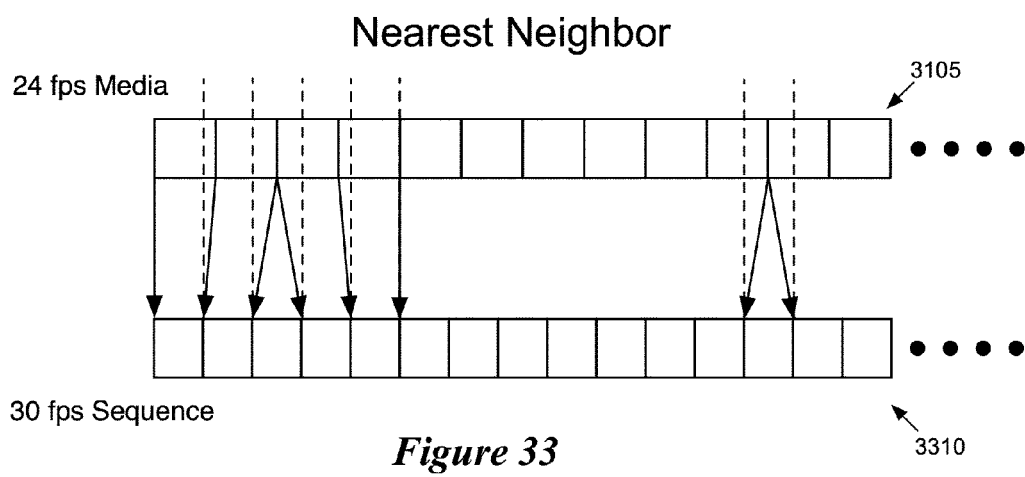

FIGS. 32 and 33 conceptually illustrate examples of source image selection using the nearest neighbor option of some embodiments. Specifically, FIG. 32 illustrates the same 30 fps source video 3005 in a 24 fps sequence 3210, while FIG. 33 illustrates the same 24 fps source video 3105 in the 30 fps sequence 3310. As with FIGS. 30 and 31, the dashed lines indicate output image start times, while the solid arrows indicate the mapping of a source image to an output image.

For example, in FIG. 32, the first output image uses the first source image as they are both at time 0. The second output image (start time of $\frac{1}{24}$ seconds) uses the second source image ($\frac{1}{24}$ seconds is closer to $\frac{1}{30}$ seconds than to $\frac{1}{15}$ seconds), and then the third output image (start time of $\frac{1}{12}$ seconds) is halfway in between the start of the third source image and the fourth source image ($\frac{1}{12}$ seconds is closer to $\frac{1}{15}$ seconds than to $\frac{1}{10}$ seconds). In this case, the media-editing application selects the earlier source image (the third image), which results in the fourth source image being skipped. As with the floor option, every fifth image will be skipped, but the application skips a different image with the nearest neighbor option than with the floor option. Some embodiments would use the fourth source image rather than the third because the duration of the duration of the third output image has a larger time overlap with the duration of the fourth source image rather than the third source image. Using this method, the application would select the later source image when the source frame rate is larger than the output frame rate and would select the earlier source image when the source frame rate is smaller than the output frame rate.

In FIG. 33, the first output image again uses the first source image, as they are both at time 0. The second output image (start time of $\frac{1}{30}$ seconds) uses the second source image ($\frac{1}{30}$ seconds is closer to $\frac{1}{24}$ seconds than to 0), the third output image uses the third source image ($\frac{1}{15}$ seconds is closer to $\frac{1}{12}$ seconds than to $\frac{1}{24}$ seconds, and the fourth output image also uses the third source image ($\frac{1}{10}$ seconds is closer to $\frac{1}{12}$ seconds than $\frac{1}{8}$ seconds). The fifth output image then uses the fourth source image, and the sixth output image has the same start time as the fifth source image. As with the floor option, every fourth source image is repeated in the output, but the application repeats a different image with the nearest neighbor option than with the floor option.

After generating the output image, the process 2600 then determines (at 2658) whether additional output images remain for the media-editing application to render within the duration of the media clip. When additional output images need to be generated, the process returns to 2652 to identify the start time for the next output image and generate the next output image using the nearest neighbor algorithm. Once all images have been generated for the duration of the media clip within the project, the process ends.

The floor and nearest neighbor algorithms each map one source image to each output image. Some embodiments include additional options that generate new images for the project output that are based on the source images but are not necessarily the same as any of the source images (i.e., have different pixels than the source images). When neither the floor nor the nearest neighbor options are selected, the process 2600 determines (at 2660) whether the frame blending option is selected for the conform effect. As with the options described above, this may be based on a variable set for the rate conform effect in some embodiments, while other embodiments have a frame blending effect in the effect stack of the media clip.

When the frame blending option is selected, the process 2600 then identifies (at 2662) an output image time for which to render an image, and determines (at 2664) a time in the source media that corresponds to the identified output time. In some embodiments, these operations are the same as those performed at 2642 and 2644. In fact, in some embodiments the function for performing the frame blending algorithm calls the same function or functions as the floor and nearest neighbor algorithms in order to determine these times.

Next, the process 2600 computes (at 2666) the relative distance of the time corresponding to the desired output image start time in the source media from the start time of the two nearest source images. For example, if the corresponding time in the source media is the same as one of the source image start times, then the relative distance is 0 to this source image and none of the other images matter. If the corresponding time in the source media is halfway between two source image start times, then the relative distance is 50% for each of these two source images.

Figure 34:
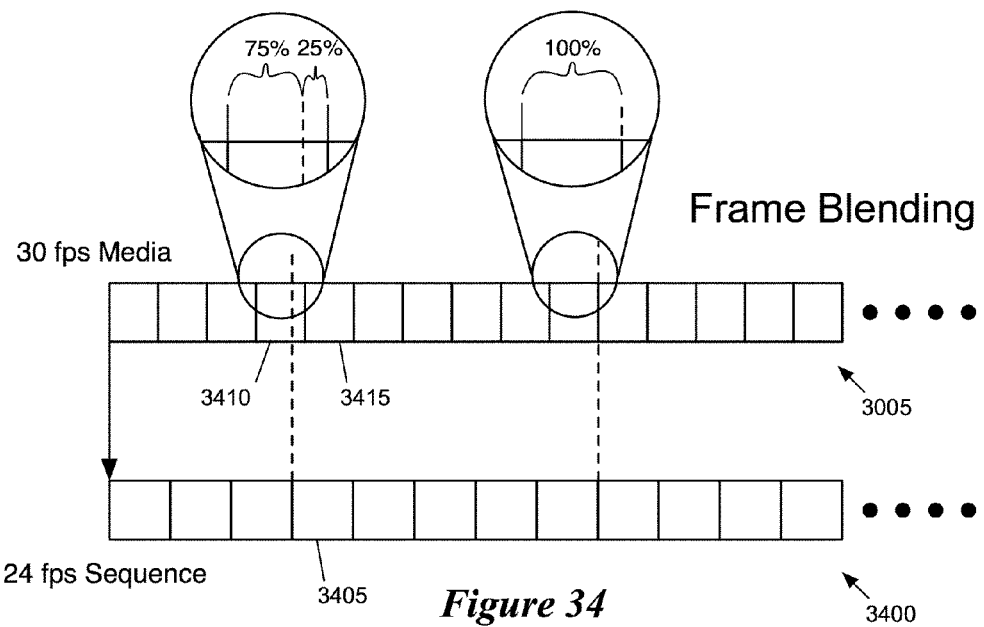
FIGS. 34 and 35 conceptually illustrate examples of identifying relative time durations for frame blending according to some embodiments.
Figure 35:
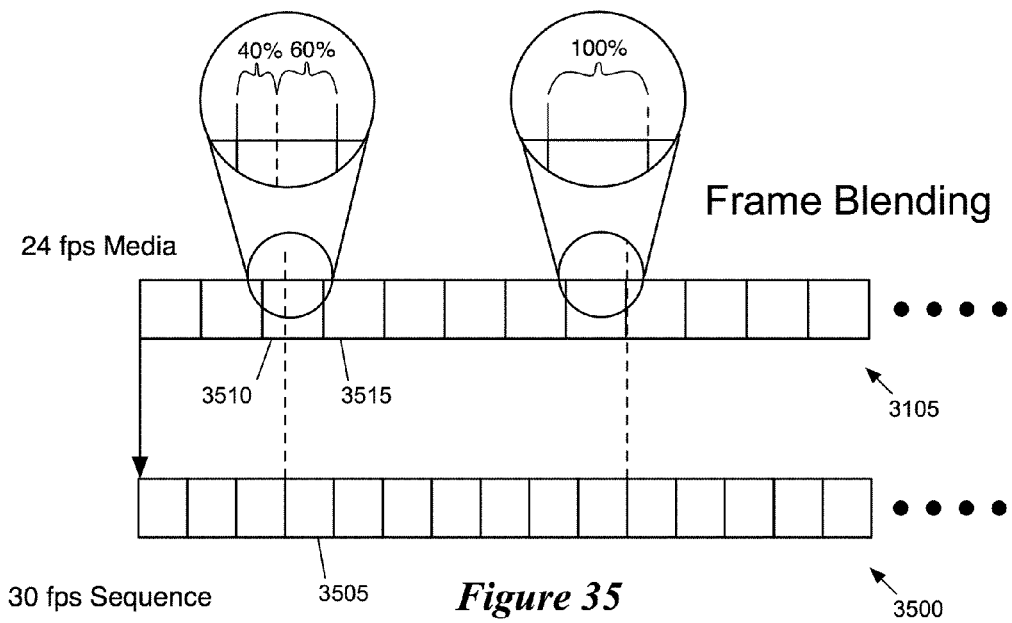

FIGS. 34 and 35 conceptually illustrate examples of identifying relative time durations for frame blending according to some embodiments. Specifically, FIG. 34 illustrates the same 30 fps source video 3005 in a 24 fps sequence 3400, while FIG. 33 illustrates the same 24 fps source video 3105 in a 30 fps sequence 3500 as FIG. 31. As with the previous figures, the dashed lines indicate output image start times. However, because frame blending does not map a single source image to an output image, the diagram does not use solid arrows to show such mapping.

Instead, each figure illustrates the relative distances of output image start times from nearby images. For example, in FIG. 34, the fourth output image 3405 has a start time of ⅛ seconds, which falls in between the start time of the fourth source image 3410 (at 1/10 seconds) and the start time of the fifth source image 3415 (at 2/15 seconds). The fourth output image start time is 1/40 seconds from the fourth source image start time and 1/120 seconds from the fifth source image start time. Normalized, as shown in the figure, the distance from the fourth image start time is 75% of the source frame duration and the distance from the fifth image start time is 25% of the source frame duration. On the other hand, the start time of the ninth output image matches up with the start time of the eleventh source image.

In FIG. 35, the fourth output image 3505 has a start time of 1/10 seconds, which falls in between the start time of the third source image 3510 (at 1/12 seconds) and the start time of the fourth source image 3515 (at ⅛ seconds). The fourth output image start time is 1/60 seconds from the third source image start time and 1/40 seconds from the fourth source image start time. Normalized, as shown in the figure, the distance from the third source image start time is 40% of the source frame duration and the distance from the fourth image start time is 60% of the source frame duration.

After determining these relative distances in time, the process generates (at 2668) an output image by blending the two nearest source images weighted by the computed relative distances. The closer a source image start time is to the output image start time, the more the application weights that image in the computation of the new image. Some embodiments blend the images on a pixel-by-pixel basis, generating each pixel of the output image as a weighted combination of corresponding pixels in the two source images.

Figure 36:
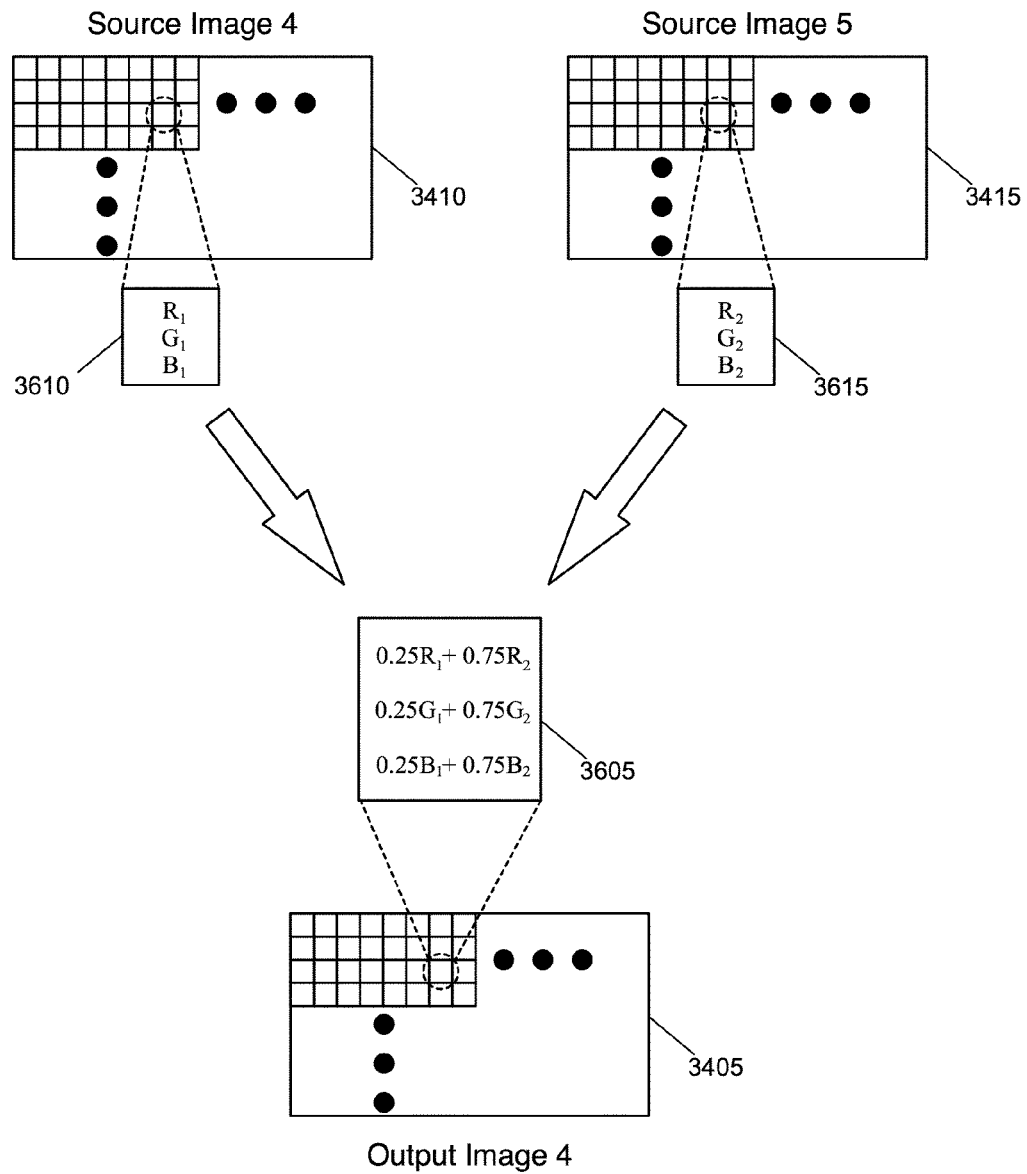
FIG. 36 conceptually illustrates weighted blending of two source images to generate an output image.

FIG. 36 conceptually illustrates this weighted blending of the source images 3410 and 3415 to generate the output image 3405. Each of these three images is illustrated as a matrix of pixels, with each image having the same number of pixels in the same alignment. When a media clip has both a rate conform effect and a spatial conform effect applied, some embodiments perform the rate conform operation first in order to generate intermediate images and then spatially conform these intermediate images to generate images in the output space.

This figure shows an exploded view of a particular pixel 7 pixels to the right and three pixels down from the top left corner of each of the images. In a 1920×1080 image, this pixel would have coordinates of (7, 1078), using the bottom left as the origin. The pixel 3610, from image 3410, has pixel values of $(R_1, G_1, B_1)$, while the pixel 3615 from image 3415 has pixel values of $(R_2, G_2, B_2)$. These pixel values are coordinates in the RGB color space. Different embodiments will use different color spaces, which may depend on the color space used for the originally captured images. For instance, a video captured and encoded using the YCbCr color space may be decoded into an image in the YCbCr color space. Some embodiments convert decoded images into a color space suitable for the use of the image (e.g., the RGB colorspace of an output display device).

As shown in FIG. 34, the relative distances for the start times of source images 3410 and 3415 are 75% to 25%, with the fourth source image 3405 three times as far from the desired output image start time as the fifth source image 3415. As such, in generating the output image, the media-editing application weights the fifth source image 3415 three times more than the fourth source image 3410. Thus, the RGB values for the pixel 3605 of the output image 3405 are $(0.25R_1+0.75R_2, 0.25G_1+0.75G_2, 0.25B_1+0.75B_2)$. The application uses a similar computation to calculate the pixel values for each of the other pixels in the output image 3405, weighting the pixels from image 3415 three times as much as the pixels from image 3410.

In the case of the images shown in FIG. 35, the output image 3505 would use the pixel values of the third source image 3510 multiplied by 0.6 and the pixel values of the fourth source image 3515 multiplied by 0.4. While these operations involve resampling pixels (a computation-intensive operation), some embodiments skip this resampling for output images whose start times line up with source image start times. These examples show linearly weighted frame blending. Other embodiments may use different frame blending algorithms that use more complicated calculations between two images, or that use additional source images (e.g., two images on either side of the output image start time).

After generating the output image using the frame blending operation, the process 2600 then determines (at 2670) whether additional output images remain for the media-editing application to render within the duration of the media clip. When additional output images need to be generated, the process returns to 2662 to identify the start time for the next output image and generate the next output image using the frame blending algorithm. Once all images have been generated for the duration of the media clip within the project, the process ends.

When none of the floor, nearest neighbor, and frame blending options are selected, then the process determines that the optical flow option is selected, as it is the only remaining option (assuming that these are the four provided rate conform options). As for the other described options, a variable for the rate conform effect may be set to indicate the optical flow option in some embodiments, while other embodiments have an optical flow effect in the effect stack of the media clip.

When the optical flow option is selected, the process 2600 then identifies (at 2672) an output image time for which to render an image, and determines (at 2674) a time in the source media that corresponds to the identified output time. In some embodiments, these operations are the same as those performed at 2642 and 2644. In fact, in some embodiments the function for performing the optical flow algorithm calls the same function or functions as the other algorithms in order to determine these times.

The process then computes (at 2676) the relative distance of the time corresponding to the desired output image start time in the source media from the start time of the two nearest source images. In some embodiments, this operation is the same as that performed at 2666. In some embodiments, both the frame blending algorithm and the optical flow algorithm call the same function in order to determine the relative distances.

Figure 37:
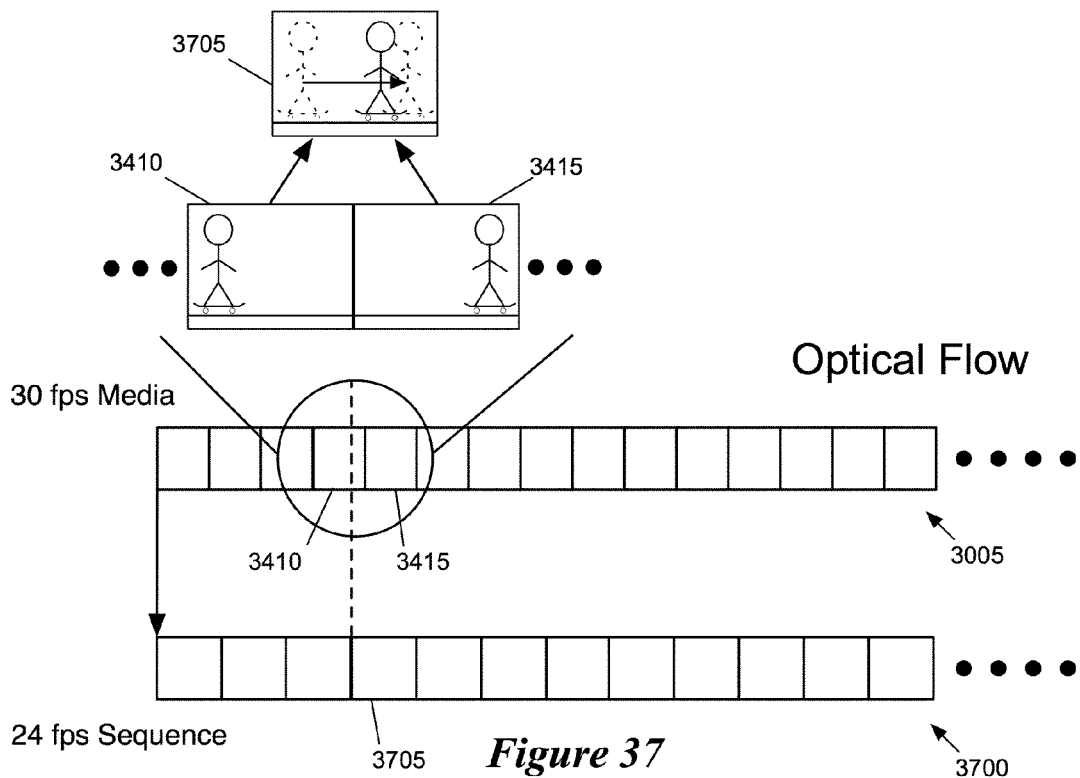
FIGS. 37 and 38 conceptually illustrate examples of identifying relative time durations for the optical flow algorithm.
Figure 38:
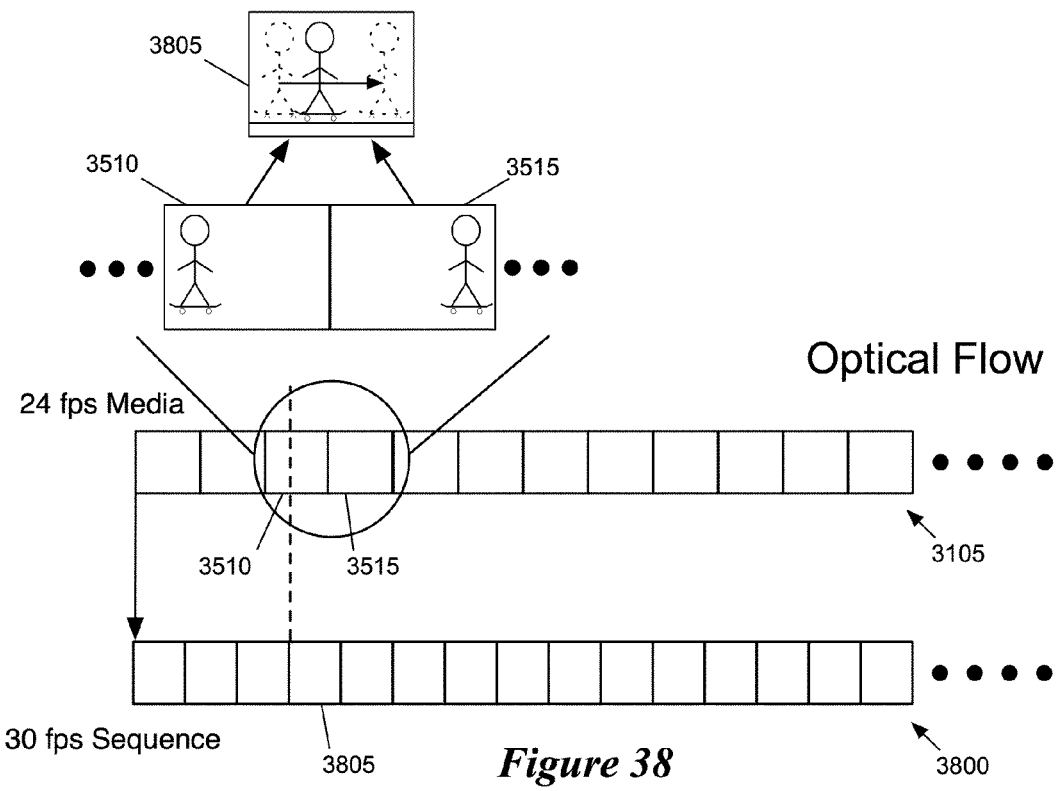

FIGS. 37 and 38 conceptually illustrate examples of identifying relative time durations for the optical flow algorithm. Specifically, FIG. 37 illustrates the same 30 fps source video 3005 in a 24 fps sequence 3700, while FIG. 38 illustrates the same 24 fps source video 3105 in a 30 fps sequence 3800. The dashed line in FIG. 37 indicates the start time for the fourth output image 3705, which is three-fourths of the way between the start time of the fourth source image 3410 and the fifth source image 3415. The dashed line in FIG. 38 indicates the start time for the fourth output image 3805, which is two-fifths of the way between the start time of the third source image 3510 and the fourth source image 3515.

With the relative distances determined, the process 2600 generates (at 2678) an output image by analyzing motion vectors between the two nearest source images and moving pixels along the motion vectors based on the computed relative distance. The optical flow algorithm attempts to discern what an image captured at the moment in time that corresponds to the output image would have looked like by using the motion of pixels between the two images. A particular pixel in an encoded image might have been encoded using a motion vector. The motion vector indicates a corresponding pixel in the previous image whose pixel values should be used for the particular pixel in the current image. The vector from the coordinates of the corresponding pixel in the previous image to the coordinates of the particular pixel in the current image is this motion vector. Some embodiments then generate an output image by assigning the pixel values of the particular pixel to a pixel at a given distance along this motion vector in the output image based on the relative distances computed at 2676.

For example, if the output image start time is halfway between the two source images, then the pixel halfway along the motion vector within the output image will be assigned the pixel values of the particular pixel. FIGS. 37 and 38 illustrate examples of using the optical flow algorithm to generate a new output image. As described above, in FIG. 37 the output image 3705 has a start time that is three-fourths of the way between the start time of the source image 3410 and the start time of the source image 3415. Accordingly, pixels in the source image 3415 with motion vectors are moved three-fourths of the way along their motion vectors in the output image 3705. These images show a skateboarder moving across the image from right to left, with the output image having the skateboarder three-quarters of the way between his location in the two images. Similarly, the skateboarder in the output image 3805 is two-fifths of the way between his location in the source image 3510 and his location in the source image 3515.

In practice, while many pixels in an image have motion vectors (which may indicate zero movement if the object of which the pixel is a part stays still between the images), some pixels will not (e.g., because a new object appears in the image, or the encoding process used to encode the image was unable to identify a motion vector). For such pixels, some embodiments use the frame blending technique described above (e.g., linearly weighting the two source image pixels). Other embodiments automatically use the pixel values from the nearest neighbor source image or the previous source image. Still other embodiments use a different algorithm to generate pixel value data for such pixels.

After generating the image data for the current output image, the process 2600 then determines (at 2680) whether additional output images remain for the media-editing application to render within the duration of the media clip. When additional output images need to be generated, the process returns to 2672 to identify the start time for the next output image and generate the next output image using the optical flow algorithm. Once all images have been generated for the duration of the media clip within the project, the process ends.

Some embodiments perform process 2600 or a variation thereof (e.g., one of the sub-processes depending on which rate conform option is selected) whenever the media-editing application needs to render a segment of a project. As mentioned, in some embodiments the application renders project segments (continuous sections of the project without changes in any properties applicable to the rendering) in the background so that the rendered video images are available for quick access when playing back or skimming through the project.

Figure 39:
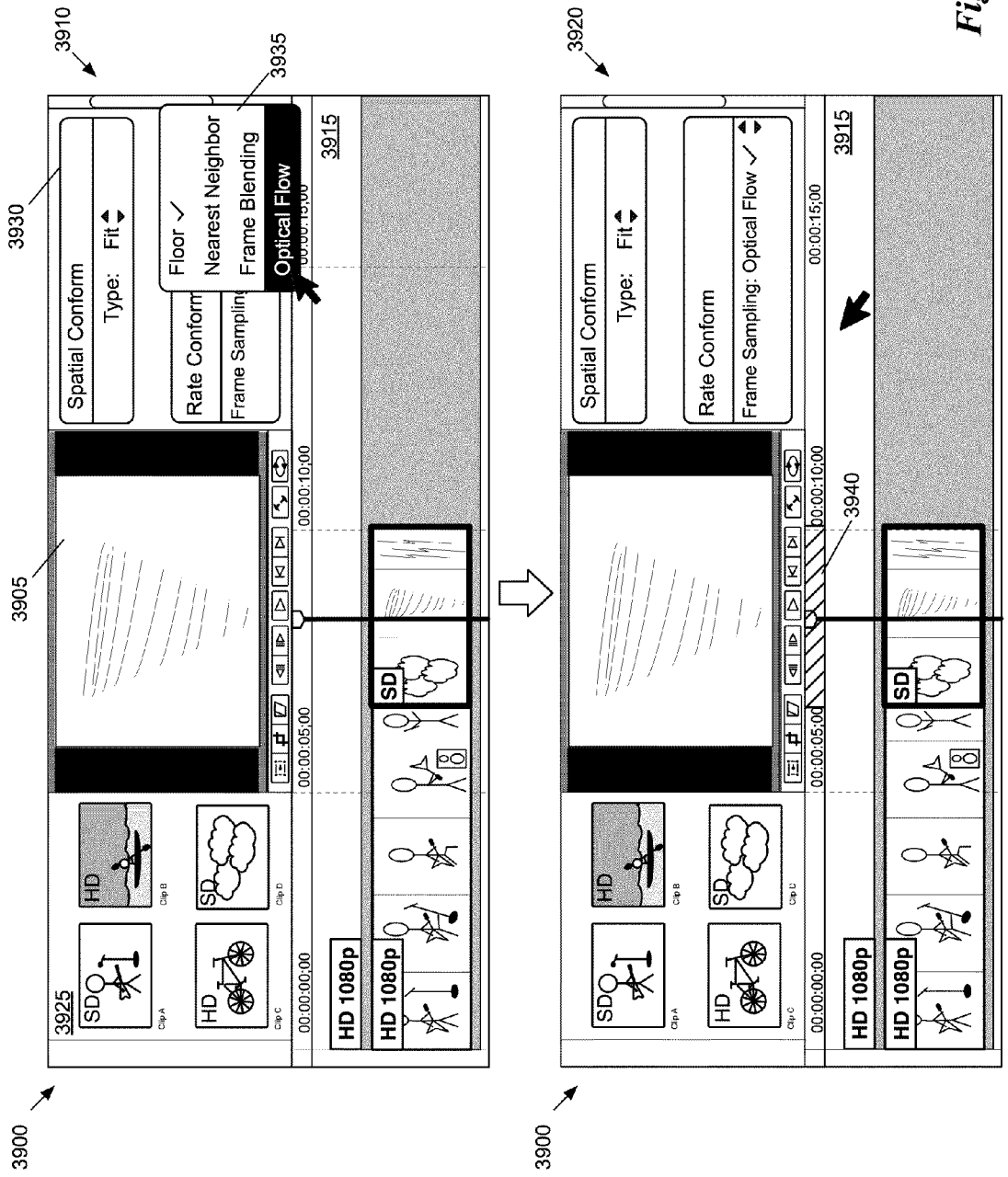
FIG. 39 illustrates a user changing the rate conform algorithm for a media clip in a GUI and the resulting need to background render the segment of the project containing the clip.

Some such embodiments render these segments as soon as the segments are created or changed. Accordingly, when a user modifies the rate conform algorithm for a media clip, the application will start background rendering any segments that include the media clip in order to replace the previous render files for the segments that are no longer accurate. FIG. 39 illustrates a user changing the rate conform algorithm for a media clip in a GUI 3900 and the resulting need to background render the segment of the project containing the clip over two stages 3910-3920. The GUI 3900 includes a preview display area 3905, a timeline 3915, a clip library 3925, and an inspector display area 3930, which are similar to the corresponding GUI structures in FIG. 25.

In the first stage 3910, the user has opened a display area 3935 for the rate conform effect in the inspector 3930. This drop-down menu allows the selection of one of the four aforementioned options for the rate conform effect: floor, nearest neighbor, frame blending, or optical flow. In this example, the floor option was previously selected, but the user is now selecting the optical flow option.

The second stage 3920 illustrates the GUI 3900 with the optical flow option now selected. As a result, the application displays a render bar 3940 in the timeline 3915 over the media clip. In some embodiments, this bar indicates that the application is in the process of background rendering a segment (or segments). As the application progresses through the rendering of the segment, the render bar will disappear.

VI. Conform Effects for Nested Clips

The above sections dealt with both spatial conform effects for modifying images of a media clip to match output sequence image properties and rate conform effects for modifying images of a media clip to match output sequence frame rates. These sections primarily related to single media clips that referenced a single asset (e.g., through a component clip to the asset) inserted into a media project.

In addition, the media-editing application of some embodiments allows users to create compound clips and nest media clips. A compound clip, in some embodiments, is a media clip that itself includes at least two media clips that reference different assets. The compound clips may include multiple clips in the primary ordered array, multiple anchored clips, or even one clip and an anchored clip.

Users may create compound clips in the media clip browser in some embodiments as well as in the timeline. In some embodiments, when a user creates a compound clip in the clip browser, the application prompts the user to assign properties to the clip (similar to the dialog for creating a new project, shown in Section II above). When the application creates the compound clip in the clip browser, the application creates a new sequence data structure for this clip. On the other hand, when a user creates a compound clip in the timeline, some embodiments automatically assign the properties of the sequence currently shown in the timeline (the sequence containing the new compound clip) to the compound clip. The application only creates a new collection clip and does not create a new sequence when creating the new compound clip in the timeline.

Some embodiments automatically modify the properties of a compound clip when a copy of the clip is added to a new sequence. When a user adds a compound clip to a sequence, the media-editing application changes the spatial properties of the copy of the compound clip in the sequence to match those of the sequence. However, some embodiments only perform this spatial properties-matching when the frame rate of the compound clip already matches that of the sequence. That is, when a user adds a compound clip having a particular frame rate to a sequence (e.g., another compound clip, a project, etc.) with the same particular frame rate, then the media-editing application modifies the spatial properties (e.g., resolution) of the compound clip to match the spatial properties of the sequence.

This automatic conversion enables the application to prevent unnecessary down-scaling and subsequent up-scaling of video images (or vice versa) that can cause a loss of resolution. For instance, a compound clip containing a pair of 1080p clips could have the 720p format (and, thus, one would expect that the pair of 1080p clips would be spatially conformed down to 720p. If that compound clip is subsequently added to a 1080p project, then the application will automatically treat the compound clip as a 1080p clip, thus avoiding having to downscale the 1080p images to 720p (which causes a loss of image data) and subsequently scale them back up to 1080p, but with less information.

However, if the 720p compound clip has a different frame rate than the 1080p project, the media-editing application of some embodiments will not modify the compound clip's spatial properties to match those of the project. When the compound clip has a particular frame rate, the user may have made edits at that particular frame rate, choosing as edit points (which are at frame boundaries of the compound clip's frame rate) specific video images of the contained clips at the particular frame rate.

The difference in frame rates will not necessarily result in a loss of resolution for images, however. Some embodiments, rather than conform the source images to the properties of the compound clip and then conform the compound clip images to the output, will instead pass through rate conform effects directly to the source and use a downstream pixel transform for any source images to conflate any scaling operations on the image. Some of these optimizations will be described below.

Figure 40:
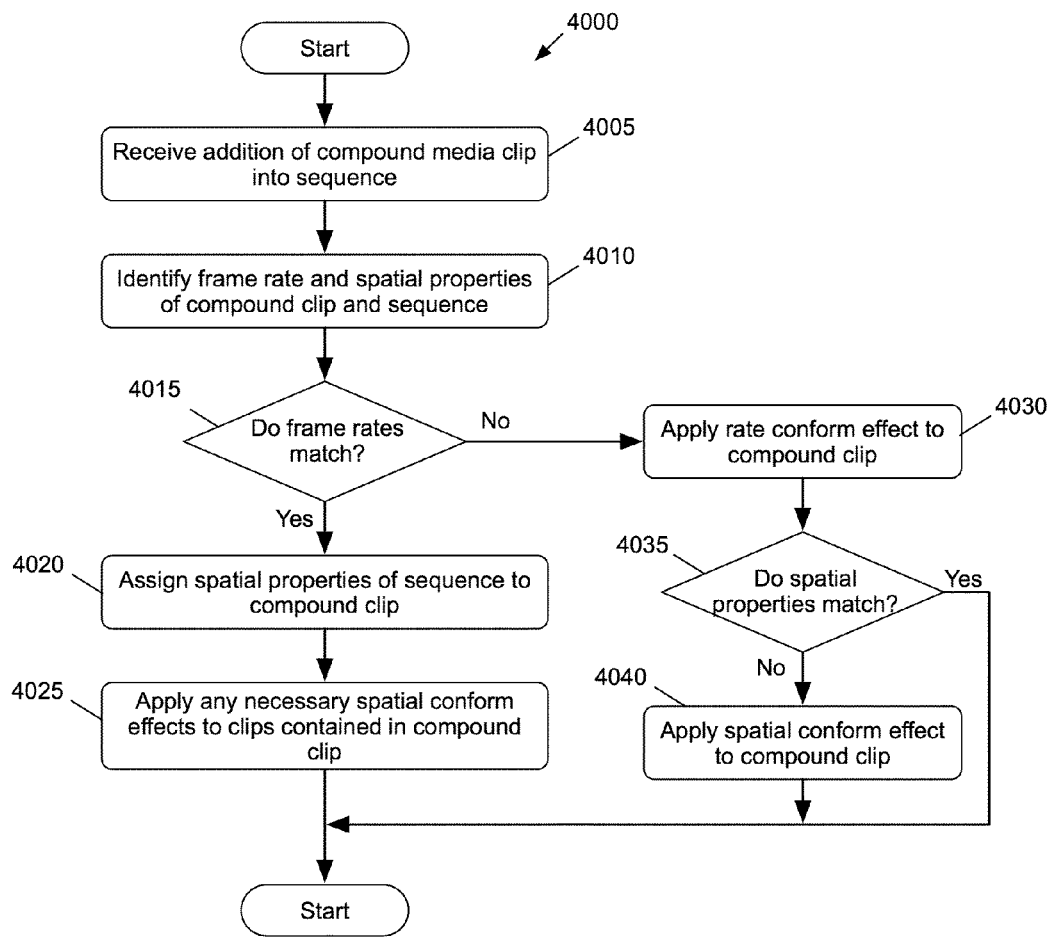
FIG. 40 conceptually illustrates a process of some embodiments for adding a compound clip into a sequence.

FIG. 40 conceptually illustrates a process 4000 of some embodiments for adding a compound clip into a sequence. FIG. 40 will be described by reference to FIGS. 41-44, which illustrate various examples of compound clips in sequences. As shown, the process 4000 begins by receiving (at 4005) the addition of a compound media clip into a sequence. The sequence can be a media project or another compound clip (which itself might be part of a project, part of yet another compound clip, or its own sequence in an event). In order to add the compound clip, a user of the media-editing application might drag and drop the media clip from a media browser, select the clip and use a hotkey, menu option, etc., in order to add the clip to the sequence, or take some other action.

When the user adds the compound clip from the media browser, the media-editing application of some embodiments makes a copy of the data structures for the compound clip (including any nested clips), removes the sequence container structure, and adds the duplicated set of structures (without the sequence) to the array of the primary collection of the sequence to which the clip was added. When the clip is added as an anchored clip, some embodiments add the clip to the set of anchored items of the clip to which the added clip is anchored (the anchoring clip), and correspondingly add a reference to the anchoring clip as a parent item of the anchored clip (and add any necessary offset information). The present figures refer to the addition of a compound clip to a primary collection of a sequence, rather than as an anchored item.

In addition to adding a compound clip from the media browser, a user might copy a compound clip from a different sequence (e.g., use a compound clip from a first project in a second project). In such embodiments, the application copies the data structure for the compound clips (and all of its contained clips) and inserts this into the data structure for the sequence to which the compound clip is added.

Lastly, a user might create a compound clip by selecting clips in the timeline for the sequence and selecting an option to create a new compound clip from the selected clips (e.g., from a drop-down menu or a pop-up menu, with a hotkey, etc.). In this case, some embodiments create the new compound clip with the spatial and temporal properties of the sequence that contains it (i.e., the sequence shown in the timeline). In this case, the application does not need to perform process 4000.

Upon receiving the addition of the compound clip to the sequence, the process 4000 identifies (at 4010) the frame rate and spatial properties of the compound clip and sequence. The spatial properties, in some embodiments, are the dimensions and pixel aspect ratio described above in Section III. For a media project, the properties are user-defined in some embodiments (e.g., at the time of creation of the project). As described in the preceding paragraphs, the spatial and temporal properties for a compound clip might be user-defined (e.g., when the compound clip was originally created in the clip browser) or automatically defined (e.g., when the compound clip was originally created in the timeline).

Figure 41:
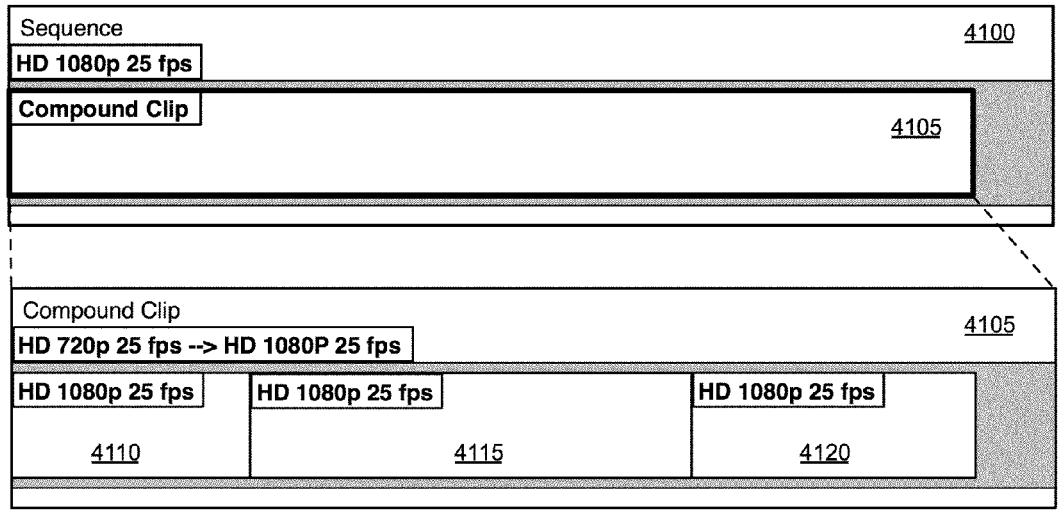
FIGS. 41-44 illustrate various examples of compound clips in sequences.
Figure 42:
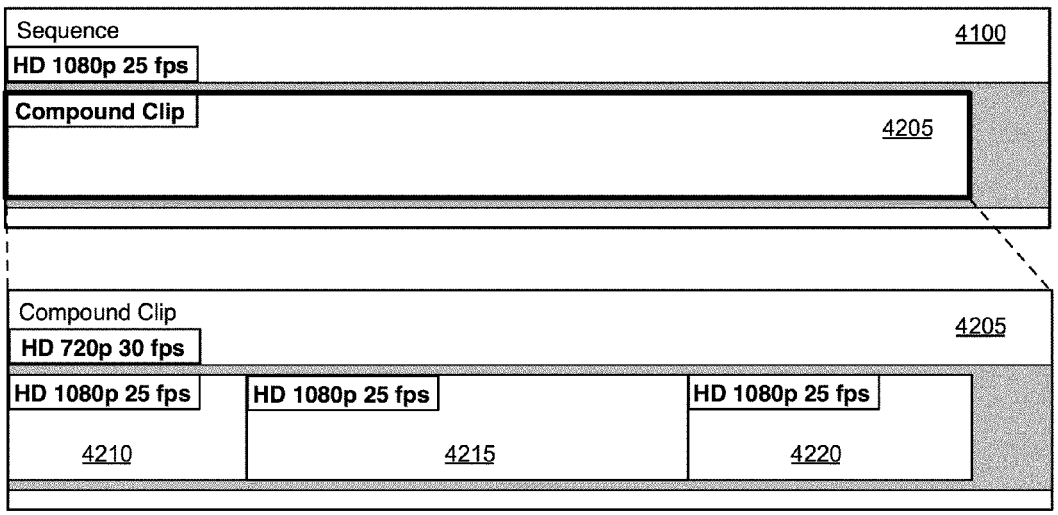
Figure 43:
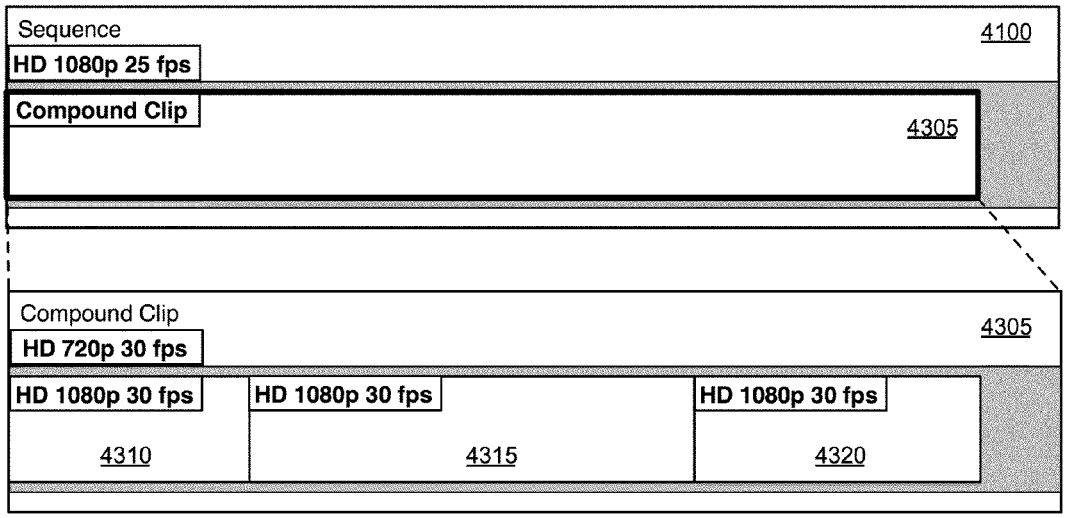
Figure 44:
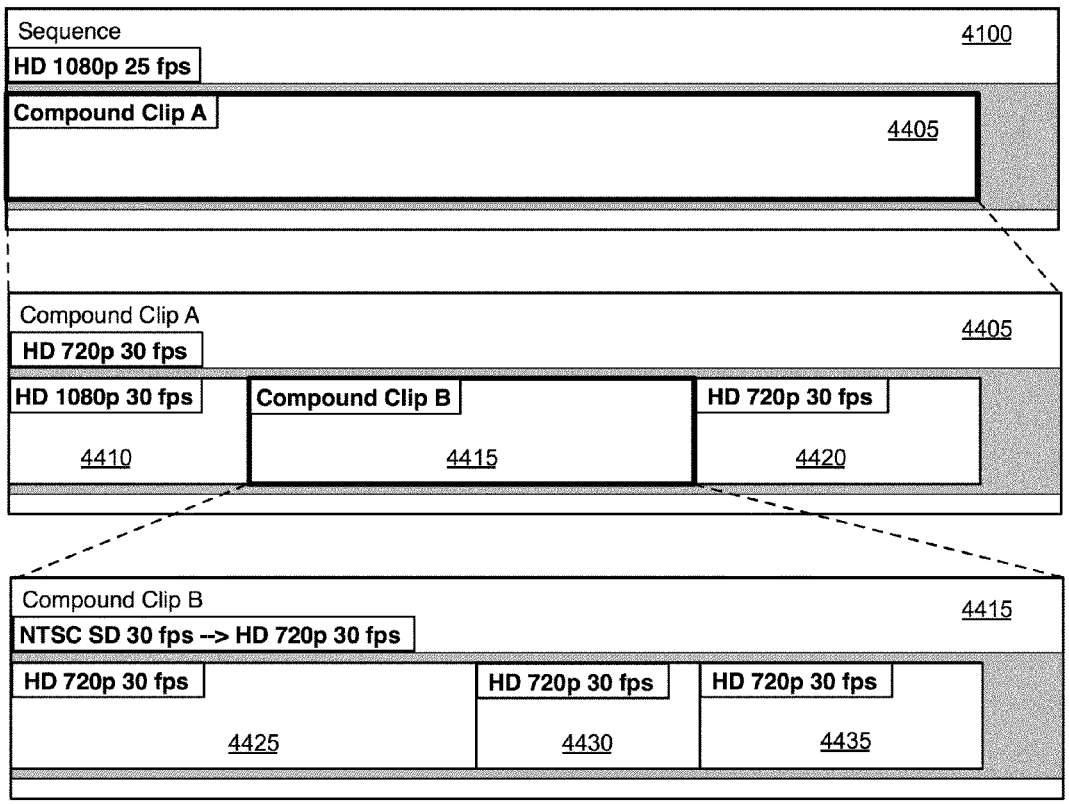

FIGS. 41-44 conceptually illustrate compound clips nested within sequences. Specifically, these figures show compound clips with different spatial and temporal properties that are added to a 1080p (square-pixeled 1920×1080) 25 frames per second sequence 4100. As shown, FIG. 41 illustrates a 720p compound clip 4105 that has a frame rate of 25 fps, FIG. 42 illustrates a 720p compound clip 4205 that has a frame rate of 30 fps, and FIG. 43 illustrates a different 720p compound clip 4305 that also has a frame rate of 30 fps. Lastly, FIG. 44 illustrates a 720p compound clip 4405 that has a frame rate of 30 fps and contains a NTSC SD compound clip 4415 that has a frame rate of 30 fps.

With the properties of both the compound clip and the sequence determined, the process 4000 determines (at 4015) whether the frame rate of the compound clip matches that of the sequence. As indicated above, the media-editing application will only align the spatial properties of the compound clip with those of the sequence (as opposed to using a conform effect) when the frame rates of the compound clip and the sequence match.

Thus, when the frame rates do match, the process assigns (at 4020) the spatial properties of the sequence to the compound clip. That is, the compound clip inherits the image format (and thus the dimensions and pixel aspect ratio) of the sequence to which it is added. The compound clip may already have these properties, in which case the application maintains the properties. The compound clip 4105 has a frame rate of 25 fps, which is the same as the frame rate of the sequence 4100. As such, the media-editing application automatically modifies the spatial properties of the compound clip 4105, so that it has a video image format of 1080p rather than 720p. Thus, when a user selects the compound clip 4105 in the timeline, the inspector display area will indicate that the clip has properties of 1920×1080 dimensions and a frame rate of 25 frames per second.

With the spatial properties of the sequence assigned to the compound clip, the process applies (at 4025) any necessary spatial conform effects to clips contained in the compound clip, which may involve removing conform effects. The process then ends. As mentioned in the sections above, in some embodiments the spatial conform effects are not actually removed from the effect stack of the contained clips. Instead, the conform effects remain, but will act as a pass-through at time of rendering when the effect determines that the compound clip spatial properties are the same as the contained clip.

As an example, if a user adds a 720p compound clip containing a 720p video clip to a 1080p sequence, then the 720p compound clip will be assigned 1080p spatial properties (assuming the frame rates match). As a result, the application applies a conform effect to the 720p video clip contained within the compound clip. While this has the same effect on the 720p video clip as applying a conform effect to the 720p compound clip, the compound clip may also contain other clips whose image quality might suffer from being first conformed to the 720p format and then subsequently conformed to the 1080p compound clip.

Referring to FIG. 41, the compound clip 4105 contains three 1080p 25 fps video clips 4110-4120. When the compound clip 4105 has 720p spatial properties, then a conform effect is applied to each of the three video clips that downscales their video from 1080p to 720p (unless the "none" setting is selected for the spatial conform). However, when the application automatically modifies the spatial properties of the compound clip 4105, the application no longer needs to apply a conform effect to these individual clips 4110-4120, thereby preventing the information loss associated with downscaling.

When the frame rates of the sequence and the compound clip added to the sequence do not match, the process applies (at 4030) a rate conform effect to the compound clip. In some embodiments, the rate conform effect applied to a compound clip operates in the same manner as such an effect applied to an individual clip, as described above in Section V. Using the video images defined for the frame rate of the compound clip, the application generates output video images at the frame rate of the sequence (either using a 1:1 frame matching technique or one of the different frame generation techniques described above).

However, some embodiments actually pass through the conform effects at time of rendering. That is, when the output sequence (e.g., project) requests an image for a particular time (based on its output frame rate), some embodiments pass this requested time directly into the component clip, rather than perform time quantization at multiple levels. The application then selects an image (if using the floor or nearest neighbor options) or two images (for the frame blending and optical flow options) based on the output image start time and the source image start times, irrespective of the frame rate of the compound clip container.

As examples, both FIG. 42 and FIG. 43 illustrate 30 fps clips added to the 25 fps sequence 4100. In both of these cases, the application applies a rate conform effect to the compound clips 4205 and 4305. In the case of the compound clip 4205, the contained clips all have a frame rate of 25 fps. However, these clips 4210-4220 are conformed to the 30 fps frame rate in order for the user to edit the compound clip 4205 (i.e., define edit points between the individual clips). The application thus generates output video for the compound clip at 30 fps using the video images of the video clips. However, when generating 25 fps output video for the sequence 4100, some embodiments pass directly into the component clips to select images.

In the case of compound clip 4205, the source video is also at 25 fps, so these images will be mapped directly to the output at 25 fps. For the compound clip 4305, the rate conform effect on the compound clip (converting from 30 to 25 fps) is passed through to the 30 fps source video in order for the application to select images.

After applying the rate conform effect, the process 4000 determines (at 4035) whether the spatial properties of the compound clip matches those of the sequence. Because the frame rates are different, the application does not automatically change the spatial properties of the compound clip to match those of the sequence. As indicated, in some embodiments the spatial properties that the media-editing application compares are the image dimensions and pixel aspect ratio. When the spatial properties match, the process does not need to apply a spatial conform effect, and thus ends.

When the spatial properties of the compound clip do not match those of the sequence, the process 4000 applies (at 4040) a spatial conform effect to the compound clip, then ends. While the application does not modify the actual properties of the compound clip, the sequence output images still need to have the correct format, and thus the application applies the conform effect.

In this case, due to the frame rates not matching up, images might be down-scaled and subsequently upscaled, or vice versa. However, due to the use of a downstream pixel transform, at rendering time these conform effects will cancel each other out and no resolution will be lost. The downstream pixel transform of some embodiments is a matrix transform generated by traversing up a render graph, and accumulates all of the transforms applied to an image. Thus, an upscaling by a factor of 3/2 will cancel out a downscaling by a factor of ⅔, and thus the actual pixels of the image need not be scaled. In some cases, however, an effect is applied at the compound clip level which requires pixel resampling at the resolution of the compound clip, in which cases the images will be scaled to the compound clip resolution, have the effect applied, and then the new images will be scaled to the sequence resolution. Some embodiments avoid resampling whenever possible in order to avoid these situations, but certain effects or filters require the resampling.

As examples, in both of FIGS. 42 and 43, the application conforms the images of the individual clips 4210-4220 and 4310-4320 to 720p, then subsequently conforms the compound clip output to 1080p for the sequence output. To render an image from the duration of media clip 4210, the media-editing application of some embodiments uses the selected rate conform algorithm for the compound clip to pass through the compound clip and select an image from the fps source images (the frame boundaries of the project should always line up with the frame boundaries of the source video). Assuming no complicating effects are applied at the compound clip level, the conform effect from 1080p to 720p is canceled out by the conform effect from 720p to 1080p, and thus the source images can be used directly for the output of sequence 4100.

To render an image from the duration of media clip 4310, the media-editing application uses the selected rate conform algorithm for the compound clip to pass through the compound clip and select a 1080p image from the 30 fps source images (or two images, if frame blending or using optical flow). Assuming no complicating effects applied at the compound clip level, the conform effects on the images would cancel each other out as described above for FIG. 42.

FIG. 44 conceptually illustrates an additional example of nested compound clips. This figure shows the 1080p 25 fps sequence 4100, which contains a NTSC 30 fps compound clip 4405. In additional to a pair of individual clips 4410 and 4420, the compound clip 4405 also contains a compound clip 4415. The compound clip 4415 contains three 720p 30 fps individual clips 4425-4435. As shown, the application automatically modifies the spatial properties of the compound clip 4415 to match those of its container clip 4405, because the frame rates of both clips 4405 and 4415 are the same (30 fps). However, the sequence 4100 has a frame rate of 25 fps, and therefore the spatial properties of the compound clip 4405 are not changed to match the 1080p sequence.

If the sequence frame rate was also 30 fps, then not only would the compound clip 4405 inherit the 1080p spatial properties, but the application would also propagate the 1080p image format down to the compound clip 4415. At any level of the hierarchy, the application will propagate the spatial properties so long as the temporal properties match. In some embodiments, the application uses similar inheritance rules for compositing between sequence lanes (Section I describes the primary lane and anchor lanes). In general, the application composites from the highest lane number downwards. Thus, assuming no blending, if a first 720p video is anchored above a second 720p video, then for the duration of the overlap the images of the first 720p video are used for the sequence output.

A simple example of inheritance involves a mostly transparent 1080p still image (e.g., a title) anchored to a 720p video in a 1080p sequence. If strictly obeying the compositing rules, the application would blend the 1080p image with the 720p video, at a resolution of 720p, then subsequently conform the blended images to the 1080p sequence. However, when the 720p video clip and the 1080p sequence have the same frame rate (no rate conform is needed between them), the application of some embodiments instead conforms the 720p video images to 1080p first, and then blends the still image with the conformed images at 1080p.

VII. Software Architecture

Figure 45:
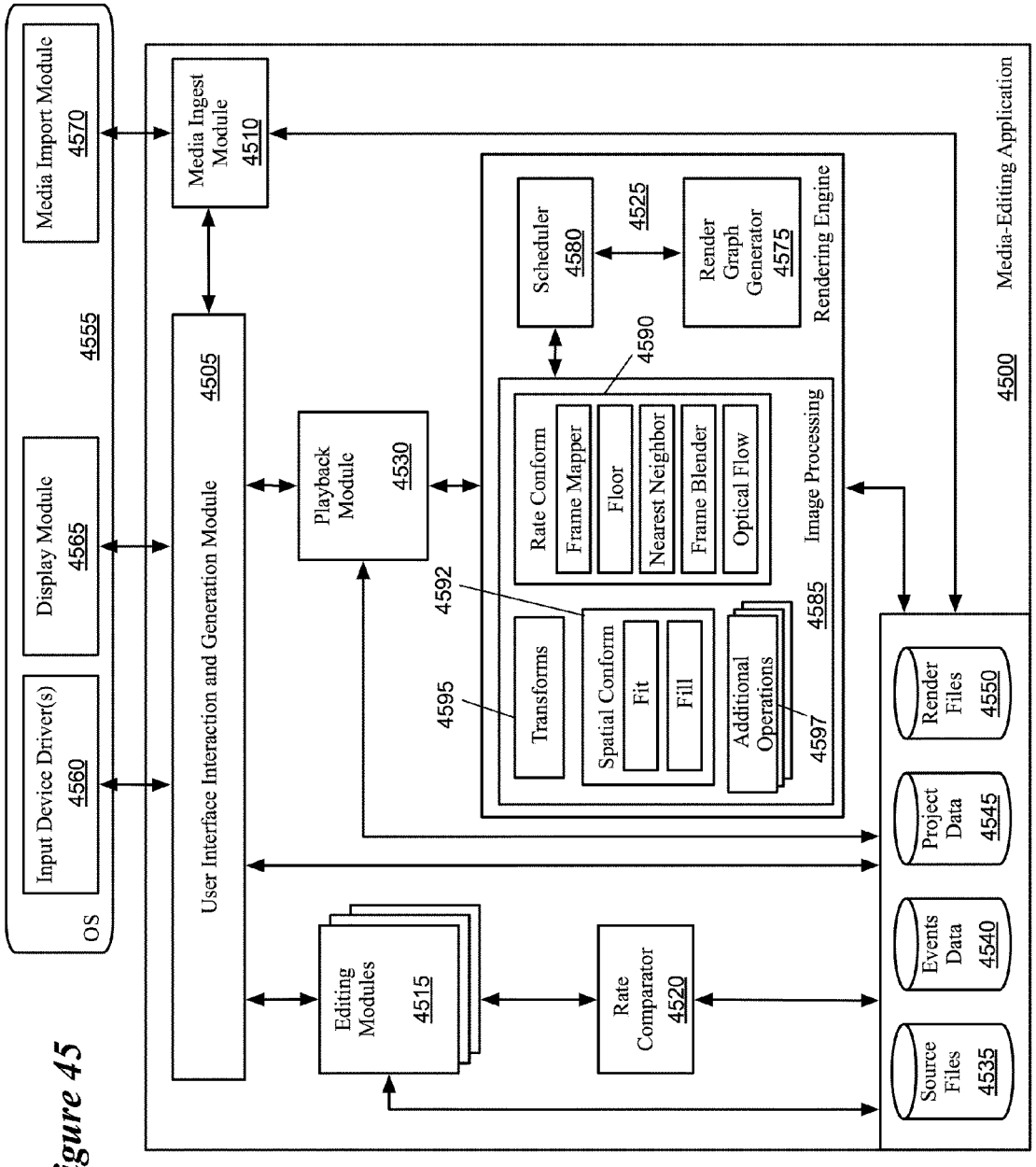
FIG. 45 conceptually illustrates the software architecture of a media-editing application of some embodiments.

In some embodiments, the processes described above are implemented as software running on a particular machine, such as a computer or a handheld device, or stored in a machine-readable medium. FIG. 45 conceptually illustrates the software architecture of a media-editing application 4500 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The media editing application 4500 includes a user interface (UI) interaction and generation module 4505, a media ingest module 4510, editing modules 4515, rate comparator 4520, rendering engine 4525, and playback module 4530.

The figure also illustrates stored data associated with the media-editing application: source files 4535, events data 4540, project data 4545, and render files 4550. In some embodiments, the source files 4535 store media files (e.g., video files, audio files, combined video and audio files, etc.) imported into the application. The events data 4540 stores the events information used by some embodiments to populate the clip library and clip browser. The events data may be a set of clip object data structures stored as one or more SQLite database files (or other format) in some embodiments. The project data 4545 stores the project information used by some embodiments to specify a composite presentation in the timeline. The project data may also be a set of clip object data structures stored as one or more SQLite database files (or other format) in some embodiments. The render files 4550 of some embodiments may include thumbnail-sized images for display in the clip browser or timeline, audio waveform displays for media clips, as well as rendered segments of a timeline sequence for use during playback. In some embodiments, the four sets of data 4535-4550 are stored in one physical storage (e.g., an internal hard drive, external hard drive, etc.). In some embodiments, the data may be split between multiple physical storages. For instance, the source files might be stored on an external hard drive with the events data, project data, and render files on an internal drive. Some embodiments store events data with their associated source files and render files in one set of folders, and the project data with associated render files in a separate set of folders.

FIG. 45 also illustrates an operating system 4555 that includes input device driver(s) 4560, display module 4565, and media import module 4570. In some embodiments, as illustrated, the device drivers 4560, display module 4565, and media import module 4570 are part of the operating system even when the media editing application 4500 is an application separate from the operating system The input device drivers 4560 may include drivers for translating signals from a keyboard, mouse, touchpad, tablet, touchscreen, etc. A user interacts with one or more of these input devices, which send signals to their corresponding device driver. The device driver then translates the signals into user input data that is provided to the UI interaction and generation module 4505.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application illustrates the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The display module 4565 translates the output of a user interface for a display device. That is, the display module 4565 receives signals (e.g., from the UI interaction and generation module 4505) describing what should be displayed and translates these signals into pixel information that is sent to the display device. The display device may be an LCD, plasma screen, CRT monitor, touchscreen, etc.

The media import module 4570 receives media files (e.g., audio files, video files, etc.) from storage devices (e.g., external drives, recording devices, etc.) through one or more ports (e.g., a USB port, Firewire port, etc.) of the device on which the media-editing application 4500 operates and translates this media data for the media-editing application or stores the data directly onto a storage of the device.

The UI interaction and generation module 4505 of the media editing application 4500 interprets the user input data received from the input device drivers and passes it to various modules, including the media ingest module 4510, the editing modules 4515, the rate comparator 4520, the rendering engine 4525, and the playback module 4530. The UI interaction module also manages the display of the media-editing application GUI, and outputs this display information to the display module 4565. This UI display information may be based on information from the editing modules 4515, the playback module 4530, the data 4535-4550, etc. In addition, the module 4505 may generate portions of the UI based solely on user input—e.g., when a user moves an item in the UI that only affects the display rather than any of the other modules, such as moving a window from one side of the UI to the other or modifying the relative size of the clip browser and clip library. In some embodiments, the UI interaction and generation module 4505 generates a basic GUI and populates the GUI with information from the other modules and stored data.

The media ingest module 4510 manages the import of source media into the media-editing application 4500. Some embodiments, as shown, receive source media from the media import module 4570 of the operating system 4555. The media ingest module 4510 receives instructions through the UI module 4505 as to which files should be imported, then instructs the media import module 4570 to enable this import (e.g., from an external drive, from a camera, etc.). The media ingest module 4510 of some embodiments stores these source files 4535 in specific file folders associated with the application. In some embodiments, the media ingest module 4510 also manages the creation of event data structures upon import of source files and the creation of the clip and asset data structures contained in the events.

The editing modules 4515 include a variety of modules for editing media in the clip browser as well as in the timeline. The editing modules 4515 handle the creation of projects, addition and subtraction of clips from projects, trimming or other editing processes within the timeline, application of effects and transitions, or other editing processes. In some embodiments, the editing modules 4515 create and modify project and clip data structures in both the event data 4580 and the project data 4545.

The editing modules 4515 of some embodiments include modules for applying rate conform effects and spatial conform effects to media clips. As described, some embodiments apply spatial conform effects to all clips added to a project, irrespective of whether the spatial properties of the clip match the sequence. Some embodiments also use the rate comparator 4520 to determine whether to apply a rate conform effect and to determine whether to modify the spatial properties of a compound clip.

The rate comparator 4520 compares media clip data with sequence data to determine whether a clip and a sequence to which the clip has been added have the same or different frame rates. When the two have different frame rates, the rate comparator 4520 indicates to the editing modules 4515 that a rate conform effect is needed for the media clip.

The rendering engine 4525 handles the rendering of images for the media-editing application. As shown, the rendering engine 4525 of some embodiments includes a render graph generator 4575, a scheduler 4580, and image processing operations 4585. The rendering engine manages the creation of images for the media-editing application. When an image is requested by a destination within the application (e.g., the playback module 4530, a background rendering process, an encoder, etc.), the rendering engine outputs the requested image according to the project or event data. The rendering engine retrieves the project data or event data that identifies how to create the requested image and the render graph generator 4535 generates a render graph that is a series of nodes indicating either images to retrieve from the source files 4535 or operations to perform on the images. The scheduler 4580 schedules the retrieval of the necessary images through disk read operations and the decoding of those images.

The image processing operations 4585 are the various operations performed on the images to generate an output image. As shown, these image processing operations include rate conform operations 4590 (including 1:1 frame mapping, floor, nearest neighbor, frame blending, and optical flow operations) and spatial conform operations 4592 (including both fit and fill) operations. In addition, the image processing operations include transform operations 4595 and additional operations 4597 (e.g., blur or other pixel value modification operations, color space conversions, etc.). The image processing operations 4585 in some embodiments are actually part of the operating system and are performed by a GPU or CPU of the device on which the application 4500 operates. The output of the rendering engine (a rendered image) may be stored in the render files 4550 or sent to a destination for additional processing or output (e.g., the playback module 4530).

The playback module 4530 handles the playback of images (e.g., in a preview display area of the user interface). Some embodiments do not include a playback module and the rendering engine directly outputs its images to the UI interaction and generation module 4505 for integration into the GUI, or directly to the display module 4565 for display at a particular portion of the display device.

While many of the features of media-editing application 4500 have been described as being performed by one module (e.g., the UI interaction and generation module 4505, the media ingest manager 4510, etc.), one of ordinary skill in the art will recognize that the functions described herein might be split up into multiple modules. Similarly, functions described as being performed by multiple different modules might be performed by a single module in some embodiments (e.g., the playback module 4530 might be part of the UI interaction and generation module 4505, and a single module might be used to perform the transforms as well as spatial conforms, even when the effects are stored separately).

VIII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 46:
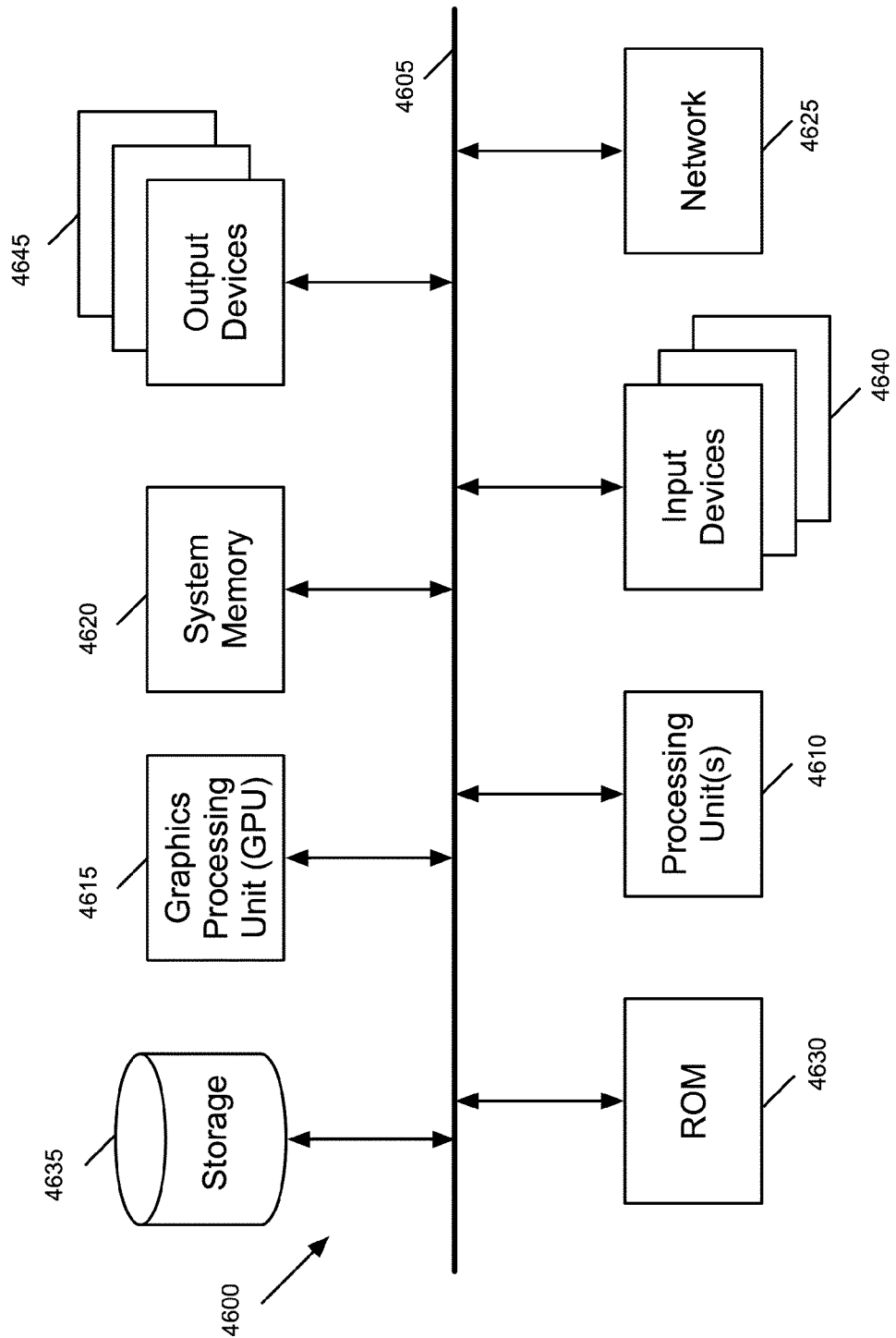
FIG. 46 conceptually illustrates an electronic system with which some embodiments of the invention are implemented.

FIG. 46 conceptually illustrates an electronic system 4600 with which some embodiments of the invention are implemented. The electronic system 4600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 4600 includes a bus 4605, processing unit(s) 4610, a graphics processing unit (GPU) 4615, a system memory 4620, a network 4625, a read-only memory 4630, a permanent storage device 4635, input devices 4640, and output devices 4645.

The bus 4605 collectively represents all system, peripheral, and chipset buses that communicatively connect the numerous internal devices of the electronic system 4600. For instance, the bus 4605 communicatively connects the processing unit(s) 4610 with the read-only memory 4630, the GPU 4615, the system memory 4620, and the permanent storage device 4635.

From these various memory units, the processing unit(s) 4610 retrieves instructions to execute and data to process in order to execute the processes of the invention. The processing unit(s) may be a single processor or a multi-core processor in different embodiments. Some instructions are passed to and executed by the GPU 4615. The GPU 4615 can offload various computations or complement the image processing provided by the processing unit(s) 4610. In some embodiments, such functionality can be provided using CoreImage's kernel shading language.

The read-only-memory (ROM) 4630 stores static data and instructions that are needed by the processing unit(s) 4610 and other modules of the electronic system. The permanent storage device 4635, on the other hand, is a read-and-write memory device. This device is a non-volatile memory unit that stores instructions and data even when the electronic system 4600 is off. Some embodiments of the invention use a mass-storage device (such as a magnetic or optical disk and its corresponding disk drive) as the permanent storage device 4635.

Other embodiments use a removable storage device (such as a floppy disk, flash memory device, etc., and its corresponding drive) as the permanent storage device. Like the permanent storage device 4635, the system memory 4620 is a read-and-write memory device. However, unlike storage device 4635, the system memory 4620 is a volatile read-and-write memory, such a random access memory. The system memory 4620 stores some of the instructions and data that the processor needs at runtime. In some embodiments, the invention's processes are stored in the system memory 4620, the permanent storage device 4635, and/or the read-only memory 4630. For example, the various memory units include instructions for processing multimedia clips in accordance with some embodiments. From these various memory units, the processing unit(s) 4610 retrieves instructions to execute and data to process in order to execute the processes of some embodiments.

The bus 4605 also connects to the input and output devices 4640 and 4645. The input devices 4640 enable the user to communicate information and select commands to the electronic system. The input devices 4640 include alphanumeric keyboards and pointing devices (also called "cursor control devices"), cameras (e.g., webcams), microphones or similar devices for receiving voice commands, etc. The output devices 4645 display images generated by the electronic system or otherwise output data. The output devices 4645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 46, bus 4605 also couples electronic system 4600 to a network 4625 through a network adapter (not shown). In this manner, the computer can be a part of a network of computers (such as a local area network ("LAN"), a wide area network ("WAN"), or an Intranet, or a network of networks, such as the Internet. Any or all components of electronic system 4600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 11, 13, 26, and 40) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a media-editing application for execution by at least one processing unit, the media-editing application comprising sets of instructions for:
   receiving an addition of a video clip to a composite video project, the video clip having a sequence of video images at a first frame rate and the composite video project having a second frame rate for outputting video images;
   when the first frame rate differs from the second frame rate but is within a threshold of the second frame rate, generating output video images for a particular duration of the composite video project at the second frame rate by mapping each video image of the video clip to a different single output video image in the particular duration; and
   when the first frame rate differs from the second frame rate and is not within the threshold of the second frame rate, generating output video images for the particular duration of the composite video project at the second frame rate by using at least one of the video images of the video clip to generate each output video image in the particular duration.

2. The non-transitory computer readable medium of claim 1, wherein the video clip indirectly refers to a source file storing the sequence of video images.

3. The non-transitory computer readable medium of claim 2, wherein the first frame rate is the rate at which an image capturing device captured the sequence of video images stored in the source file.

4. The non-transitory computer readable medium of claim 1, wherein the second frame rate is a user-defined frame rate for the composite video project.

5. The non-transitory computer readable medium of claim 1, wherein the mapped video images of the video clip have a total duration in a source video file that is different than the particular duration.

6. The non-transitory computer readable medium of claim 5, wherein the particular duration is equal to the total duration of the mapped video images in the source video file multiplied by a ratio of the first frame rate to the second frame rate.

7. The non-transitory computer readable medium of claim 1, wherein the set of instructions for generating output video images at the second frame rate by mapping each video image of the video clip further comprises a set of instructions for scaling a duration of an audio clip associated with the video clip by a ratio of the first frame rate to the second frame rate.

8. The non-transitory computer readable medium of claim 7, wherein the set of instructions for scaling the duration of the audio clip comprises using a pitch-preserving algorithm.

9. The non-transitory computer readable medium of claim 1, wherein the set of instructions for generating output video images for the particular duration by using at least one of the video images of the video clip to generate each output image comprises sets of instructions for:
   identifying which of a plurality of different algorithms are set for generating the output images; and
   generating the output images using the identified algorithm.

10. The non-transitory computer readable medium of claim 9, wherein the plurality of different algorithms comprises a floor algorithm, a nearest neighbor algorithm, a frame blending algorithm, and an optical flow algorithm.

11. The non-transitory computer readable medium of claim 9, wherein a user sets one of the plurality of different algorithms.

12. A non-transitory computer readable medium storing a media-editing application for execution by at least one processing unit, the media-editing application comprising:
   a comparator module for comparing a first frame rate of a video clip to a second frame rate of a media project that contains the video clip for a particular duration of the media project, the video clip referring to a sequence of video images;
   a set of editing modules for applying a rate conform effect to the video clip when the comparator module indicates that the first frame rate is different from the second frame rate;
   a rendering engine for generating output images for the particular duration of the media project, the rendering engine comprising:
      a first rate conform module for generating the output images for the particular duration of the media project by mapping each video image of the video clip to a single different output image in the particular duration; and
      a set of additional rate conform modules for generating the output images for the particular duration of the media project from the video images of the video clip by using a user-selected image generation algorithm from a set of available image generation algorithms for application to the video images when the rate conform effect is applied to the video clip.

13. The non-transitory computer readable medium of claim 12, wherein the set of additional rate conform modules comprises a particular module for generating the output images for the particular duration by determining, for each particular output image, a particular image of the video clip having a time in the video clip equal or prior to a time that corresponds to the output image.

14. The non-transitory computer readable medium of claim 13, wherein when the second frame rate is faster than the first frame rate, the output images generated by the particular module use at least one of the video clip images more than once.

15. The non-transitory computer readable medium of claim 13, wherein when the second frame rate is slower than the first frame rate, the output images generated by the particular module skip at least one of the video clip images.

16. The non-transitory computer readable medium of claim 12, wherein the set of additional rate conform modules comprises a particular module for generating the output images for the particular duration by determining, for each particular output image, a particular image of the video clip nearest in time in the video clip to a time that corresponds to the output image.

17. The non-transitory computer readable medium of claim 12, wherein the set of additional rate conform modules comprises a particular module for generating the output images for the particular duration by blending, for each output image, two of the images of the video clip.

18. The non-transitory computer readable medium of claim 17, wherein the two source images are weighted in the blend based on a relation of times of the two video clip images in the video clip to a time that corresponds to the output image.

19. The non-transitory computer readable medium of claim 12, wherein the set of additional rate conform modules comprises a particular module for generating the output images for the particular duration by analyzing motion vectors between two subsequent images of the video clip and moving pixels along the motion vectors based on a relation of times of the two video clip images in the video clip to a time that corresponds to the output image.

20. The non-transitory computer readable medium of claim 12, wherein the rendering engine further comprises a spatial conform module for modifying the images generated by the rate conform modules to scale the images for output with a particular set of spatial properties.

21. A non-transitory computer readable medium storing a media-editing application for execution by at least one processing unit, the media-editing application comprising sets of instructions for:
  receiving an addition of a compound video clip having an associated first frame rate and first set of spatial properties to a video sequence having a second frame rate and second set of spatial properties, wherein the compound video clip contains at least two additional video clips and does not refer directly to a set of video images; and
  replacing, when the first frame rate and the second frame rate are the same, the first set of spatial properties with the second set of spatial properties as the set of spatial properties associated with the compound clip.

22. The non-transitory computer readable medium of claim 21, wherein the media-editing application further comprises a set of instructions for applying a spatial conform effect to one of the contained video clips when a third set of spatial properties of the contained video clip does not match the set of spatial properties assigned to the compound clip.

23. The non-transitory computer readable medium of claim 21, wherein the media-editing application further comprises sets of instructions for, when the first frame rate and second frame rate are different:
  applying a rate conform effect to the compound clip; and
  when the first set of spatial properties and second set of spatial properties are different, applying a spatial conform effect to the compound clip.

24. The non-transitory computer readable medium of claim 1, wherein the set of instructions for generating output video images for the particular duration by using at least one of the video images for each output image comprises sets of instructions for mapping a particular one of the video images to at least two different output images.

25. The non-transitory computer readable medium of claim 1, wherein the set of instructions for generating output video images for the particular duration by using at least one of the video images for each output image results in at least one of the video images not being mapped to any of the output images.

26. The non-transitory computer readable medium of claim 1, wherein the set of instructions for generating output video images for the particular duration by using at least one of the video images for each output image comprises sets of instructions for generating at least one of the output images by combining data from at least two video images.

* * * * *